United States Patent
Bettenburg et al.

(10) Patent No.: US 11,032,269 B2
(45) Date of Patent: *Jun. 8, 2021

(54) METHOD AND SYSTEM FOR ESTABLISHING TRUSTED COMMUNICATION USING A SECURITY DEVICE

(71) Applicant: INBAY TECHNOLOGIES INC., Ottawa (CA)

(72) Inventors: Nicolas Johannes Sebastian Bettenburg, Ottawa (CA); Randy Kuang, Ottawa (CA)

(73) Assignee: INBAY TECHNOLOGIES INC., Ottawa (CA)

(*) Notice: Subject to any disclaimer, the term of this patent is extended or adjusted under 35 U.S.C. 154(b) by 37 days.

This patent is subject to a terminal disclaimer.

(21) Appl. No.: 16/429,777

(22) Filed: Jun. 3, 2019

(65) Prior Publication Data

US 2019/0372955 A1    Dec. 5, 2019

Related U.S. Application Data

(63) Continuation of application No. 15/676,872, filed on Aug. 14, 2017, now Pat. No. 10,313,328, which is a
(Continued)

(51) Int. Cl.
*G06F 21/00* (2013.01)
*H04L 29/06* (2006.01)
(Continued)

(52) U.S. Cl.
CPC ........ *H04L 63/083* (2013.01); *G06F 16/9554* (2019.01); *G06F 21/34* (2013.01);
(Continued)

(58) Field of Classification Search
CPC ............. H04L 63/0838; H04L 63/0869; H04L 63/105; H04L 63/0853; H04L 63/0281;
(Continued)

(56) References Cited

U.S. PATENT DOCUMENTS 7,301,645 B2 * 11/2007 Wang ................. H01L 22/20
257/E21.525
7,363,494 B2    4/2008 Brainard et al.
(Continued)

FOREIGN PATENT DOCUMENTS

WO    2007026228    3/2007
WO    2008024454    2/2008

OTHER PUBLICATIONS

Dzung et al., "Security for Industrial Communication Systems", Proceedings of the IEEE, vol. 93, Issue: 6, Jun. 2005.*
(Continued)

*Primary Examiner* — Morshed Mehedi
(74) *Attorney, Agent, or Firm* — IP-Mex Inc.; Victoria Donnelly

(57) ABSTRACT

Method and system for secure access from a security device at a local network location to a remote network location are disclosed. At the security device having a unique identifier (UID), processor, and memory, a security software is obtained from a remote network location, the security software obtaining a personal identification number (PIN) of a user, and the UID of the security device. The PIN, the UID and the private security software are forwarded to the remote network location for generating a credential code, including encrypting the credential code. At the security device, the credential code is obtained from the remote network location, and authenticity of the PIN and the UID is verified, without communicating over a network, including decrypting the credential code. Upon verifying the authenticity of
(Continued)

the PIN and the UID, access credentials to the remote network location are retrieved.

20 Claims, 58 Drawing Sheets

Related U.S. Application Data continuation of application No. 15/168,850, filed on May 31, 2016, now Pat. No. 9,736,149, which is a continuation-in-part of application No. 14/721,996, filed on May 26, 2015, now Pat. No. 9,548,978, and a continuation-in-part of application No. 14/722,002, filed on May 26, 2015, now Pat. No. 9,608,988, and a continuation-in-part of application No. 14/309,369, filed on Jun. 19, 2014, now Pat. No. 9,166,975, which is a continuation-in-part of application No. 14/231,545, filed on Mar. 31, 2014, now Pat. No. 9,137,224, said application No. 14/721,996 is a continuation-in-part of application No. 13/913,399, filed on Jun. 8, 2013, now Pat. No. 8,973,111, and a continuation of application No. 13/765,049, filed on Feb. 12, 2013, now Pat. No. 8,739,252, and a continuation of application No. 13/035,830, filed on Feb. 25, 2011, now Pat. No. 8,468,582, which is a continuation of application No. 12/639,464, filed on Dec. 16, 2009, now Pat. No. 8,510,811.

(60) Provisional application No. 62/168,905, filed on May 31, 2015, provisional application No. 62/003,160, filed on May 27, 2014, provisional application No. 61/839,218, filed on Jun. 25, 2013, provisional application No. 61/599,556, filed on Feb. 16, 2012, provisional application No. 61/416,270, filed on Nov. 22, 2010, provisional application No. 61/248,047, filed on Oct. 2, 2009, provisional application No. 61/247,223, filed on Sep. 30, 2009, provisional application No. 61/183,830, filed on Jun. 3, 2009, provisional application No. 61/149,501, filed on Feb. 3, 2009.

(51) Int. Cl.
  *G06K 7/14* (2006.01)
  *G06F 16/955* (2019.01)
  *G06F 21/34* (2013.01)
  *G06F 21/36* (2013.01)
  *G06F 21/42* (2013.01)
  *G06F 21/57* (2013.01)
  *H04W 12/77* (2021.01)

(52) U.S. Cl.
  CPC .............. *G06F 21/36* (2013.01); *G06F 21/42* (2013.01); *G06F 21/57* (2013.01); *G06K 7/1417* (2013.01); *H04L 63/0428* (2013.01); *H04L 63/0838* (2013.01); *H04L 63/0853* (2013.01); *H04L 63/0869* (2013.01); *G06F 2221/2115* (2013.01); *G06F 2221/2117* (2013.01); *G06F 2221/2141* (2013.01); *H04L 63/0281* (2013.01); *H04L 63/105* (2013.01); *H04W 12/77* (2021.01)

(58) Field of Classification Search
  CPC .......... G06F 21/42; G06F 21/36; G06F 21/34; G06F 17/30879
  See application file for complete search history.

(56) References Cited

U.S. PATENT DOCUMENTS

| | | | |
|---|---|---|---|
| 7,475,247 B2 | 1/2009 | Bade et al. | |
| 7,502,933 B2 | 3/2009 | Jakobsson et al. | |
| 7,516,483 B2 | 4/2009 | Brennan | |
| 7,562,385 B2 | 7/2009 | Thione et al. | |
| 7,565,536 B2 | 7/2009 | Vassilev et al. | |
| 7,805,489 B2 | 9/2010 | Roberts | |
| 7,912,916 B2 | 3/2011 | Rakowski et al. | |
| 7,925,556 B1 | 4/2011 | Duncan et al. | |
| 8,201,237 B1 | 6/2012 | Doane et al. | |
| 8,209,381 B2 | 6/2012 | Sinn et al. | |
| 8,745,699 B2 | 6/2014 | Ganesan | |
| 9,009,814 B1 | 4/2015 | Wertz et al. | |
| 9,830,445 B1* | 11/2017 | Machani | G06F 21/42 |
| 2002/0023960 A1* | 2/2002 | Knowles | G06K 7/10792 |
| | | | 235/472.01 |
| 2002/0033418 A1* | 3/2002 | Knowles | G06K 7/10702 |
| | | | 235/472.01 |
| 2002/0115457 A1* | 8/2002 | Koscal | H04W 24/00 |
| | | | 455/466 |
| 2003/0009693 A1 | 1/2003 | Brock | |
| 2003/0037261 A1 | 2/2003 | Meffert et al. | |
| 2004/0046031 A1* | 3/2004 | Knowles | G06K 7/10564 |
| | | | 235/462.46 |
| 2004/0073797 A1 | 4/2004 | Fascenda | |
| 2004/0128547 A1 | 7/2004 | Laidlaw et al. | |
| 2004/0243835 A1 | 12/2004 | Terzis et al. | |
| 2005/0198501 A1* | 9/2005 | Andreev | H04L 63/0815 |
| | | | 713/168 |
| 2005/0262083 A1 | 11/2005 | Brown | |
| 2006/0041933 A1 | 2/2006 | Yakov et al. | |
| 2006/0198517 A1 | 9/2006 | Cameron | |
| 2006/0206918 A1 | 9/2006 | McLean | |
| 2006/0282662 A1 | 12/2006 | Whitcomb | |
| 2006/0288228 A1* | 12/2006 | Botz | H04L 63/08 |
| | | | 713/182 |
| 2007/0022469 A1 | 1/2007 | Cooper | |
| 2007/0056025 A1 | 3/2007 | Sachdeva et al. | |
| 2007/0199054 A1* | 8/2007 | Florencio | H04L 63/1441 |
| | | | 726/5 |
| 2007/0250920 A1 | 10/2007 | Lindsay | |
| 2008/0028206 A1 | 1/2008 | Sicard et al. | |
| 2008/0040783 A1 | 2/2008 | Larson et al. | |
| 2008/0059804 A1 | 3/2008 | Shah et al. | |
| 2008/0075096 A1 | 3/2008 | Wagner | |
| 2008/0162928 A1 | 7/2008 | Okaya | |
| 2008/0209221 A1* | 8/2008 | Vennelakanti | H04L 9/3273 |
| | | | 713/183 |
| 2008/0212771 A1 | 9/2008 | Hauser | |
| 2008/0222299 A1 | 9/2008 | Boodaei | |
| 2008/0229402 A1 | 9/2008 | Smetters et al. | |
| 2009/0059804 A1 | 5/2009 | Delia et al. | |
| 2009/0732808 | 5/2009 | Baentsch et al. | |
| 2009/0158005 A1* | 6/2009 | Carmichael | G06F 12/0862 |
| | | | 711/213 |
| 2009/0165121 A1 | 6/2009 | Kumar | |
| 2009/0185687 A1 | 7/2009 | Wankmueller et al. | |
| 2009/0198618 A1 | 8/2009 | Chan et al. | |
| 2009/0203355 A1 | 8/2009 | Clark | |
| 2009/0222910 A1* | 9/2009 | Le Bihan | G06F 21/57 |
| | | | 726/19 |
| 2009/0225981 A1* | 9/2009 | Motohashi | G06F 16/9027 |
| | | | 380/28 |
| 2009/0235339 A1 | 9/2009 | Mennes | |
| 2009/0259839 A1 | 10/2009 | Jung et al. | |
| 2009/0276840 A1* | 11/2009 | Cao | H04L 9/3226 |
| | | | 726/9 |
| 2009/0300721 A1 | 12/2009 | Schneider | |
| 2009/0313691 A1 | 12/2009 | Chien | |
| 2010/0180328 A1 | 7/2010 | Moas | |
| 2010/0199098 A1* | 8/2010 | King | H04L 9/0866 |
| | | | 713/182 |
| 2010/0229227 A1* | 9/2010 | Andre | H04L 9/3213 |
| | | | 726/6 |

(56) References Cited

U.S. PATENT DOCUMENTS

| | | | |
|---|---|---|---|
| 2010/0287070 A1* | 11/2010 | Santeufemia | G06Q 30/0621 705/26.25 |
| 2011/0296486 A1 | 12/2011 | Burch et al. | |
| 2012/0033811 A1* | 2/2012 | Hawkes | H04L 63/126 380/255 |
| 2012/0155358 A1* | 6/2012 | Hao | H04L 65/4076 370/312 |
| 2012/0174204 A1 | 7/2012 | Sturm | |
| 2012/0235912 A1 | 9/2012 | Lauback | |
| 2012/0260324 A1* | 10/2012 | Lenon | G06Q 20/4093 726/6 |
| 2013/0173484 A1* | 7/2013 | Wesby | G06Q 30/06 705/318 |
| 2013/0205404 A1* | 8/2013 | King | H04L 9/3213 726/27 |
| 2013/0227661 A1 | 8/2013 | Gupta | |

OTHER PUBLICATIONS http://www.asseco-see.com/nbv5/images/stories/presentations/NBV%20Authentication.pdf, presented during "New Banking Vision 5", from May 25-28 in Hotel "Sol Coral" Umag, Croatia, 2010.

Hegt, Stan "Analysis of Current and Future Phishing Attacks on Internet Banking Services", May 2008.

Naumann, Ingo "Privacy and Security Risks When Authenticating on the Internet with European eID Cards", Nov. 2009.

Schneier, Bruce "Schneier on Security", A blog covering security and security technology, Nov. 23, 2004.

European Payments Council "Customer to Bank Security Good Practices Guide", http://europeanpaymentscouncil.eu/documents, Mar. 15, 2009.

Cavoukian, Ann "Privacy by Design . . . Take the Challenge", Aug. 2008.

Zhang, Dawei "Network Security Middleware Based on USB Key" 5th IEEE International Symposium on Embedded Computing, IEEE Computer Society, pp. 77-81, 2008.

http://www.sestus.com/vt/, Sestus, "Virtual Token Real Authentication", 2008.

Menezes, et al, "Handbook of Applied Cryptography", CRC Press LLC, 1997, pp. 359-363, pp. 388-391, pp. 394-399, pp. 490-491, pp. 548-549, XP002702416, USA.

International Search Report and Written Opinion dated May 18, 2010, International Application No. PCT/CA2010/000127.

Pashalidis, Andreas; Mitchell, Chris J., "Single Sign-on Using Trusted Platforms", Royal Holloway, University of London, Egham, Surrey, TW20 0EX, United Kingdom, http://www.isg.rhul.ac.uk, pp. 1-15, 2003.

Boyd, David, "Single—On to the Web with an EMV Card", International Symposium on Collaborative Technologies and Systems, May 2008, pp. 112-120.

Mackenzie et al., "Networked Cryptographic Devices Resilient to Capture", Proceedings of the IEEE Symposium on Security and Privacy, May 2001, pp. 12-25.

Cavoukian, Ann, http://www.privacybydesign.ca/publications.htm, "Privacy by Design . . . Take the Challenge", 2009.

* cited by examiner

METHOD AND SYSTEM FOR ESTABLISHING TRUSTED COMMUNICATION USING A SECURITY DEVICE

RELATED APPLICATIONS

The present application is a Continuation of U.S. application Ser. No. 15/676,872 filed on Aug. 14, 2017 now issued as U.S. Pat. No. 10,313,328 on Jun. 3, 2019;

said application Ser. No. 15/676,872 filed on Aug. 14, 2017 is a Continuation of U.S. application Ser. No. 15/168,850 filed on May 31, 2016, now issued as U.S. Pat. No. 9,736,149 on Aug. 15, 2017;

said application Ser. No. 15/168,850 filed on May 31, 2016 claims priority from U.S. provisional application Ser. No. 62/168,905 filed on May 31, 2015;

said application Ser. No. 15/168,850 filed on May 31, 2016 is also a Continuation-in-Part (CIP) of U.S. application Ser. No. 14/721,996 filed on May 26, 2015 which claims benefit of U.S. provisional application 62/003,160 filed on May 27, 2014;

said application Ser. No. 15/168,850 filed on May 31, 2016 is also a Continuation-in-Part (CIP) of U.S. application Ser. No. 14/722,002 filed on May 26, 2015;

said application Ser. No. 15/168,850 filed on May 31, 2016 is also a Continuation-in-Part (CIP) of U.S. application Ser. No. 13/913,399, now issued as U.S. Pat. No. 8,973,111, which is Continuation of U.S. application Ser. No. 13/035,830 filed on Feb. 25, 2011, now issued as U.S. Pat. No. 8,468,582, which claims benefit of U.S. provisional application Ser. No. 61/416,270 filed on Nov. 22, 2010, and which is a Continuation-in-Part (CIP) of the U.S. application Ser. No. 12/639,464, filed on Dec. 16, 2009, now issued as U.S. Pat. No. 8,510,811, which claims priority from the following U.S. provisional application: 61/248,047 filed on Oct. 2, 2009; 61/247,223 filed on Sep. 30, 2009; 61/183,830 filed on Jun. 3, 2009; and 61/149,501 filed on Feb. 3, 2009;

and said U.S. application Ser. No. 14,721,996 application filed on May 26, 2015 is also a Continuation-in-part of U.S. application Ser. No. 14/309,369 filed on Jun. 19, 2014 which claims benefit of U.S. provisional application Ser. No. 61/839,218 filed on Jun. 25, 2013, and which is a Continuation-in-Part (CIP) of U.S. application Ser. No. 14/231,545 filed on Mar. 31, 2014, which is a Continuation of U.S. patent application Ser. No. 13/765,049, filed Feb. 12, 2013, now issued as U.S. Pat. No. 8,739,252, which claims benefit of U.S. Provisional Application Ser. No. 61/599,556, filed Feb. 16, 2012.

The entire contents of all aforementioned applications and issued patents are incorporated herein by reference.

FIELD OF THE INVENTION

The invention relates generally to network security systems. More particularly, the invention relates to a method and system for authorizing secure electronic transactions such as email using a security device having a quick response code scanner.

BACKGROUND OF THE INVENTION

On-line web-based services are widely used in today's society, a typical example being on-line banking services. However, problems associated with transaction security have caused serious challenges and risks to institutions and their customers. The increase in identity theft and the resulting financial losses have become major obstacles that institutions have sought to overcome to ensure a secure on-line environment and to maximize the potential benefits and value of on-line services.

In a global economy with billions of transactions carried daily over insecure public Internet Protocol (IP) networks, identity protection becomes paramount. Commerce transactions are based on the trust that each party places in the integrity of the other's credentials. The resultant proliferation of identity systems is forcing individuals to become their own identity administrators.

Organizations are increasingly vulnerable to substantial economic loss from cyber security attacks. In the case of an information security breach, financial institutions in particular can be exposed to a significant financial loss, as well as a loss of reputation. In general, the customer computer environment is considered to be insecure with potential for a variety of malicious software to be inserted, such as keystroke recorder, Trojan horse, or even screen recorder, etc., able to record a customer's keystrokes, redirect critical messages to a fake server, or to effectively "video record" the customer computer's screen (buffer). By using a variety of means, hackers are able to steal customer's identities. Even worse, local sessions can be hijacked and critical data modified.

Current solutions are largely aimed at improving the network communication security aspects (even though the actual network communication links are secure enough—as long as man-in-the-middle attacks and the like are prevented). However, the bigger problem lies in detecting and preventing attacks on communications within the client platform itself.

The shortcomings of the current systems apply to personal computer clients running browsers, as well as to personal hand-held digital assistants, 'smart-phones', and like network client devices.

Authentication

The traditional way to authenticate a customer is to provide a user name and password from the customer's client computer. However; this one-factor (e.g. user-id+password) authentication is not secure enough to protect either the customer or the institution from attack by malicious software or malware (including 'Trojan horses') using approaches such as man-in-the-middle (MITM), man-in-the-browser (MITB), and keystroke logging.

A man-in-the-middle (MITM) attack is one in which the attacker intercepts messages in a public key exchange and then retransmits them, substituting his own public key for the requested one, so that the two original parties still appear to be communicating with each other.

Man-in-the-browser (MITB) is a security attack where the perpetrator installs a Trojan horse on a victim's computer that is capable of modifying that customer's web commerce transactions as they occur in real time. A man-in-the-browser attack, unlike "phishing", can occur even when the victim enters the Uniform Resource Locator (URL) into the browser independently, without an external prompt. On the surface, commerce transactions take place normally with expected prompts and password requirements. An MITB attack is more difficult to prevent and disinfect, however, because the activity, instead of occurring in an interchange of messages over the public network, takes place between the customer and the security mechanisms within that customer's browser or client computer.

Two-factor authentication (TFA) is a security process in which the customer provides two means of identification, one of which may be a physical token, such as a card, security token or Universal Serial Bus (USB) device, and the other is typically something memorized, such as a security code. In this context, the two factors involved are sometimes spoken of as "something you have" and "something you know".

Although TFA improves the authentication security, its implementation tends to lead to a costly system. In many TFA systems today, the verification of both the physical token and the security code are conducted at a remote authentication server. This approach may require separate protocols to authenticate the physical token identifier and the customer security code. Since a centralized authentication server must deal with large volumes of on-line commerce transactions at the same time, this approach also results in scalability issues.

Transaction Authentication Numbers

In addition to the two factor authorization (TFA) systems mentioned earlier, some on-line banking services use a transaction authentication number (TAN). This takes the form of one time passwords (OTP) to authorize financial transactions. The list of TANs is therefore an additional factor. TANs provide another layer of security above and beyond traditional authentication.

An outline of how TANs function

The bank creates a set of unique TANs for the customer.

The customer picks up the list from the nearest bank branch. This is deemed to be secure.

The customer receives a password by mail to the customer's home address.

To log on to his/her account, the customer enters a user name and password as normal. This gives access to certain account information but the ability to process transactions is disabled.

To perform a transaction, the customer enters the request and "signs" the transaction by entering an unused TAN. The bank verifies the TAN submitted against the list of TANs they issued to the customer.

The TAN has now been consumed and will not be recognized for any further transactions.

If the TAN list is compromised, the customer may cancel it by notifying the bank.

In some scenarios TANs provide additional security by acting as another form of two-factor authentication. If the physical document containing the TANs is stolen, it will be of little use without the password. On the other hand, if a hacker cracks the customer's password, they cannot process transactions without the TAN.

The risk of compromising a TAN list can be reduced by using algorithms that generate TANs on-the-fly, based on a secret known by the bank and stored in the token or a smartcard inserted into the token Thus as increased security has become more critical, the customer is faced with increased complexity and the need to remember several procedures, not to mention user names, passwords, and other security codes or PINs, in order to carry out on line transactions, particularly commerce transactions. This has the effect of discouraging potential customers. In some cases, customers compromise the security of their transactions by reusing passwords, or writing them down, or worse, saving them in a file on their computer for ease of recall/reference.

Factors that require to be addressed include:
Customer perception of complexity;
Customer concerns with security;
Merchant reduction of loss by fraud;
Scalability;
Managing the process(es);
Balancing usability with security;
Minimizing impact on customer computing platform;
Minimizing impact on merchant computing platform; and
Migration from existing to new system.

What is needed is a further development of a flexible and simple identity protection and authentication system and method combined with transaction verification ability that could be used across several service providers, and would be able to accommodate complex identity relationships, and provide ways to eliminate or mitigate common security vulnerabilities, at the same time allowing a complex task to appear simpler to the customer, for example by hiding the complexity under a simple GUI.

There is also a need for stronger identity credentials providing better protection from tampering, and enabling safer high-value and sensitive transactions in areas such as health-care, and banking operations.

State of the art email communication is thus heavily burdened by nefarious activities such as SPAMMING, which describes sending unsolicited emails for advertising purposes, PHISHING, which describes spoofing of email sender's identities with the purpose of convincing the recipients to give up personal information such as credentials or banking information.

Current email communication are based on well-defined industry standard protocols recorded in Request For Comment (RFC) 821, 5321 (SMTP), 3501 (IMAP), 1939 (POP3) specifications. To enhance security of email communication, additional RFC specifications such as 6066 (Transport Layer Security) which describes an encrypted channel, and 6125 (X509) which describes Public Key Infrastructures for service identification over TLS have been added to the original descriptions of the Internet mail architecture (5598).

To lower the threat of malicious email communication, machine learning mechanisms such as spam filters have been proposed, which compare the textual contents against a learned database of textual contents known to be connected to malicious email. Such textual inspection is connected to a number of privacy concerns that might prevent application of this method in certain jurisdictions and organizations.

Other approaches to combat malicious email are based on dynamic black listing of email originating domains that have been identified as the source of malicious email.

However, such approaches are connected to a time-lag that allows a significant number of malicious emails to be sent out before the activity is flagged and the blacklisting filter triggers.

SUMMARY OF THE INVENTION

There is an object of the present invention to provide a system and method for securing electronic commerce transactions, in particular, a system and method for verifying the identity of a user and establishing a secure and mutually trusted connection within a public telecommunications network, which would avoid or mitigate shortcomings of the prior art as discussed above.

According to one aspect of the invention, there is provided a method for secure electronic transaction over a computer network, comprising:
at a trusted relationship profile server computer operably connected to the computer network:
(a) storing a unique identity of a trusted computing unit;
(b) generating a confirmation message regarding the unique identity of the trusted computing unit in response to a request from the trusted computing unit;

at a computer operably connected to the computer network and comprising a security proxy server, having computer readable instructions stored in a computer readable storage medium for execution by a processor:
(c) storing real credentials and local credentials of a customer in a secure vault;
(d) receiving the confirmation message and permitting a login process to be performed with the security proxy server using the local credentials, provided the confirmation message is valid; and
(e) replacing the local credentials submitted in the login process with the real credentials.

In the embodiments of the invention, the steps (c), (d) and (e) of the method are performed at a security proxy server computer, and the steps (c), (d) and (e) are performed at a computer of the customer comprising the security proxy server.

The step (a) of storing the unique identity of the trusted computing unit comprises storing a unique identity of a portable security device.

The method further comprises modifying a login password entered in a login process to a transaction server computer to produce a modified login password, based on the credentials of the portable security device. For example, the modified login password may comprise the login password appended with at least a part of the credentials of the portable security device.

The method further includes completing the login process to the transaction server computer with the modified login password.

The method further comprises completing the electronic transaction with the trusted computing unit at a transaction server using the real credentials.

In the method described above, the storing the unique identity of the portable security device comprises storing a unique identity of one or more of the following: a cellphone, a smart phone, and a personal portable computing device having a further computer readable storage medium having computer readable instructions stored thereon for executing by a further processor for communicating with the security proxy server.

According to another aspect of the invention, there is provided one or more computer readable storage media having computer readable instructions stored thereon for execution by a processor, for performing a method for secure electronic transaction over a computer network, comprising:
at a trusted relationship profile server computer operably connected to the computer network:
(a) storing a unique identity of a trusted computing unit;
(b) generating a confirmation message regarding the unique identity of the trusted computing unit in response to a request from the trusted computing unit;
at a computer comprising a security proxy server, having computer readable instructions stored in a computer readable storage medium for execution by a processor, the computer being operably connected to the computer network:
(c) storing real credentials and local credentials of a customer in a secure vault;
(d) receiving the confirmation message and permitting a login process to be performed with the security proxy server using the local credentials, provided the confirmation message is valid; and
(e) replacing the local credentials submitted in the login process with the real credentials.

According to yet another aspect of the invention, there is provided a computer-based system for providing security for an electronic transaction over a computer network, comprising:
a) a trusted relationship profile server computer operably connected to the computer network, the computer having a first processor and a first computer readable storage medium having computer readable instructions stored thereon for executing by the first processor, storing a unique identity of a trusted computing unit; the trusted relationship profile server computer having a message generator unit for generating a confirmation message regarding the unique identity of the trusted computing unit in response to a request from the trusted computing unit;
b) a security proxy server operably connected to the trusted computing unit, the security proxy server having a second computer readable storage medium having computer readable instructions stored thereon for executing by a second processor, comprising:
(i) a secure vault, storing real credentials and local credentials of a customer in the secure vault;
(ii) a message confirmation unit receiving the confirmation message from the message generator unit and permitting a login process to be performed with the security proxy server using the local credentials, provided the confirmation message is valid; and
(iii) a message parameter replacement unit for replacing the local credentials submitted in the login process with the real credentials.

In the system described above, a computer of the customer comprises the security proxy server; or the trusted computing unit comprises the security proxy server. The trusted computing unit includes a portable security device, for example, a flash memory device. The portable security device is configured to be connected to a computer of the customer.

The system further includes a transaction server computer operably connected to the computer network, the transaction server computer having a computer readable storage medium having computer readable instructions stored thereon for executing by a processor for completing the electronic transaction with the trusted computing unit.

The trusted computing unit comprises a portable computer-based device comprising one or more of the following: a cellphone, a smart phone, and a personal portable computing device having a further computer readable storage medium having computer readable instructions stored thereon for executing by a further processor for communicating with the security proxy server.

In the system described above, the secure vault further comprises computer readable instructions for storing credentials of the portable security device, and the security proxy server further comprises a password replacement unit, modifying a login password entered in a login process with the transaction server computer to produce a modified login password, based on the credentials of the portable security device. For example, the modified login password may comprise the login password appended with at least a part of the credentials of the portable security device.

The system further includes a transaction server computer operably connected to the computer network, the transaction server computer having a computer readable storage medium having computer readable instructions stored thereon for executing by a processor for completing the login process with the transaction server computer with the modified login password.

According to another aspect of the invention there is provided a method for authenticating a security device at a local network location for providing a secure access from the local network location to a remote network location, the method including: at the security device, having a global unique identifier (UID), a processor, a QR (Quick Response) code scanner, and a memory: obtaining, from the remote network location, a private security software, and causing the private security software to obtain a user selectable personal identification number (PIN), and the UID of the security device, the UID uniquely identifying the security device and being permanently associated with the security device; forwarding the PIN, the UID and the private security software to the remote network location for generating a user-personalized credential code using the PIN, the UID and the private security software, comprising encrypting the user-personalized credential code; at the security device, obtaining the user-personalized credential code from the remote network location, and verifying an authenticity of the user selectable PIN and the UID, without communicating over a network, comprising decrypting the user-personalized credential code; retrieving access credentials to the remote network location upon verifying the authenticity of the user selectable PIN and the UID; and performing a transaction authorization of a transaction using the security device and the QR code scanner.

In some embodiments of the method the performing the transaction authorization includes: sending a request for a QR (Quick Response) code from a transaction server to an authorization server at the remote network location; sending the QR code from the authorization server to the transaction server; sending the QR code to a user terminal from the transaction server and displaying the QR code on the user terminal; and scanning the QR code into the security device using the QR code scanner.

In some embodiments of the method the sending the request for the QR code from the transaction server to the authorization server includes: sending the request for the QR code from the transaction server to the authorization server over a service channel.

In some embodiments of the method the sending the QR code from the authorization server to the transaction server includes: sending the QR code from the authorization server to the transaction server over a service channel.

In some embodiments of the method the sending the QR code to the user terminal include: sending the QR code to the user terminal over a transaction channel.

In some embodiments of the method the performing the transaction authorization include: sending an OTA (One-Time-Authorization) code including the user-personalized credential code from the security device to an authorization server; verifying the OTA code at the authorization server using the user-personalized credential code; sending a result of the verifying of the OTA code to a transaction server; displaying the result of verifying of the OTA code on a user terminal; and provided the result of the verifying of the OTA code is affirmed, allowing the transaction to proceed.

In some embodiments of the method the sending the OTA code from the security device to the authorization server includes: sending the OTA code from the security device to the authorization server over a transaction notification channel.

In some embodiments of the method the sending the result of the verifying of the OTA code to the transaction server includes: sending the result of the verifying of the OTA code to the transaction server over a service channel.

In some embodiments of the method the verifying the OTA code at the authorization server including: verifying the OTA code at the authorization server using a server OTA code.

In some embodiments of the method the displaying the result of the verifying of the OTA code on the user terminal includes: sending the result of the verifying of the OTA code to the user terminal over a transaction channel.

According the still another aspect of the invention there is provided system for providing a secure access from a local network location to a remote network location, the system including: a remote server computer at the remote network location; and a security device at the local network location, the security device having a global unique identifier (UID) uniquely identifying the security device and permanently associated with the security device, a processor, a QR (Quick Response) code scanner, and a memory having computer readable instructions stored thereon, causing the processor to: obtain, from the remote server computer, a private security software; cause the private security software to obtain a user selectable personal identification number (PIN), and the UID of the security device; the UID uniquely identifying the security device and being permanently associated with the security device; and forward the PIN, the UID and the private security software to the remote server computer; the remote server computer being configured to generate a user-personalized credential code using the PIN, the UID and the private security software, and to encrypt the user-personalized credential code; the computer readable instructions being further configured to cause the processor to: obtain the user-personalized credential code from the remote server computer; verify an authenticity of the user selectable PIN and the UID, using the user-personalized credential code, and without communicating over a network, comprising decrypting the user-personalized credential code; retrieve access credentials to the remote network location upon verifying the authenticity of the user selectable PIN and the UID; and perform a transaction authorization of a transaction using the security device and the QR code scanner.

Some embodiments of the system further include: a transaction server configured to: send a request for a QR (Quick Response) code from the transaction server to an authorization server at the remote network location, wherein the authorization server is configured to: send the QR code from the authorization server to the transaction server; send the QR code to a user terminal from the transaction server and display the QR code on a user terminal; and wherein the security device is configured to scan the QR code into the security device using the QR code scanner.

In some embodiments of the system the transaction server is configure to: send the request for the QR code from the transaction server to the authorization server over a service channel.

In some embodiments of the system the authorization server is configured to: send the QR code from the authorization server to the transaction server over a service channel.

In some embodiments of the system the computer readable instructions configured to cause the processor to send the QR code to the user terminal are configured to cause the processor to: send the QR code to the user terminal over a transaction channel.

In some embodiments of the system the security device is further configure to: send an OTA (One-Time-Authorization) code including the user-personalized credential code from the security device to an authorization server, wherein the authorization server is configured to verify the OTA code at the authorization server using the user-personalized credential code, and send a result of the verify of the OTA code to a transaction server and display the result of the verify of the OTA code on a user terminal; and the transaction server is configure to: provided the result of the verify of the OTA code is affirmed, allow the transaction to proceed.

In some embodiments of the system the security device is configured to: send the OTA code from the security device to the authorization server over a transaction notification channel.

In some embodiments of the system the authorization server is configured to: send the result of the verify of the OTA code from the authorization server to the transaction server over a service channel.

In some embodiments of the system the authorization server is configured to: verify the OTA code at the authorization server using a server OTA code.

In some embodiments of the system the transaction server is configured to: send the result of the verify of the OTA code from the transaction server to the user terminal over a transaction channel.

In still more embodiments, there is provided a method for providing a secure access from a security device at a local network location to a remote network application, the method including:
at the security device, having a global unique identifier (UID), a processor, and a memory:
  obtaining, from a remote network location, a private security software, and causing the private security software to obtain a user selectable personal identification number (PIN), and the UID of the security device, the UID uniquely identifying the security device;
  forwarding the PIN, the UID and the private security software to the remote network location for generating a user-personalized credential code using the PIN, the UID and the private security software, comprising encrypting the user-personalized credential code;
at the security device, obtaining the user-personalized credential code from the remote network location, and verifying an authenticity of the user selectable PIN and the UID, without communicating over a network, comprising decrypting the user-personalized credential code;
retrieving access credentials to the remote network application upon verifying the authenticity of the user selectable PIN and the UID; and
authorizing access to the remote network application using the retrieved access credentials.

In some embodiments the authorizing access to the remote network application includes:
  sending a request for a QR (Quick Response) code from a transaction server to an authorization server at the remote network location;
  sending the QR code from the authorization server to the transaction server;
  sending the QR code to a user terminal from the transaction server and displaying the QR code on the user terminal; and
  scanning the QR code into the security device using a QR code scanner in the security device.

In some embodiments the authorizing access to the remote network application includes authorizing access to a sending server.

In some embodiments the authorizing access to the remote network application includes authorizing access to an email sending server.

In some embodiments the method includes:
  authorizing access of a user to a client application using the security device;
  adding an identity token to a message;
  sending the message from the client application to the sending server;
  verifying the message at the sending server using the token within the message;
  sending the message from the sending server to a receiving server; and
  verifying the message at the receiving server using the token within the message.

In some embodiments the authorizing access of the user to the client application includes:
  presenting a challenge to the user by the client application;
  receiving the challenge by the user using the security device;
  generating a response to the challenge; and
  verifying an identity of the user based on the response.

In some embodiments the adding the identity token to the message includes:
  calculating a hash of a body of the message.

In some embodiments the verifying the message at the sending server includes:
  checking for a presence of the token in the message;
  verifying the identity of the user based on the identity token in the message;
  adding to the message an indication that verifying the message has been carried out; and
  adding to the message an indication of a status of the verifying of the message.

In some embodiments the verifying the message at the receiving server includes:
  checking for a presence of the token in the message;
  verifying the identity of the user based on the identity token in the message;
  adding to the message an indication that verifying the message has been carried out; and
  adding to the message an indication of a status of the verifying of the message.

In some embodiments provided that the verifying of the message at the receiving server is successful the method includes sending the message from the receiving server to a receiver.

In yet still more embodiments there is provided a system for providing a secure access from a security device at a local network location to a remote network application, the system comprising:
  a remote server computer at the remote network location; and
  a security device at the local network location, the security device having a global unique identifier (UID), a processor, and a memory having computer readable instructions stored thereon, causing the processor to:
    obtain, from a remote network location, a private security software, and causing the private security software to obtain a user selectable personal identification number (PIN), and the UID of the security device, the UID uniquely identifying the security device;
    forward the PIN, the UID and the private security software to the remote network location for generating a user-personalized credential code using the PIN, the UID and the private security software, comprising encrypting the user-personalized credential code;

obtains, at the security device, the user-personalized credential code from the remote network location, and verifying an authenticity of the user selectable PIN and the UID, without communicating over a network, comprising decrypting the user-personalized credential code;

retrieve access credentials to the remote network application upon verifying the authenticity of the user selectable PIN and the UID; and authorize access to the remote network application using the retrieved access credentials.

In some embodiments the computer readable instructions further cause the processor to:

send a request for a QR (Quick Response) code from a transaction server to an authorization server at the remote network location;

send the QR code from the authorization server to the transaction server;

send the QR code to a user terminal from the transaction server and displaying the QR code on the user terminal; and scan the QR code into the security device using a QR code scanner in the security device.

In some embodiments the computer readable instructions that cause the processor to the authorize access to the remote network application further cause the processor to authorize access to a sending server.

In some embodiments the computer readable instructions that cause the processor to authorize access to the remote network application further cause the processor to authorize access to an email sending server.

In some embodiments the computer readable instructions further cause the processor to:

authorize access of a user to a client application using the security device; add an identity token to a message;

send the message from the client application to the sending server;

verify the message at the sending server using the token within the message;

send the message from the sending server to a receiving server; and verify the message at the receiving server using the token within the message.

In some embodiments the computer readable instructions that cause the processor to authorize access of the user to the client application further cause the processor to:

present a challenge to the user by the client application;

receive the challenge by the user using the security device;

generate a response to the challenge; and verify an identity of the user based on the response.

In some embodiments the computer readable instructions that cause the processor to add the identity token to the message further cause the processor to:

calculating a hash of a body of the message.

In some embodiments the computer readable instructions that cause the processor to verify the message at the sending server further cause the processor to:

check for a presence of the token in the message;

verify the identity of the user based on the identity token in the message;

add to the message an indication that verifying the message has been carried out; and add to the message an indication of a status of the verifying of the message.

In some embodiments the computer readable instructions that cause the processor to verify the message at the receiving server further cause the processor to:

check for a presence of the token in the message;

verify the identity of the user based on the identity token in the message;

add to the message an indication that verifying the message has been carried out; and add to the message an indication of a status of the verifying of the message.

In some embodiments the computer readable instructions further cause the processor to:

provided that the message at the receiving server is successful verified:

send the message from the receiving server to a receiver.

Thus, an improved method and system for verifying the identity of a user and establishing a secure and mutually trusted connection within a public telecommunications network have been provided.

BRIEF DESCRIPTION OF THE DRAWINGS

Illustrative embodiments of the invention will be described with reference to the drawings, in which.

Figure 1A:
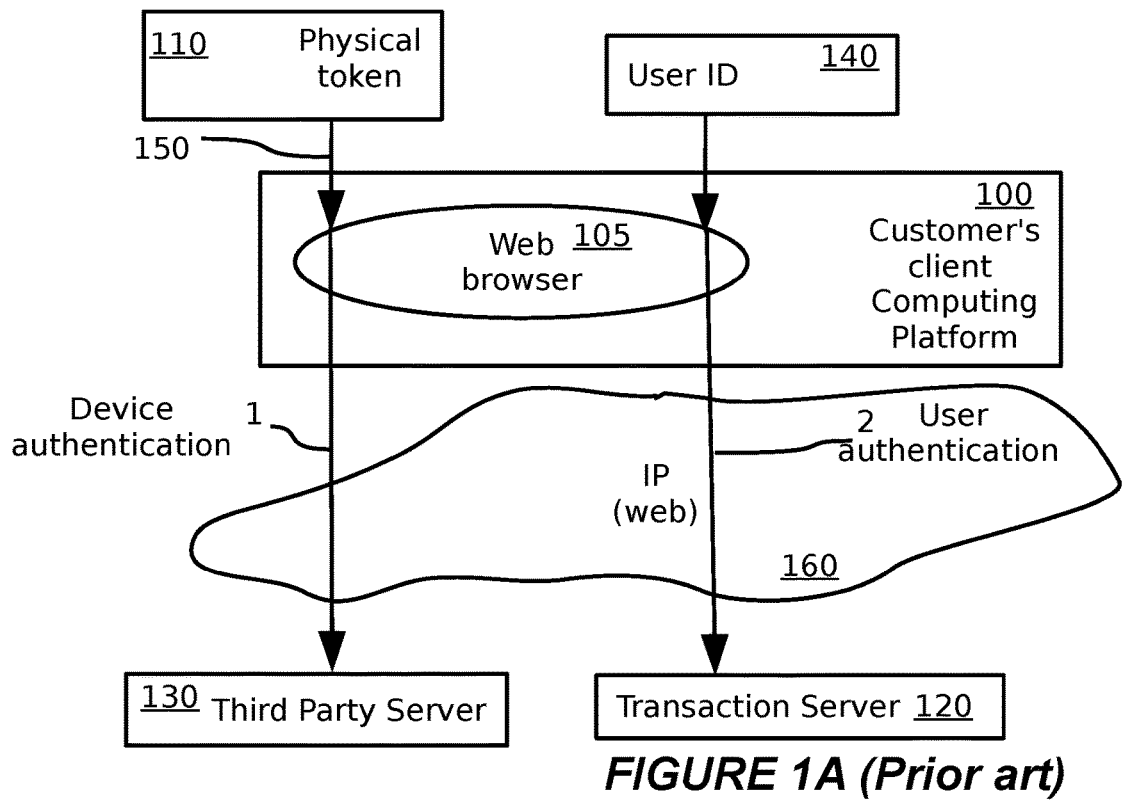
FIG. 1A depicts a prior art implementation of an authorization system.

The accompanying drawings are included to provide a further understanding of the present invention and are incorporated in and constitute a part of this specification. The drawings illustrate some embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF EMBODIMENTS THE INVENTION

All trademarks herein are property of their respective owners.

Throughout the following description the use of Transport Layer Security (TLS) and its predecessor, Secure Sockets Layer (SSL), or equivalent capabilities, is assumed. These are cryptographic-based protocols that provide for secure communications on the Internet for web browsing and other forms of data transfer. Those of ordinary skill in the art will appreciate that embodiments of the invention may make use of these (or equivalent) secure communication protocols, although they are not necessary in understanding the invention. Their detailed operation is therefore omitted.

In the following description, some messages between elements of the system, for example, between servers and customers' computers pertaining to the request for and display of web pages, are omitted in the interests of clarity.

The present invention may be embodied in a variety of computer hardware and software configurations. The term server refers to a computer-based system having a processor and computer readable storage medium having computer readable instructions stored thereon for executing modules of the present invention. The term "computer-based" as used herein, refers to any machine or apparatus that is capable of accepting, performing logic operations on, storing, or displaying data, and includes without limitation processors and memory; the term "computer software," or "software," refers to any set of instructions operable to cause computer hardware to perform an operation. A "computer," as that term is used herein, includes without limitation any useful combination of hardware and software, e.g. a general purpose or a specialized computer, and a "computer program" or "program" includes without limitation any software operable to cause computer hardware to accept, perform logic operations on, store, or display data. A computer program is comprised of a plurality of smaller programming units, including without limitation subroutines, modules, functions, methods, and procedures having computer readable instructions stored in a computer readable storage medium such as memory, DVD, CD-ROM or else, for execution by a processor. Thus, the functions of the present invention may be distributed among a plurality of computer-based systems and computer programs.

Figure 5:
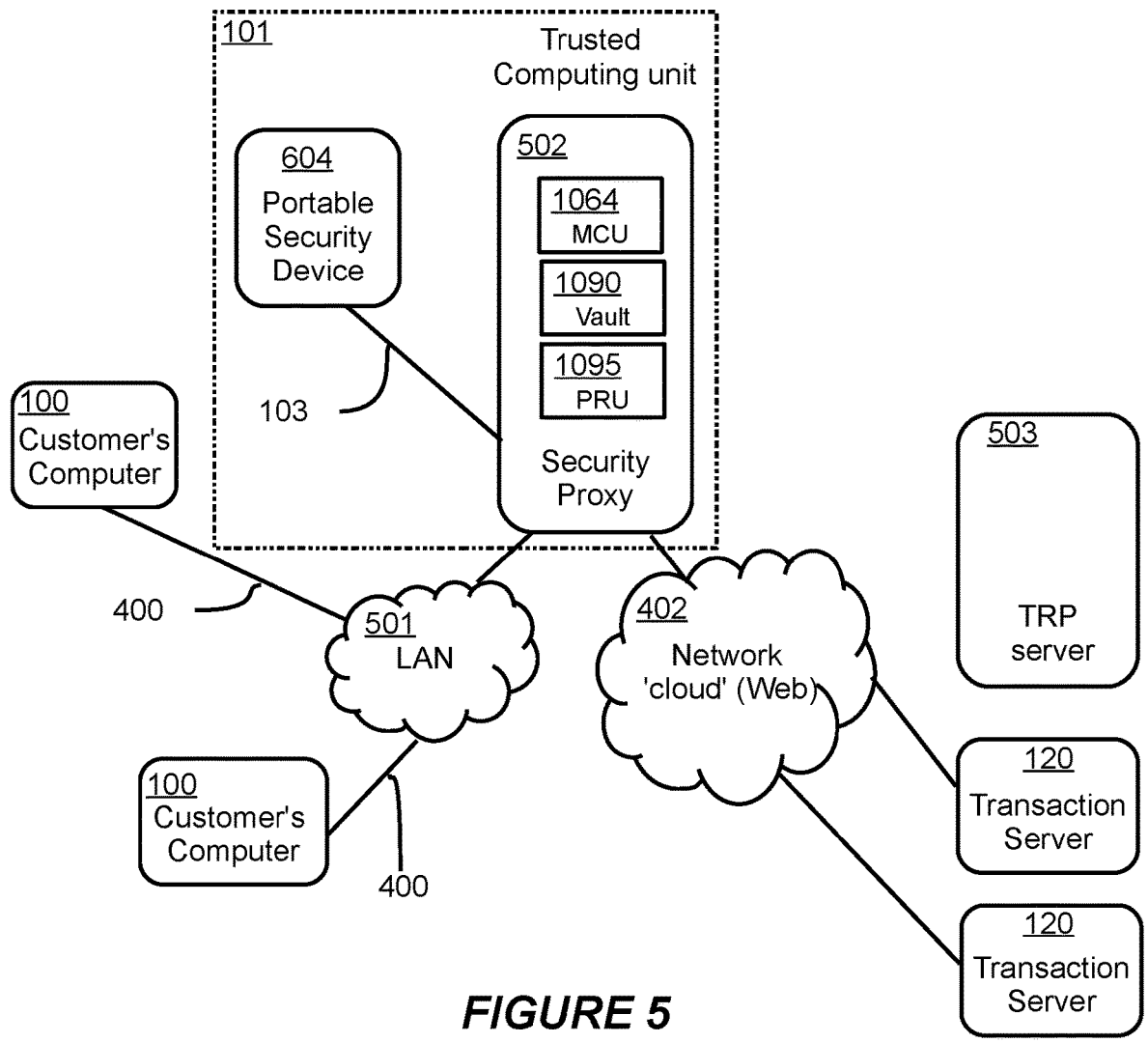
FIGS. 5, 5A and 5B illustrate an architecture in which a system for securing electronic transactions using embodiments of the invention has been implemented.
Figure 10:
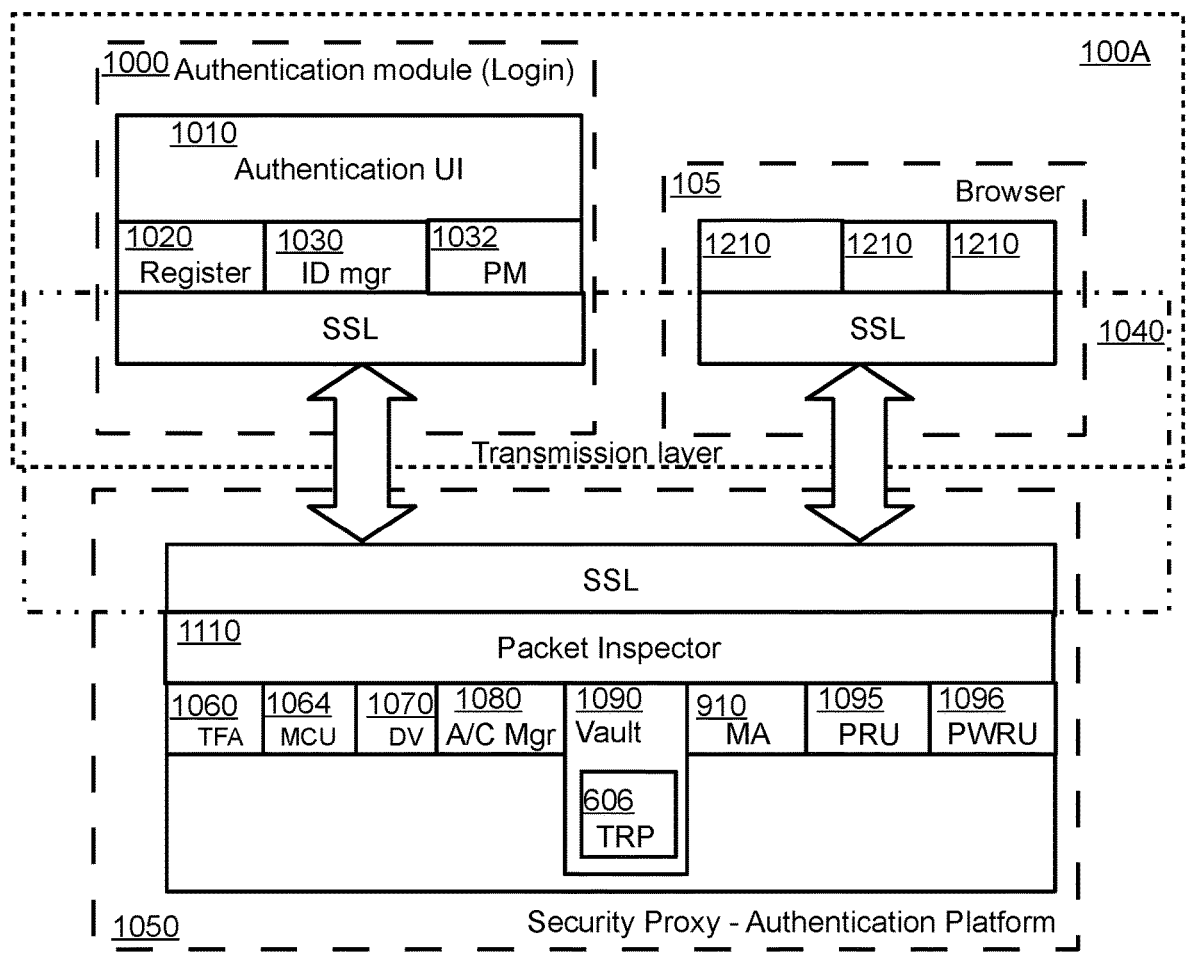
FIG. 10 shows details of parts of the architecture in which a system for securing electronic transactions using embodiments of the invention has been implemented.

The systems and architectures illustrated in the FIGS. 5, 10 and 11 comprise computer program modules having computer readable/executable instructions stored in a computer readable storage medium such as memory to be executed on one or more computer-based systems, each having a processor. Alternatively, the modules may be implemented in hardware.

For comparison with the present invention, we first describe one instance of the prior art systems, illustrated by FIG. 1A. Typically such systems comprise a customer's client computing platform or device (customer's computer) 100, containing software, including a web browser 105, to permit communication with a web server (also called a Transaction Server) computer 120, also to be referred to as Transaction Server 120, maintained by an 'on-line service provider', sometimes referred to as 'institution', 'enterprise' or 'merchant'. An institution may include on-line institutions that require secure, authenticated and trusted communication between the institution and its customers. Such institutions may include, for example, a bank, health care provider, or other sites with sensitive or personal information. A merchant may provide goods and/or services in exchange for payment. The browser 105 is also able to communicate with a third party web server computer 130, capable of authenticating a physical token 110, which can be operably connected to the client computing platform 100 over a local communications link 150. It will be appreciated that the physical token 110 does not need to be physically connected to the client computing platform 100. Instead, the authentication information of the physical token 110 may be input into the client computing platform 100 in other ways, such as using wireless communications. Communication between the client computing platform 100 and the web servers 120, 130 takes place over a network, such as the Internet 160, using an appropriate communication protocol, for example, the Internet Protocol (IP). The customer's identity is authenticated by the customer inputting a personal identification number (PIN)—the User ID 140.

Figure 1B:
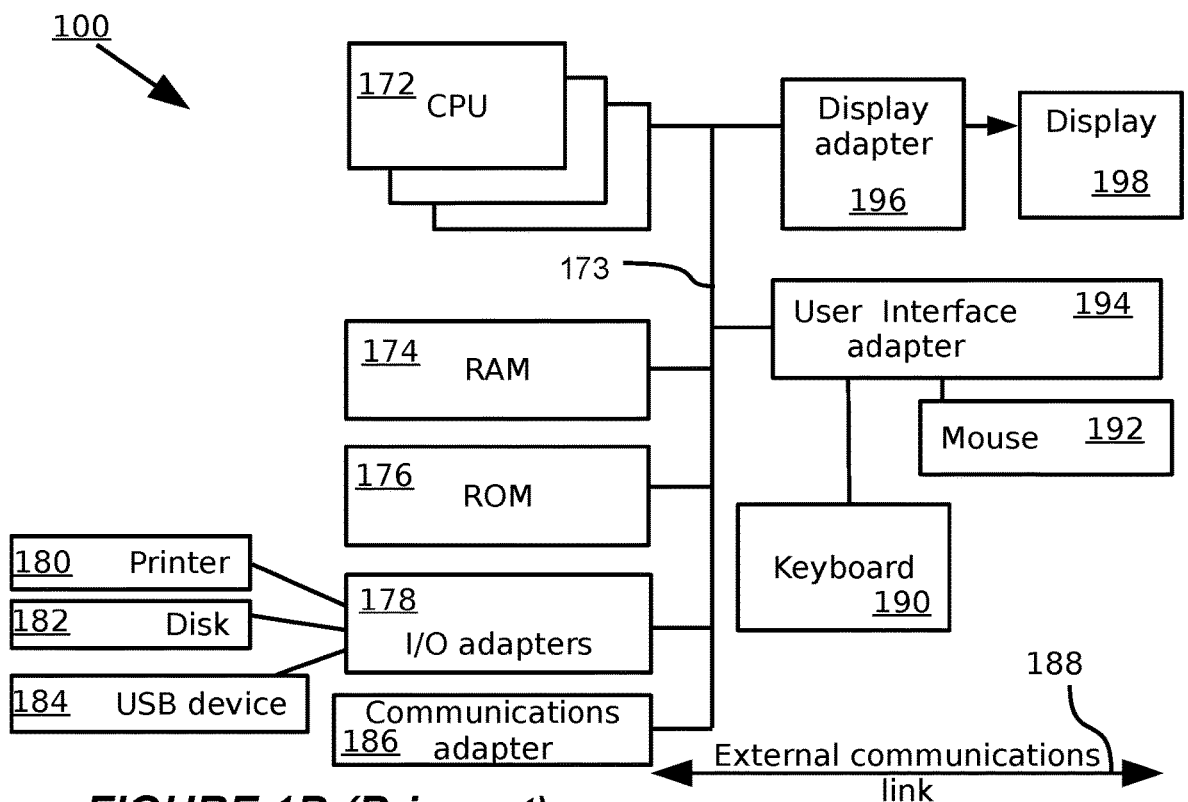
FIG. 1B depicts a prior art implementation of a client computing platform.

FIG. 1B depicts a typical prior art computer architecture of a customer's computing platform, in which embodiments of the present invention may be implemented or used. The client computing platform 100 contains one or more processors (CPU) 172 connected to an internal system bus 173, which interconnects random access memory (RAM) 174, read-only memory 176, and an input/output adapter 178, which supports various I/O devices, such as printer 180, disk units 182, USB devices 184, or other devices not shown, such as an audio output system, etc. System bus 173 also connects with a communication adapter 186 that provides access to external communications link 188. User interface adapter 194 connects various user devices, such as keyboard 190 and mouse 192, or other devices not shown, such as a touch screen, stylus, or microphone, to the system bus 173. Display adapter 196 connects the system bus 173 to display device 198.

Those of ordinary skill in the art will appreciate that the hardware in FIG. 1B may vary depending on the system implementation. For example, the system may have one or more processors, and one or more types of volatile and non-volatile memory. Other peripheral devices may be used in addition to or in place of the hardware depicted in FIG. 1B. The depicted examples are not meant to imply architectural limitations with respect to the present invention.

Embodiments of the present invention may be implemented in a variety of software environments. An operating system may be used to control program execution within each platform or device. For example, the computing platform 100 may run one, or more, different operating systems, such as Windows®, Mac OS®, Linux®, Android®, Web OS®. The client computing platform 100 may include, or be based on, a simple Java® run-time environment. A representative computer platform may include a browser such as Internet Explorer®, Firefox®, Safari®, Opera®, or Chrome®, which are well known software applications for accessing hypertext documents in a variety of formats including text files, graphics files, word processing files, Extensible Markup Language (XML), Hypertext Markup Language (HTML), Hand-held Device Markup Language (HDML), and various other formats and types of files.

Figure 2:
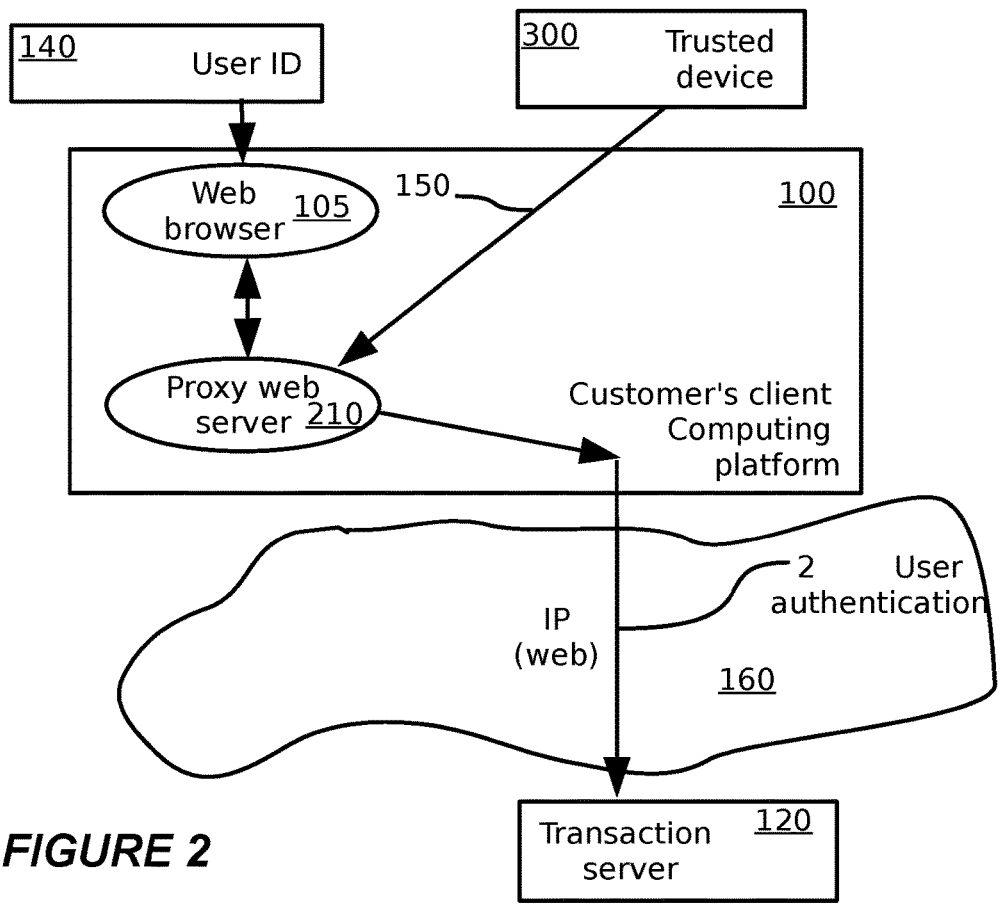
FIG. 2 illustrates an embodiment of a previous invention, using a physical trusted device.

A prior application to the same assignee, Ser. No. 12/639, 464 filed on Dec. 16, 2009 for "NETWORK TRANSACTION VERIFICATION AND AUTHENTICATION", the entire contents of which are incorporated herein by reference, describes a two-level security verification system, which makes use of the architecture illustrated in FIG. 2. In FIG. 2, in contrast with the prior art shown in FIG. 1A, there is no need for a third party server 130 for authentication of the physical token 110. Instead, the trusted device 300 has attributes and features, which differentiate it from the physical token 110 used in earlier systems. The trusted device 300 includes a trusted proxy service, which may be implemented by code stored in a memory of the trusted device 300. When the trusted proxy service is implemented, for example, by executing the code of the trusted proxy service by the processor 172 of the client computing platform 100, it configures the client computing platform 100 to provide a proxy web server 210. The client computing platform 100 also includes a web browser 105 or other means for accessing a network location, such as an institution web (transaction) server 120, maintained by an on-line service institution. A User ID 140 may be received at the browser 105 and used to authenticate a customer's access to the trusted device 300. The trusted device 300 may be connected to the client computing platform 100 over a local communication link 150, such as a wired or wireless connection. The client computing platform may be connected to the institution web server via a network 160. The browser 105 accesses the institution web server through the proxy web server 210 in order to provide a trusted communication path between the customer's client computing platform 100 and the institution transaction server 120.

Figure 3:
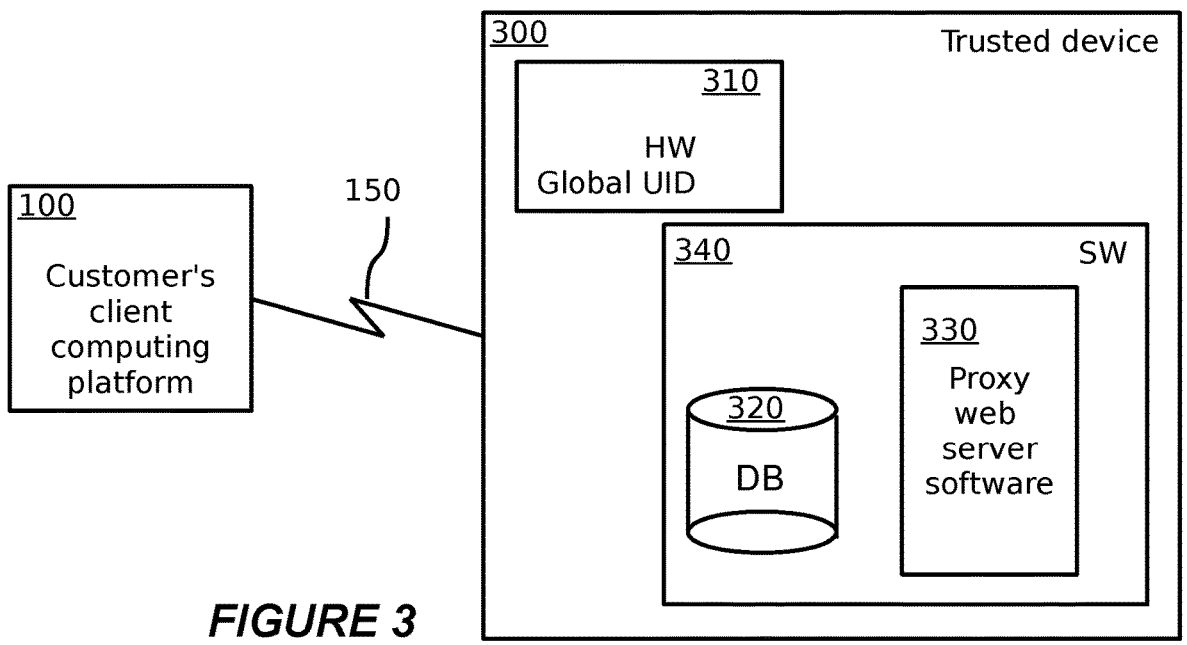
FIG. 3 shows a trusted device for use in an embodiment of the previous invention.

A block diagram of a trusted security device 300 described in the parent patent application, Ser. No. 12/639,464 filed on Dec. 16, 2009, cited above, is schematically shown in FIG. 3. A Global Unique ID (UID) 310 may be created and stored in the device 300. The UID 310 may be stored in encrypted form. The UID 310 is used to uniquely identify the trusted security device 300, in order to ensure that a customer physically has the trusted security device 300 when accessing the institution web server.

In the parent patent application Ser. No. 12/639,464 cited above, the Global UID 310 is generated by an algorithm that is capable of taking device identity information, such as information that is hard-coded into computing hardware of the trusted security device 300, and possibly other data, for example, a customer selected personal identifier (PIN), as its input, and producing the UID as its output. Various software and data elements may also be present in the trusted device 300, including a database 320 and trusted proxy service software 330 that implement the proxy web server 340 when executed. These elements may be present as data and instructions stored in a memory of the trusted device. The trusted device 300 is logically connectible to the client computing platform 100 over the local communication link 150. The local communication link 150 is a Universal Serial Bus (USB) interface, although other connections are possible.

The database 320 and the trusted proxy service software 330 may be used to store access credentials of a network location of an institution and access the network location on behalf of the browser 105 using the stored access credentials. As a result, a customer does not need to enter their institution access credentials into the browser 105.

Embodiments of the present invention further improve and expand on those earlier implementations of the parent patent application Ser. No. 12/639,464 filed on Dec. 16, 2009, cited above. The present application protects commerce transactions between customers and on-line service providers, in which there is a two-way exchange requiring both authentication and the offered level of security/protection. The effect is to extend the trust boundary from the Internet into the end user device, and in effect, to the user interface.

One analogy is an ATM, in which that device serves as a trusted user interface between the customer and the enterprise (e.g. a Bank). However, in the present invention, the interface requires no specialized equipment, but rather the trust is provided through functional modules, which conveniently may be implemented in software, and through interaction between the functional modules.

Note that customers may be internal to an enterprise, and commerce transactions may not have direct monetary value, but nonetheless be of high value to the enterprise.

Securing commerce transactions of this nature makes use of "Identity and Trust as a Service" (ID/TaaS). Generally, ID/TaaS protects electronic transactions between the customer and the enterprise, relying on a security service provider (which may be the enterprise itself) for specific trust-improving functions. Such transactions require identity data that is managed by the security service provider. The trust-improving functions include, but are not limited to, registration, identity verification, authentication, management of credentials and their life-cycle, and, management of roles and entitlement. Some or all of these functions may be provided by a third-party.

The embodiments of the present invention provide for varying levels of trust (or security) protection.

Figure 4:
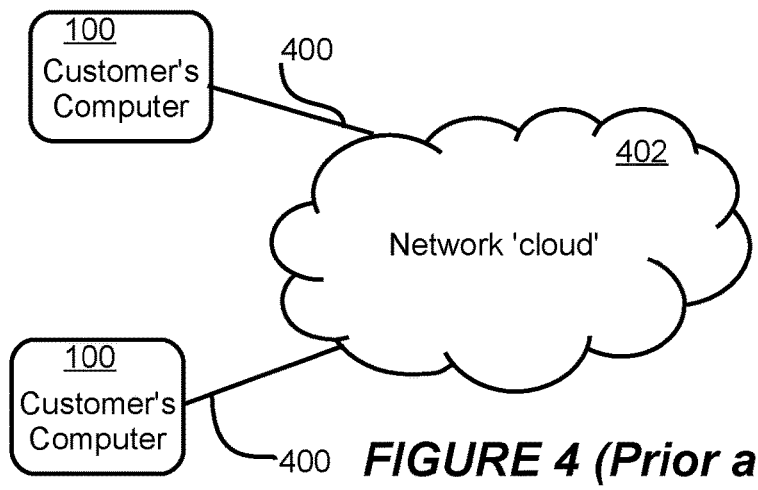
FIG. 4 shows the prior art situation wherein the 'weak link' extends from the network to the user.

In the FIG. 4, a typical prior art situation is illustrated, where entire local connections 400 from the customer computers 100 to the network 'cloud', web, or public network 402, constitute "weak links" in terms of their vulnerability to the various forms of attack on security as discussed earlier.

Secure Access

FIG. 5 illustrates embodiments of the invention where security and authentication functions are provided by a Security Proxy (SP) 502 in conjunction with a Trusted Relationship Profile Server (TRPS) 503 computer having a processor and memory, also to be referred to as TRP server 503, that is under the control of a security service provider. In the embodiments of the invention, the term Security Proxy 502 will be used for both a security proxy computer having a processor and memory, and for security proxy software instructions stored in a computer readable memory for execution by a processor. A trusted portable security device 604 is operably connected to the Security Proxy (SP) 502 to form a trusted computing unit 101. In some embodiments the portable security device 604 is a flash memory device, but other technologies are possible. In some embodiments a USB link 103 is used to connect the trusted portable security device 604, but other means are possible. The Security Proxy (SP) 502 provides features somewhat analogous to those in a firewall, but in the security domain, and may be implemented at a router or other local access point, or, in some embodiments, in the customer's portable computer-based device, which will be referred to as the Trusted Personal Device, TPD, in this application. The security proxy 502 comprises a Vault 1090, to be also referred to as Secure Vault 1090, a Message Checking Unit 1064, and a Password replacement unit 1095, each comprising computer readable instructions stored in a computer readable storage medium for execution by a processor. The Security Proxy 502, together with the Portable security device 604 constitute a Trusted Computing Unit 101. The "weak links" 400 are now restricted to the internal links between the security proxy 502 and the customer's computers 100 across the LAN 501. We call this Secure Access.

Connections are made across the web 402 via the Security Proxy (SP) 502 to Transaction Servers (TS) 120.

Figure 5A:
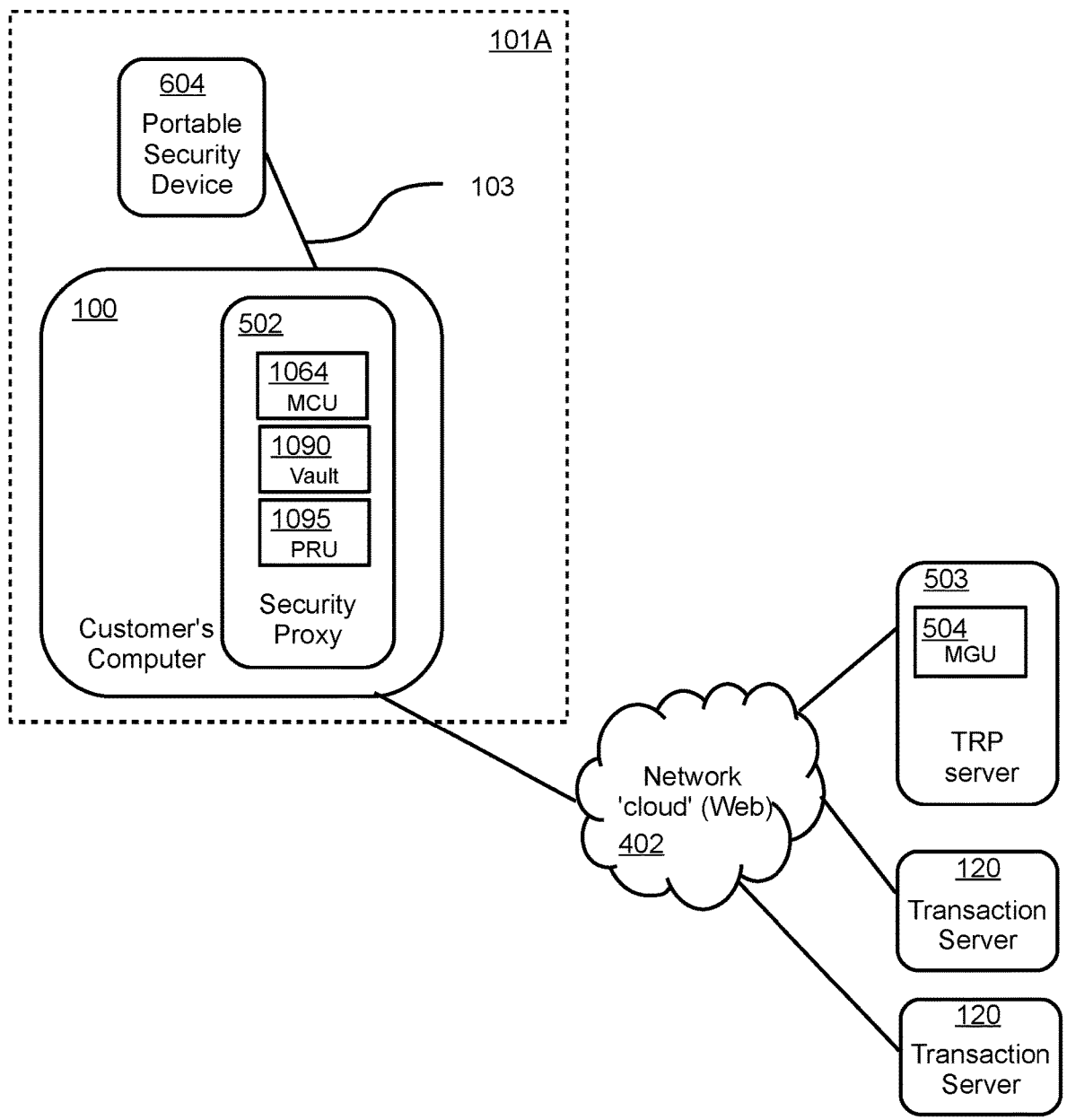
Figure 5B:
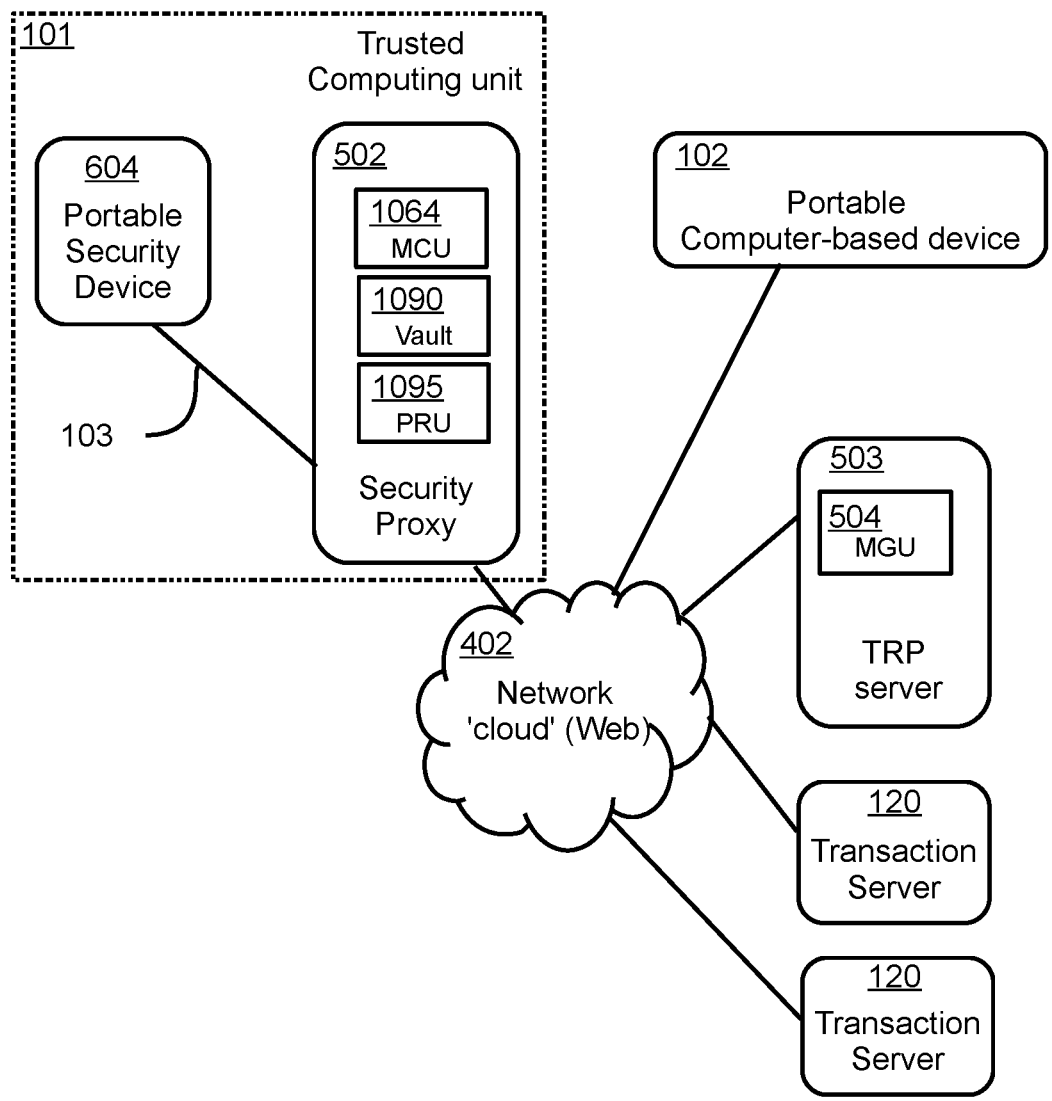

In some embodiments, illustrated in FIGS. 5A and 5B, the various elements are configured differently.

In FIG. 5A, the customer's network is reduced to a single computer 101A, operably connected to the Web 402. The customer's computer 100 contains the security proxy 502 software stored in a memory of the computer 100, and is operably connected to the Portable security device 604, which together become the trusted computing unit 101 which is connected via a modem or router (not shown) to the web 402, and thereby carry out transactions with the Transaction Server 120, and interact with the TRP server 503 and a message generating unit 504 comprising computer readable instructions stored in a computer readable storage medium for execution by a processor.

In FIG. 5B, the customer's Portable Computer-based device 102, such as cell phone, smart phone or similar device having a processor and a computer readable storage medium, is used to access the Security Proxy 502 (and hence the Trusted Computing Unit 101), and thereby carry out transactions with the Transaction Server computer 120 having a processor and memory, to be also referred to as Transaction server 120, and interact with the TRP server 503 and the message generating unit 504 over the web 402. In this configuration some elements of the trusted computing unit 101 may reside in the portable computer-based device 102, making use of the SSL capabilities to secure the connections across the Web 402. In some embodiments the unique identity of the Portable Computer-based device 102 may replace the unique identity of the Portable Security device 604 as illustrated in the following descriptions.

In the following descriptions, the invention is described with reference to FIG. 5, but those skilled the art will recognize that the description will also be applicable to configurations of FIGS. 5A and 5B, as well as other like combinations.

As mentioned above, it will be recognized that the Security Proxy 502 may be either a computer, having a processor and memory, or a computer-readable storage memory having instructions stored thereon for execution by a processor.

Enhanced Network Secure Access

A further level of security provides for enhanced protection during the completion of certain high-value on-line transactions. In this context high-value refers to transactions whose value is agreed by the parties involved to be worth extra protection. In the following a transaction using a credit card is described, but other like identity credentials might be used.

Referring once more to FIG. 5, embodiments of the invention introduce functions at the Security Proxy (SP) 502 that intercept and modify messages passed between the LAN 501 and the web 402. The SP 502 performs the functions of Secure Access described above, but in addition processes messages sent between the user browser (not shown) in the trusted computing unit 101 and a Transaction Server (TS) 120, typically run by a bank, vendor or merchant. In embodiments of the invention no changes are required at the Transaction Server 120, although some optional enhancements may be made. The principle of replacing "real" identity credential data, in this case credit card numbers, with internally generated local versions is extended. This Enhanced Network Secure Access provides advantages similar to those for Secure Access, extending them to commerce transactions.

Thus, in both scenarios the Security Proxy 502 and the Trusted Relationship Profile Server computer 503 provide a trustworthy intermediary service for transactions over the public network.

The trusted relationship profile server computer 503 knows a unique identity of a trusted computing unit 101 and has a message generator unit 504 that generates a confirmation message regarding the unique identity of the trusted computing unit 101 to respond to a request from the trusted computing unit 101. The security proxy computer 502 has a secure vault 1090 in which are stored real identity credentials and the corresponding local identity credentials. The SP 502 also has a message confirmation unit 1064 that receives the confirmation message from the message generator unit 504 and permits a login process to be performed with the secure proxy 502 using local identity credentials provided the confirmation message is valid. A message parameter replacement unit 1095 in the security proxy 502 replaces the local identity credentials submitted in the login process with the real identity credentials.

More details of the embodiments of the present invention are now described with reference to the FIG. 5, as well as FIGS. 6 and 7, which show message sequence diagrams, and FIGS. 6A and 7A, which show flowcharts of the various phases of a transaction:

Registration (FIGS. 5, 6 and 6A)
Address/Location updating (FIGS. 7 and 7A)
Secure commerce transactions over the public network Once the necessary software modules of the invention are installed in the customer's computer and other computer-based elements (such as router, laptop, USB drives, portable computer-based devices, and other digital devices) within the LAN 501 to add the Security Proxy (SP) 502 and related functionality, the Security Proxy (SP) 502 must be made aware of the various security credentials and other data (local and real) used to complete transactions, by initially adding them into the account manager and the secure vault. The process involves the creation of a Web Account, which contains local and real data as well as providing for any relationships between such data, for example:

a local identity (also known as a global user identity or user name),
a local password (also known as a global password),
unique identity data stored in customer devices, including simple USB portable security devices and Trusted Personal Devices
translation to (real ID, real password) from (local ID, local password),
translation to real customer identity credential information from local customer identity credential information.

The Web Account therefore provides the information needed to replace local ID and password with the real ID and password. It also makes use of more credential-related data in the form of service names and identity credential (e.g. credit card) information as described in embodiments of the invention. In some embodiments multiple customers are supported, where each customer may have a Web Account.

Registration

The registration phase is described with reference to FIGS. 5, 6 and 6A. Registration is a communication interaction involving the customer's browser 105 (implemented in the customers' computer 100), the Security Proxy (SP) 502, a Trusted Relationship Profile Server (TRPS) 503, and an operably connected trusted portable security device 604 (within the trusted computing unit 101), capable of storing data. This interaction is required before a first secure transaction with a Transaction Server 120. Messages are carried over the LAN 501 and the web 402 as appropriate. Other similar communication interactions may take place later to allow for changes to the identity credentials, for example if the customer changes a computing platform or portable security device 604. These changes are much less frequently performed than the transaction phase, and this allows implementation without the daunting scaling issues of existing secure transaction services.

Note that registration is not possible using remote access.

Figure 6:
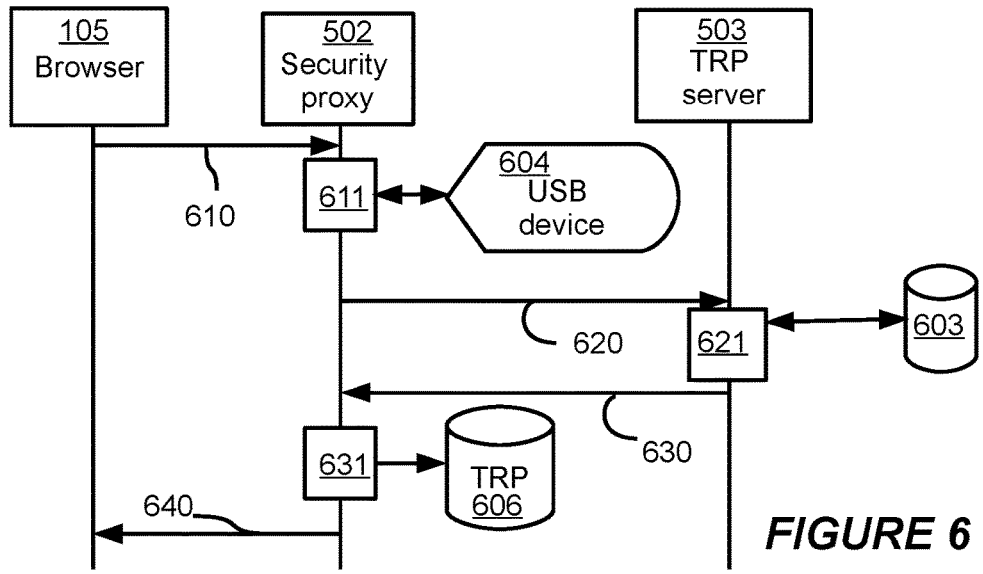
FIG. 6 shows a message sequence diagram for the registration phase of embodiments of the present invention.
Figure 6A:
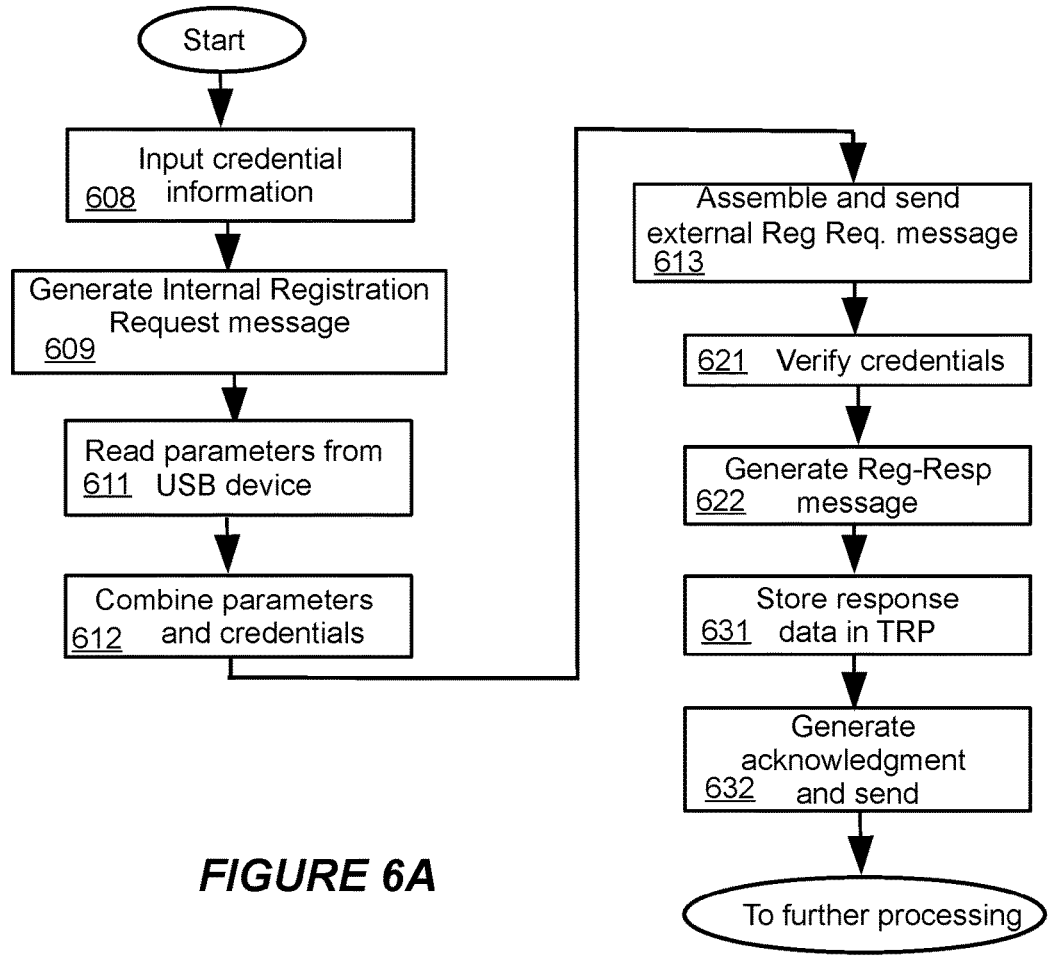
FIG. 6A shows a flowchart for the registration phase of embodiments of the present invention.

The message sequence diagram of FIG. 6 and flowchart of FIG. 6A show how information is transferred between the customer's browser or equivalent application 105, the Security Proxy (SP) 502 and a Trusted Relationship Profile Server (TRPS) computer 503, also to be referred to as a TRP server 503. For illustrative purposes, the procedures are described using a Registration module (not shown) within the SP 502 stored in a computer readable storage medium, and a USB connected trusted portable security device 604, although other environments and devices may be used, including but not limited to a web browser applet, a security-enabled smart-phone, a desktop computer, a laptop computer or any digital storage device. In such environments and devices, the portable security device may include a general purpose or specialized computer having a processor and computer readable storage medium having computer readable instructions stored thereon for executing modules of the present invention.

The process starts by the customer connecting the portable security device 604 containing identifying data to the Security Proxy 502, and, using a small application (not shown) in the Customer's computer 100 inputting some other sign-on credentials. Once an HTTP-based (or equivalent, such as HTTPS-based) session has been established between the Registration module in the SP 502 and the TRPS 503, the customer is asked to input their credentials 608, and an incomplete internal Registration-Request message 610 is generated 609 containing the sign-on credentials. The Security Proxy SP 502 intercepts the message 610 and accesses hardware information by reading 611 information in the USB trusted portable security device 604. The information from the USB trusted portable security device 604 is combined 612 with the sign-on credentials from the message 610, and a full external Registration-Request message is assembled 613 and passed 620 to the Trusted Relationship Profile Server 503.

At the Trusted Relationship Profile Server 503, the credentials within the message 620 are examined and verified 621 by comparison with the registration key in a database 603. An external Registration-Response message is generated 622 and forwarded 630 to the SP 502. Information from the response is stored 631 into a local Trusted Relationship Profile (TRP) 606 for future use, and an internal Registration-Response message generated 632 and sent 640 to the Registration module within the browser 105 to confirm success. The database 603, the Trusted Relationship Profile 606 and the registration module within the browser 105 comprise computer readable instructions stored in a computer readable storage medium for execution by a processor.

At this point the Secure Access is ready for use by the customer, in both local and remote locations, through the Security Proxy (SP) 502.

Address/Location Updating

However, in some Internet environments, particularly domestic ones, a further step is required in order to ensure that the IP address of the SP 502 is kept updated since it is subject to change. In contrast, the TRPS 503 is located in the network cloud (or web) 402 with a static public address and domain name. Therefore the TRPS 503 naturally becomes the co-ordination point for a remote customer and associated Secure Access point or Security Proxy (SP) 502. For illustrative purposes, one solution is described below. Other solutions are also possible.

In some embodiments a Device Identity is generated by the Security Proxy 502. This Device Identity relates a particular combination of credentials with the Transaction Server 120 that is assigned a customer-generated Service Name. Such a combination of Service Name and Device Identity constitutes a Security Subscription. A Security Subscription is generated for each device/transaction server pair.

Figure 7:
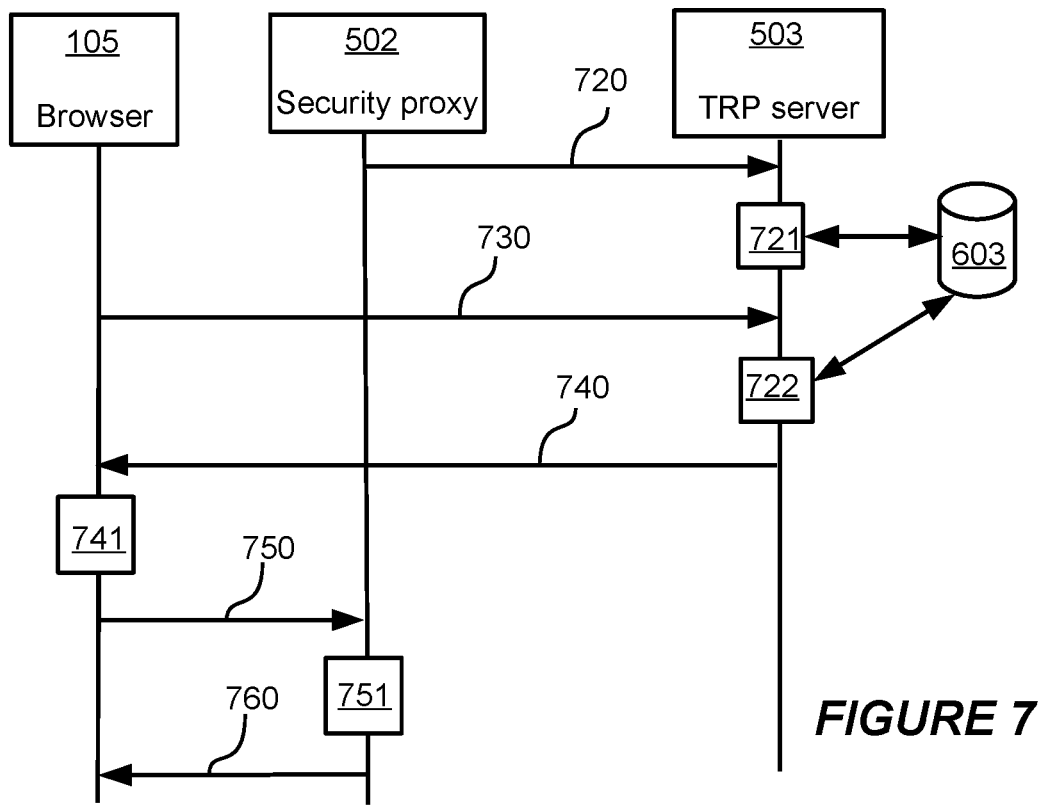
FIG. 7 shows a message sequence diagram for the IP address updating phase of the embodiments of the present invention.
Figure 7A:
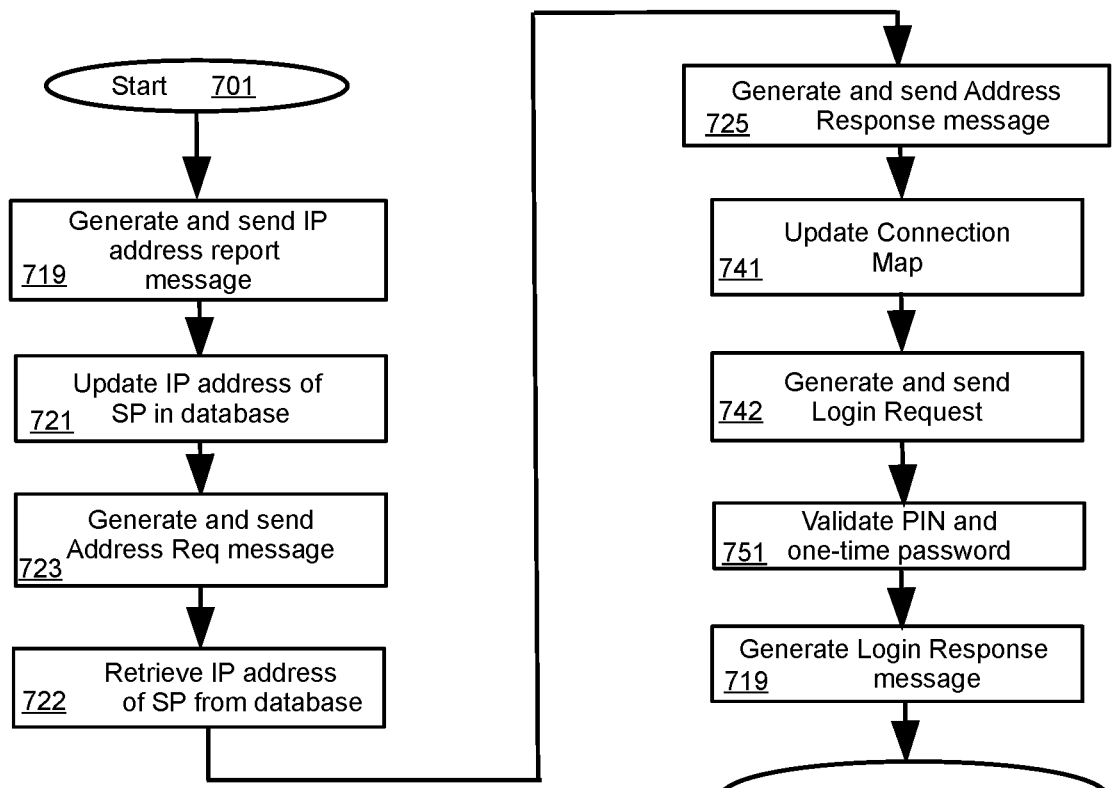
FIG. 7A shows a flowchart for the IP address updating phase of the embodiments of the present invention.

As shown in the FIGS. 7 and 7A, the SP 502 initiates 701 the process, periodically generating 719 and sending an Address-Report message 720, for each Security Subscription, containing the Device Identity and the customer generated Service Name to the TRPS 503. The periodicity is not critical, but must be sufficiently frequent to reduce the chances of the IP address update being unacceptably delayed to a very low level. The process should be initiated whenever the IP link is restarted; the subsequent periodicity is configurable.

By its nature, the message header of the Address-Report message 720 contains the (WAN IP) address of the SP 502. TRPS 503 uses an address updating module 721 to access the record for the SP 502 within its database 603, associating it using the Service Name and the Security Proxy Device Identity, and updates the Security Proxy IP address within its database 603. The Service Name is selected to be significant to the customer. Typically it is formatted like a Domain Name to further hamper and confuse any attempt to capture the information at the user computer.

Later, the customer (through an application, typically a browser 105) generates 723 an Address-Request message 730 to the TRPS 503. The message 730 contains the customer-generated Service Name (alias). The identity of the SP 502 is known from the Service Name and its Device Identity, and the TRPS 503 uses an IP address retrieval module 722 to access the database 603 to provide the required real IP address of the SP 502 to generate 725 an Address-Response message 740.

The trusted computing unit 101 uses a connection map updating module 741 to update a map of Connections (not shown), which relates Service Name to the updated SP IP address. Now it can start to establish the connection to the SP 502 within the LAN environment; this is the 'home' location. A Login Request message 750 containing the device PIN and a One Time Password is generated 742 by the browser 105, and the SP 502 uses a validation module 751 to confirm their validity and generate 719 a corresponding Login Response message 760.

The following cases, referring to FIG. 5, give further examples of Secure Web Access features and advantages of embodiments of the present invention.

For simple secure web access, the customer is required to login to the Security Proxy 502. This process requires the customer to be in possession of the registered portable computer-based device (not shown in FIG. 5, but designated by reference numeral 102 in FIG. 5B) such as a laptop, smart-phone, etc. known to the Security Proxy 502, and connected to the Security Proxy 502 over the LAN 501. Only after the login is successful can the customer continue their secure web access through the Secure Access point namely the Security Proxy 502 and associated Portable Security device 604 which comprise a Trusted Computing unit 101.

In some embodiments of the invention the user accesses the LAN 501 over the web 402 from a portable computer-based device (not shown), such as a smart-phone, connecting first with the Trusted Relationship Profile Server 503 to obtain the IP address of the LAN 501, connecting to the Trusted Computing Unit 101 and, after authentication, performing subsequent transactions as though connected directly to the LAN 501. In these embodiments the portable computer-based device 102 has a further unique identity, which is known to the TRP server 503 and the Security Proxy 502.

Figure 8:
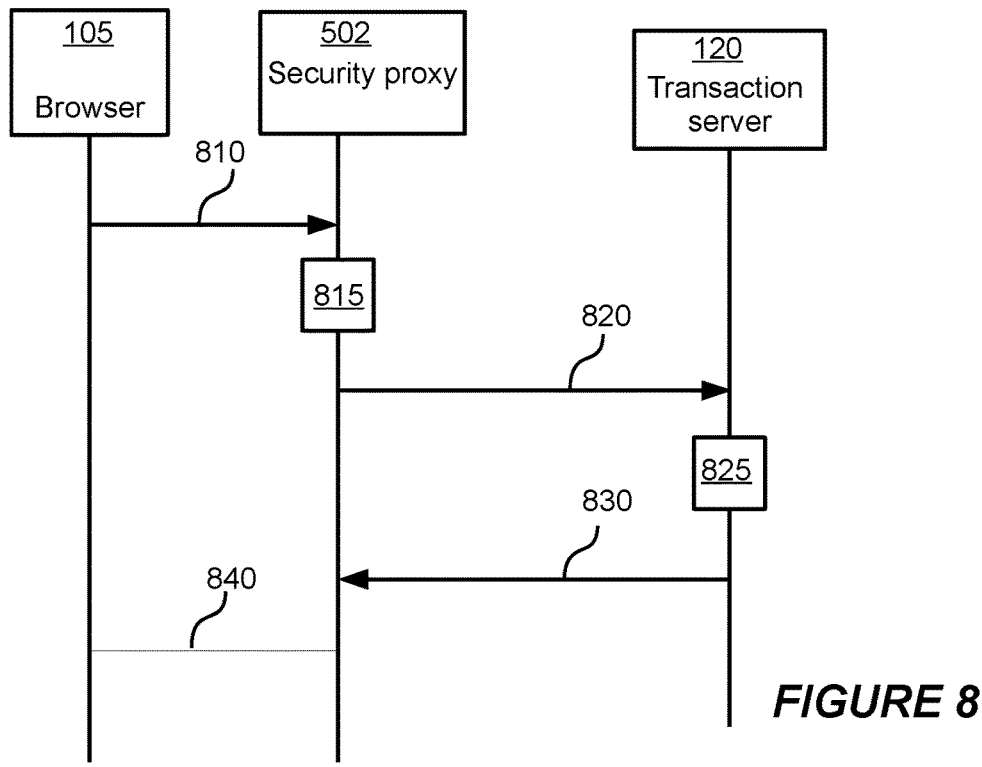
FIGS. 8 and 9 show message sequence diagrams for the login and payment phases of the embodiments of the present invention.
Figure 8A:
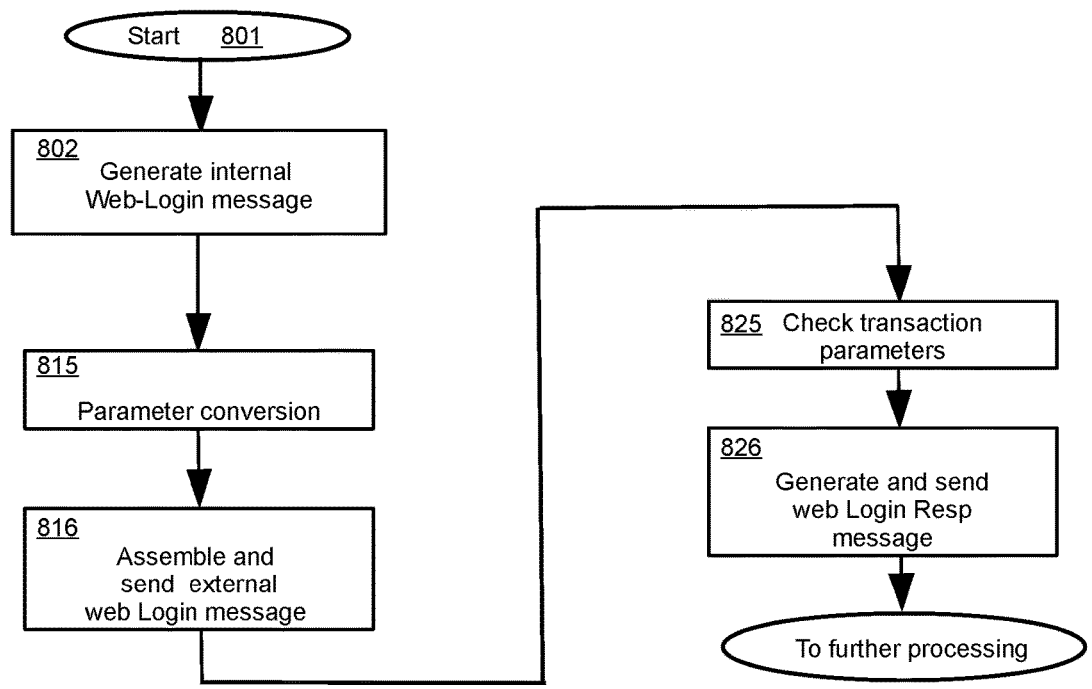
FIGS. 8A and 9A show flowcharts for the login and payment phases of the embodiments of the present invention.

As shown in the FIGS. 8 and 8A, using a browser application or equivalent 105, the customer initiates 801 access to a Transaction Server 120 by generating 802 an internal Web-Login message 810 containing parameters (Local user ID and Local password) that is intercepted by the SP 502, which uses a parameter conversion module 815 to obtain the parameters to the real user ID and real password, from data stored within an Account manager module (not shown) of the SP 502 and creates 816 an external Web-Login message 820.

In some embodiments, for additional security, the SP 502 checks the sender's IP address and rejects the message if the IP address is different either from that previously used in the present session by the customer device, or differs from that registered as being the current IP address of that device. Otherwise, the external Web-Login message 820 is created and forwarded 826 to the Transaction Server 120 as normal. The parameters in the message 820 are checked by the Transaction Server 120 using a transaction parameter checker module 825 with its database (not shown), and the Transaction Server 120 responds with a Web-Login-Response message 830. Since there are no parameters in this message, it is passed 840 by the SP 502 directly to the user's browser application 105.

Secure On-Line Commerce Transactions

Figure 9:
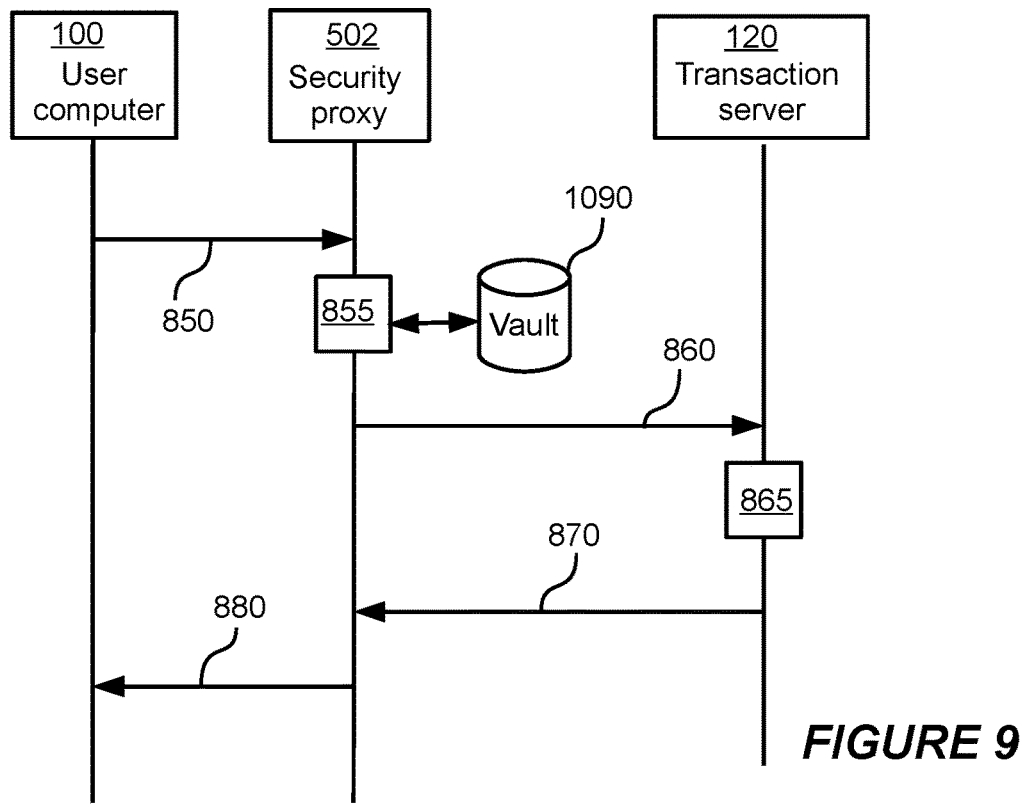
Figure 9A:
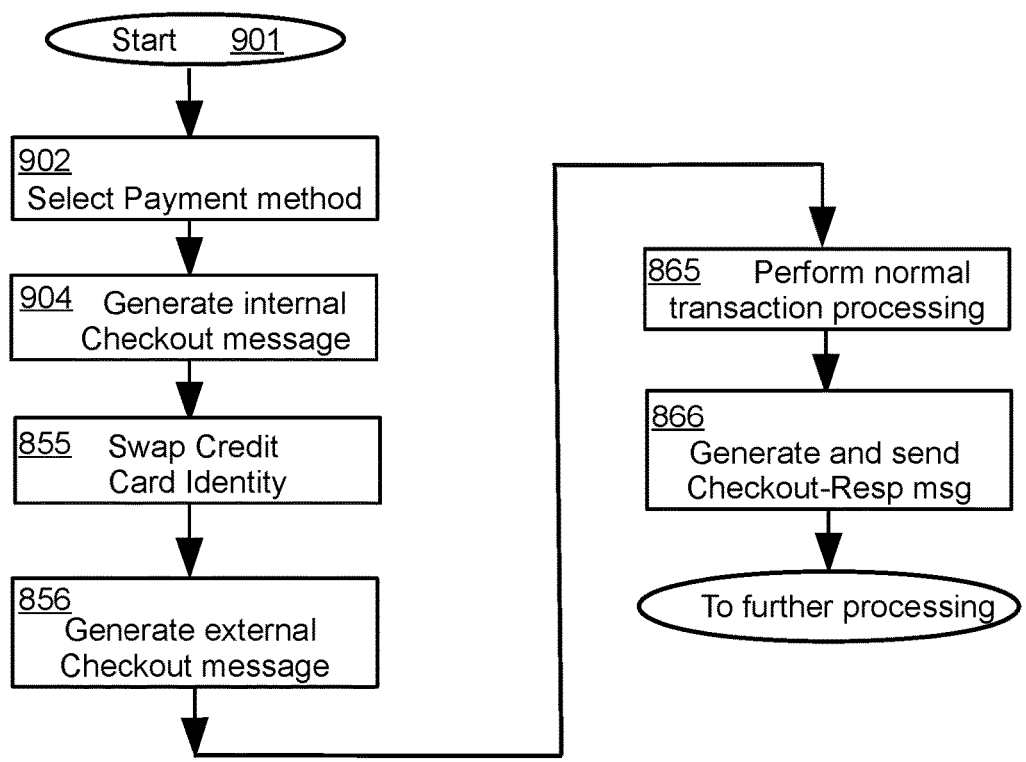

Following a series of messages (not shown) which result in the need for a payment (monetary) transaction, the customer may choose 902 to pay using, for example, a credit card. As shown in the FIGS. 9 and 9A, the request for this is the internal Checkout message 850, generated 904 within the browser application 105, and containing the customer's Local Credit ID. The message is intercepted by the SP 502, which uses a Credit card ID swap module 855 to replace the Local Credit ID with the Real Credit ID using data stored in the secure Vault 1090 and forwards 856 the amended external Checkout message 860 to the TS 120, which performs its normal transaction processing activities 865 before sending 866 the appropriate Checkout-Response message 870. Since there are no parameters, this message is passed by the SP 502 directly 880 to the customer's browser application 105. Note that the use of a credit card in this situation is illustrative, and other identity credential information is also possible.

In some embodiments, for trusted on-line commerce transactions requiring a higher level of security, the merchant provides a TAN module, (not shown), typically in the form of an application Plug-in, in the SP 502. For each transaction, the TS 120 sends a token number. In response the TAN module produces a new trusted token number (TTN) which is received at the TS 120. If the trusted token number (TTN) is validated by the TS 120, the transaction is trusted.

A further illustrative embodiment provides for establishing a trusted transaction environment between an on-line customer and multiple on-line service institutions. This is a form of Web Single Sign On (WSSO) which co-ordinates and integrates customer sign-on functions and customer account management functions for multiple institutions. Among other benefits, WSSO improves security through the reduced need for a customer to handle and remember multiple sets of authentication information.

In some embodiments a certification procedure is provided to further enhance the security of vulnerable weak links.

It should be noted that in embodiments of the present invention the location of each of the modules described here and interconnected by the Transmission Layer 1040 is subject to much variation, provided only that the Security Proxy Authentication Platform must be attached directly to the LAN at the home location.

Embodiments of the present invention, which establish a trusted transaction environment, are further illustrated with reference to the FIGS. 5 and 10 in which are shown the major modules involved. Authentication Module (or Login) 1000, which resides in the trusted computing unit 101, has an Authentication User interface (AUI) 1010 that provides for registration of the customer through a Register module (RM) 1020, and management of several customers and their devices through an Identity Manager module (IDM) 1030.

Also included in the authentication module 1000 is a Password manager (PM) 1032 for the management of passwords used to access the web server 120. The authentication Platform 1050 of the Security Proxy 502 also includes a Message Confirmation Unit (MCU) 1064 for receiving confirmation of identity of the portable security device 604 from the message generator unit 504 of the TRP server 503.

The AUI 1010 is connected by an appropriate Transmission Layer 1040, to an Authentication Platform (AP) 1050, which resides in the Security Proxy 502. The AP 1050 comprises modules performing the following functions:

Two factor authentication module (TFA) 1060;
    Device verification module (DV) 1070;
    Account Management module—including device registration and updating of IP addresses and other parameters (AM) 1080;
    Secure storage of private data (secure Vault) 1090;
    Support of multiple merchants using WSSO—Merchant agent module (MA) 910;
    A Message Parameter Replacement Unit 1095 supports parameter replacement in messages from the authentication module 1000 directed to the web server 120; and
    A Password Replacement Unit 1096 supports the management of passwords through the Password Manager 1032.

In addition, a process for ensuring that the IP address of the SP 502 is sent regularly to the TRPS 503 is provided as described earlier.

Messages from other major modules sent over the Transmission Layer 1040 are directed to the appropriate module within the security proxy 502 by a Packet Inspector (PI) 1110.

A browser or equivalent application 105, having several different instances (e.g., windows or tabs) 1210, is also shown communicating with the Authentication Platform AP 1050 over the Transmission Layer 1040.

All modules and units shown in FIG. 10 comprise computer readable instructions stored in a computer readable storage medium such as memory, DVD, CD-ROM or similar storage medium, for execution by a processor.

Web Single Sign on

We now further explain the two factor authentication (TFA) procedures, using Web Single Sign On (WSSO) as an example, referring first to the FIG. 10, in which the block 100A, comprising an Authentication module 1000 and a Browser module 1210 is a module within the customers' computer 100, and the authentication platform 1050 is a module within the Security Proxy 502. The first phase of the procedure requires messages between the AUI ID manager module 1030 within the Login module 1000, and the AP Device Verification module 1070 and Two Factor Authentication module 1060 within the Authentication Platform AP 1050. This local authentication phase ensures that the customer can authenticate against the Trust Relationship Profile TRP 606 previously forwarded by the TRP Server 503 and stored in the secure Vault 1090 of the Authentication Platform 1050 of the Security Proxy 502.

In another phase the procedure requires messages between the Browser 105, the AP Account Management module 1080, and the merchant's Transaction Server (TS) 120. Only following successful local authentication can the Authentication Platform secure Vault 1090 of the Security Proxy 502 be opened and the Account Management module 910 intercept web login messages and arrange for the Message Parameter Replacement unit (PRU) 1095 to correctly replace the local login credentials with the real ones in the messages to the TS 120.

Figure 12:
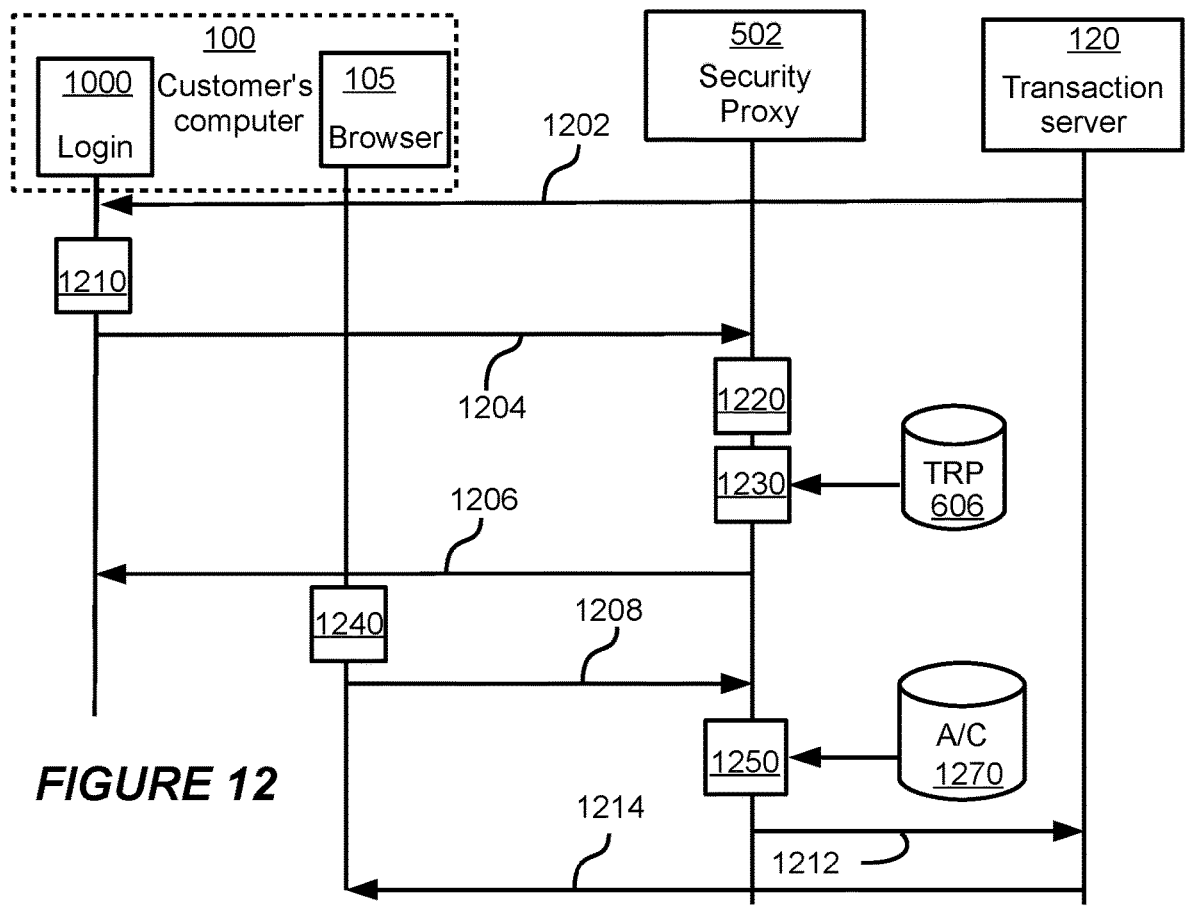
FIGS. 12 and 13 show message sequence diagrams illustrating examples of message sequences executed according to various embodiments of the invention for logging on to a transaction server and completing a payment transaction.
Figure 12A:
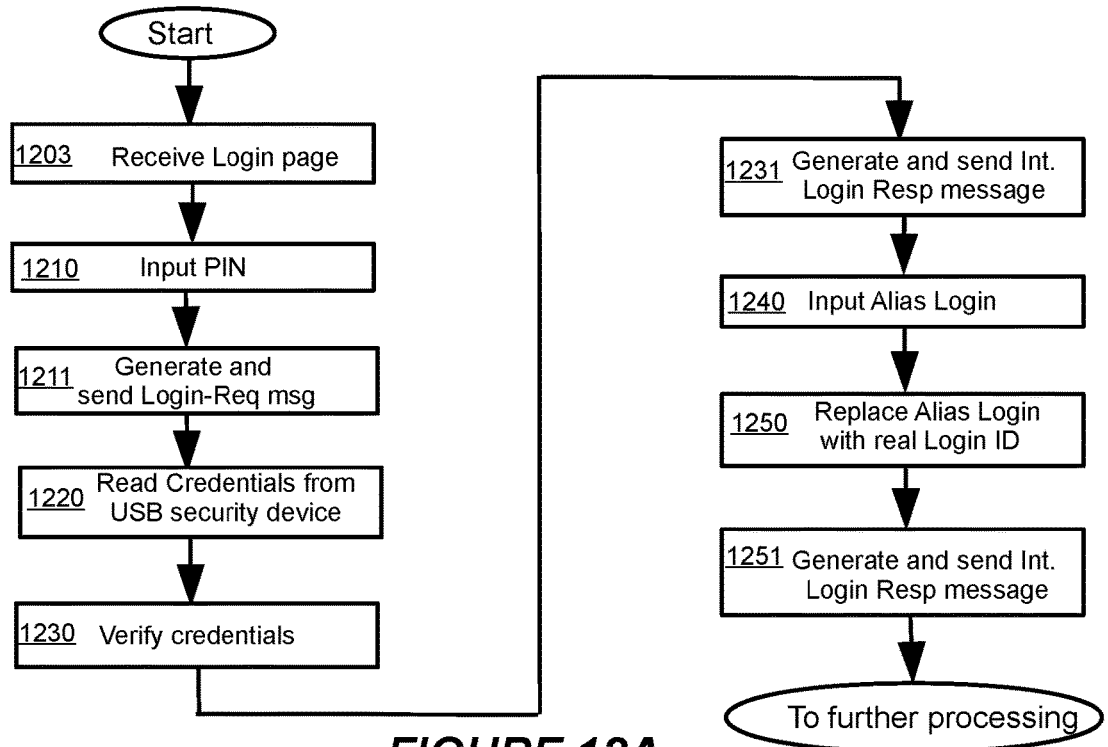
FIGS. 12A and 13A show flowcharts illustrating logging on to a transaction server and completing a payment transaction.

To illustrate the stage following successful creation of a Trust Relationship Profile TRP 606 and its storage in the Authentication Platform secure Vault 1090 we now refer also to FIGS. 12 and 12A. After connecting to the relevant Transaction Server 120 (using HTTP and the browser 105—message(s) not shown) a (HTTP) login page message 1202 is received 1203 by the Login module 1000. The customer provides a PIN 1210 and a Login-Request message 1204 containing the PIN is generated and sent 1211 to the SP 502. The SP 502 also reads 1220 the credentials of the customer's USB portable security device (not shown) and once the credentials have been verified 1230 against the TRP 606 (held in the Authentication Platform secure Vault 1090), a login Response message 1206 is generated 1231 and returned to the Login module 1000. At this time, the secure vault 1090 can be opened with the extracted secret key from TRP.

Thus, the Login page displayed by the web browser 105 as a result of receiving a login page (HTTP) message 1202 is an ordinary-looking Login ID form that the customer "fills in" with local Alias credentials.

Using the browser or equivalent application 105, an alias Login ID is inputted 1240, and a simple "single factor" (e.g. UserID with password) internal Login-Request 1208 initiated by the customer is intercepted by the Security Proxy 502 that examines its database A/C 1270 of account information relating to the customer (held in the Authentication Platform Vault 1090), and using the Message Parameter Replacement unit 1096, replaces 1250 the alias to create 1251 an external Login-Request 1212 with the real ID and passes it to the Transaction Server 120.

Once the Transaction Server 120 has sent its Login-Response 1214 to the web browser 105, the transaction proceeds normally until the checkout process begins.

Figure 11A:
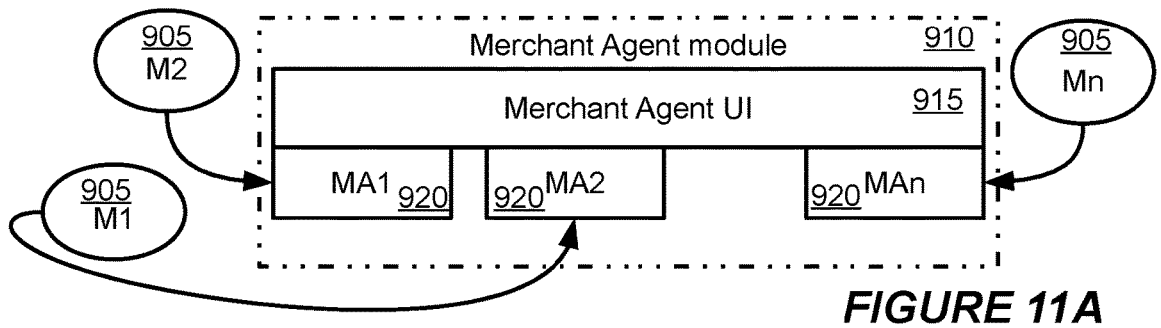
FIGS. 11A and 11B illustrate a merchant agent module 910 of FIG. 10 in more detail.

In some embodiments of the present invention, the system and method are enhanced to permit a plurality of merchants or other enterprises to make use of the service defined by the invention, in some cases provided by a third party. This is a form of "Identity as a Service" (IdaaS) described above. The FIG. 11A shows a Merchant Agent module 910, which resides within the Security Proxy 502 as part of the Authentication Platform 1050, having a User Interface 915 and a plurality of TTN generating modules 920, one for each of a plurality of merchants 905 that the platform supports. As depicted in the FIG. 11B, each TTN generating module 920 is able to generate a new TAN' (or TTN) 930 independently to replace the dummy TAN 925 in messages sent from the web browser. The algorithm to generate the TTN within each TTN generating module 920 is provided during an initialization phase following registration.

Figure 11B:
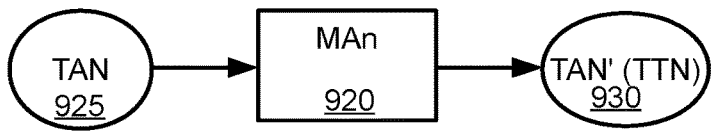

All modules and units shown in FIGS. 11A and 11B comprise computer readable instructions stored in a computer readable storage medium such as memory, DVD, CD-ROM or similar storage medium, for execution by a processor.

In some embodiments, the device ID of the customer related Two Factor Authentication TFA process is incorporated in the message to the merchant's transaction server for additional verification of the customer's identity.

Other embodiments add authentication methods in various combinations to further increase the assurance level of security and authentication.

Figure 13:
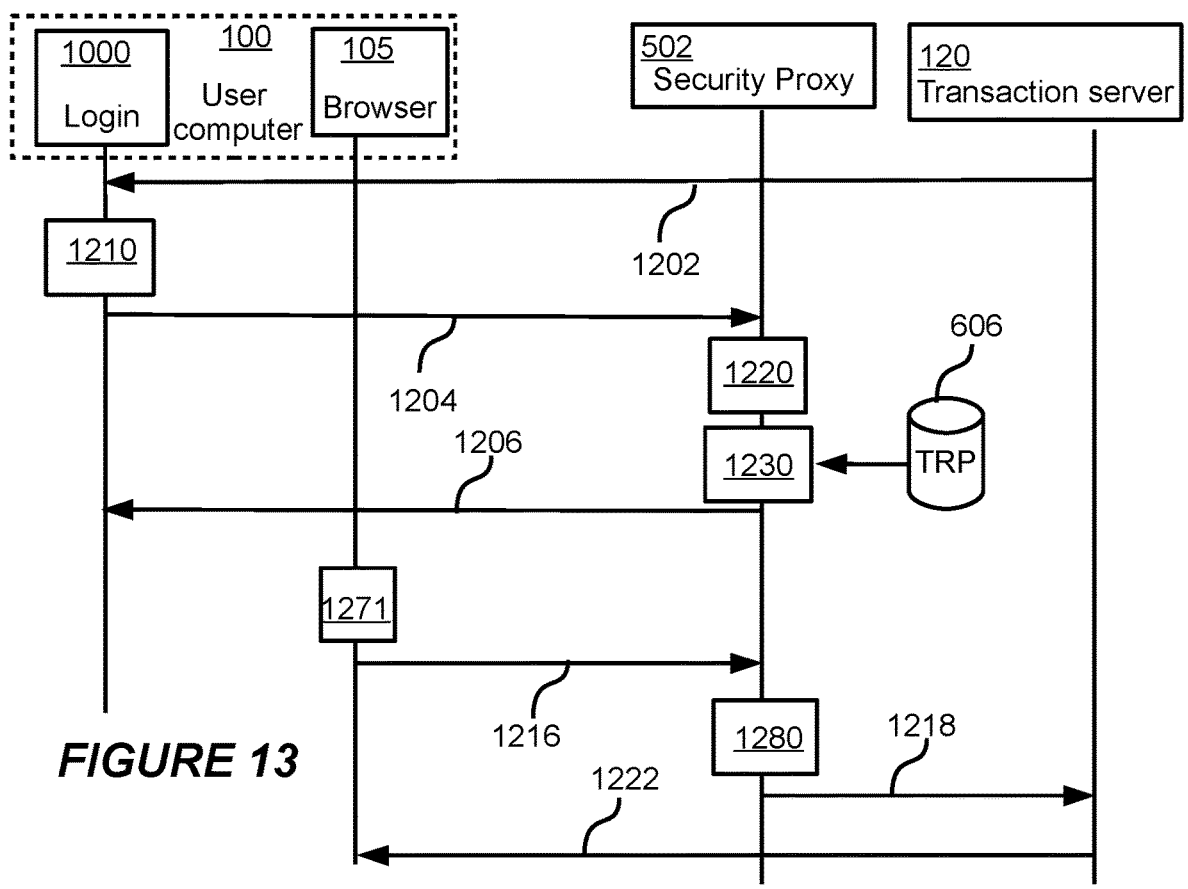
Figure 13A:
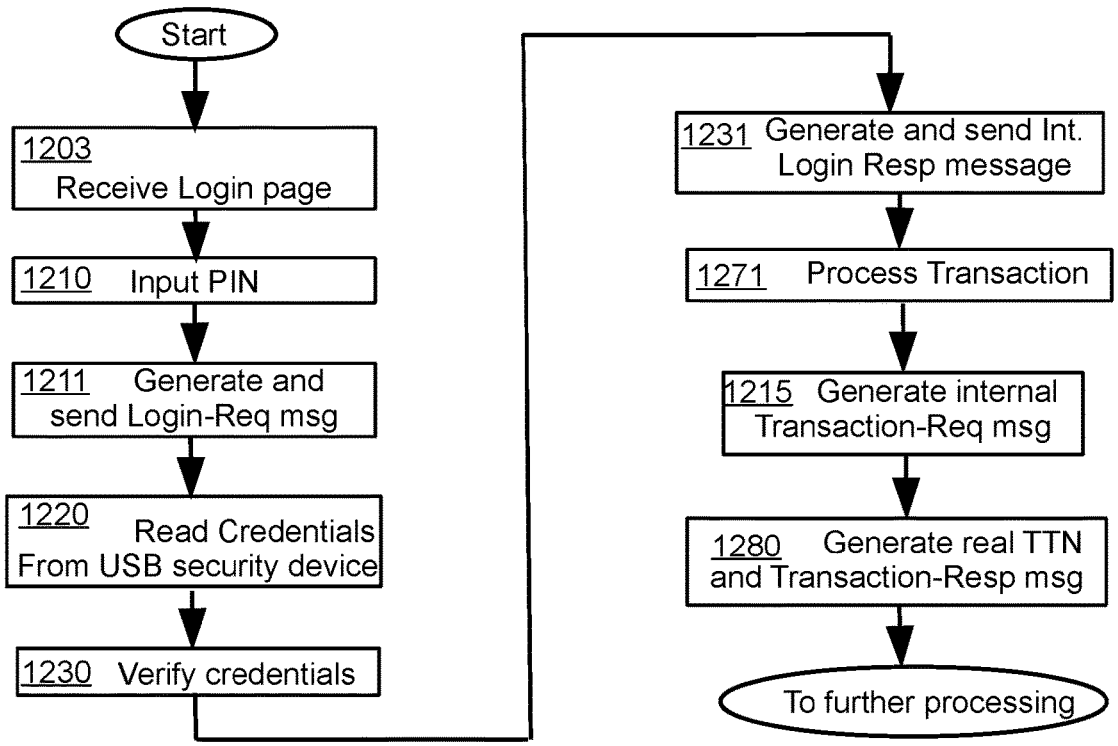

As previously mentioned, the level of security is enhanced as needed for high value transactions. One example of a high-value transaction is checkout. The procedure is described with reference to the FIGS. 13 and 13A.

As in the previous example, after connecting to the relevant Transaction Server 120 (using HTTP and the browser 105—message(s) not shown) a (HTTP) login page message 1202 is received 1203 by the Login module 1000. The customer inputs a PIN 1210 and a Login-Request message 1204 containing the PIN is generated and sent 1211 to the SP 502. The SP 502 also reads 1220 the credentials of the customer's USB portable security device (not shown) and once the credentials have been verified 1230 against the Trust Relationship Profile TRP 606 (held in the Vault 1090), a login Response message 1206 is generated 1231 and returned to the Login module 1000.

At the end of the transaction processing 1271, during which items are selected for purchase, for example, the Transaction Server 120 sends a Checkout page (not shown) containing a dummy Transaction authorization number (TAN). An internal Transaction-Request message 1216 is generated 1215 containing that dummy TAN and sent to the Transaction Server 120, the Security Proxy 502 intercepts the internal Transaction-Request message 1216. After replacing the dummy TAN with a real Trusted Transaction Number TTN generated from the associated merchant agent module 910 (step 1280), which is expected from the Transaction Server 120, the SP 502 creates an external Transaction-Request message 1218. The TTN is generated in real-time using a trusted TAN generator module provided by the merchant. The Transaction Server 120 provides a Transaction-Response 1222 (as normal). The transaction, having been validated, concludes normally (not shown).

As before, if the expected TTN is not found and the original TAN is visible, then the customer does not use the trusted platform for the transaction. In this case, more attention is needed based on policy. If neither TAN nor TTN are provided for the Transaction-Request message, the transaction must be rejected.

In some embodiments, to verify the trust status of any login and to verify that users are indeed authorized users, a server-end password regime is implemented including a two-factor password assigned to the user. This two-factor password comprises a simple login password modified by a portable security device-linked extension. The two parts of the two-factor password verify the trust status of any access to the secured transactions since the presence of the portable security device-linked extension confirms that the portable security device is present in the system at time of log-in. The portable security device-linked extension to the two-factor password is never exposed to the browser and is used automatically when the user attempts to log-in to secured applications.

The FIG. 10 shows the elements related to verification of the trust status of the login. The Password Manager 1032 performs the normal functions of updating and verifying passwords in collaboration with the web server 120 and the Password Replacement Unit 1096 contained in the Authentication Platform 1110 of the Security Proxy 502

Figure 14:
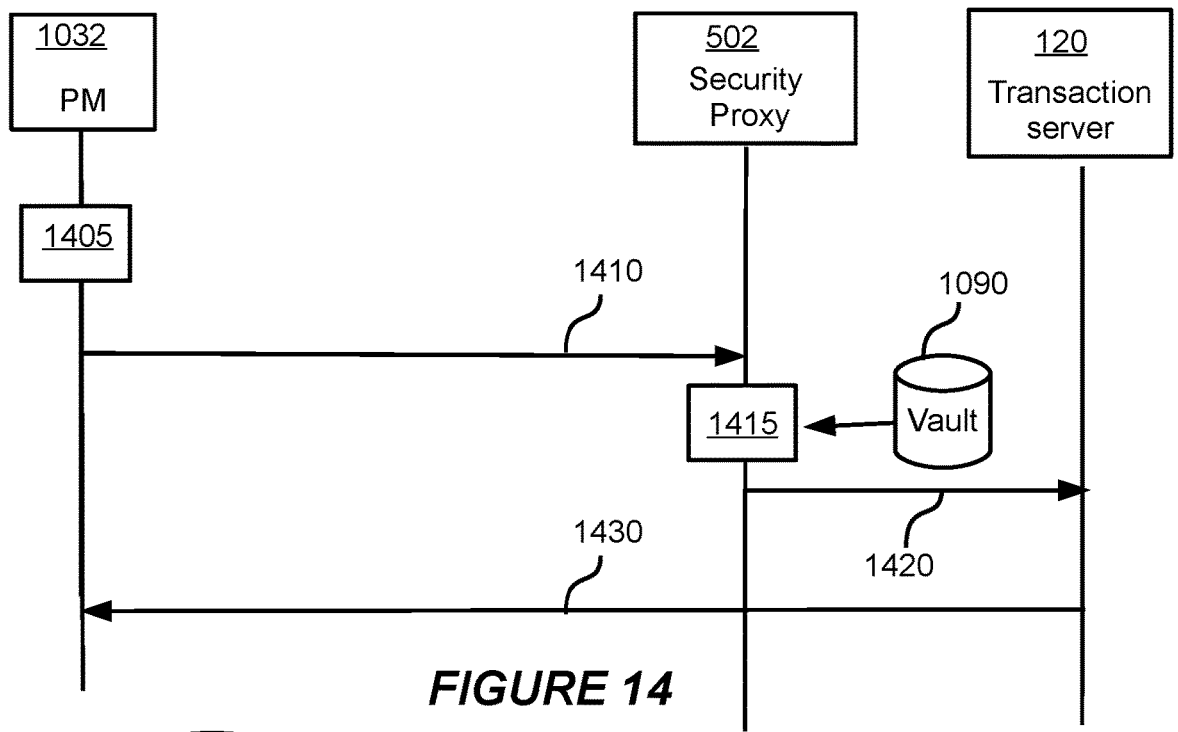
FIGS. 14 and 15 show message sequence diagrams illustrating examples of message sequences executed according to various embodiments of the invention for changing and using two-factor passwords with a transaction server.
Figure 14A:
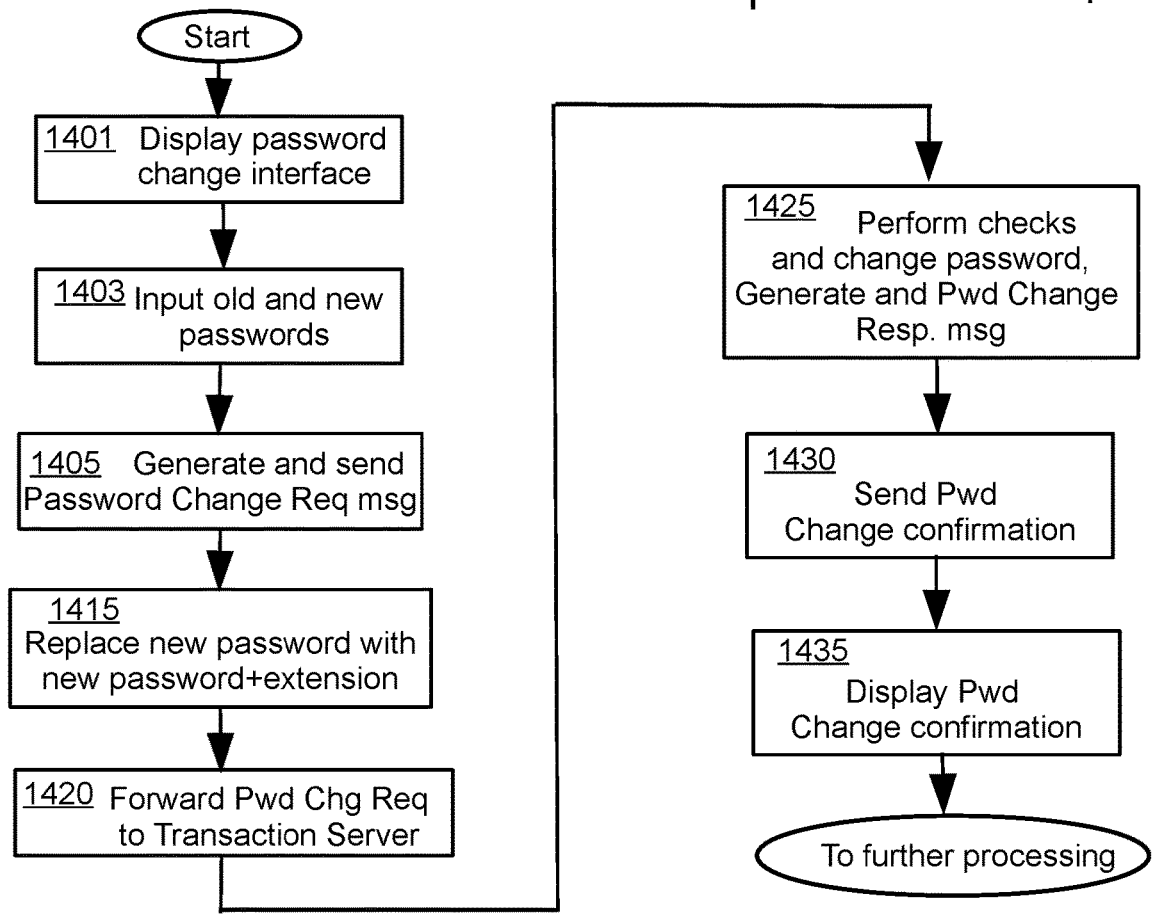
FIGS. 14A and 15A show flowcharts illustrating yet another embodiment of the invention using two-factor passwords.

The FIGS. 14 and 14A, together with FIGS. 5 and 10 show how the two-factor password is synchronized with web server (or transaction server) 120 using a familiar-looking "Change-Password-Request" web API. The password manager 1032 is invoked 1401, the old and new passwords are entered by the user 1403, to generate and send 1405 an internal Change Password request message 1410 containing both the old simple password and a new login password. At the Security Proxy 502 the packet inspector 1110 directs the message 1410 to the Password Replacement Unit 1096 where the new login password comprising two parts, the old simple password, a first part, and a second part, based on the credentials and identity of the Portable Security Device 604 previously stored in the Trust Relationship Profile TRP 606 within the secure Vault 1090 are used to modify the message 1410 to become an external Change Password request 1420 which is generated and forwarded 1415 to the transaction server 120. Following normal protocol, the transaction server 120 responds appropriately with a Change Password Response message 1430 which goes to the Password manager 1032 by way of the Security Proxy 502 without modification.

Figure 15:
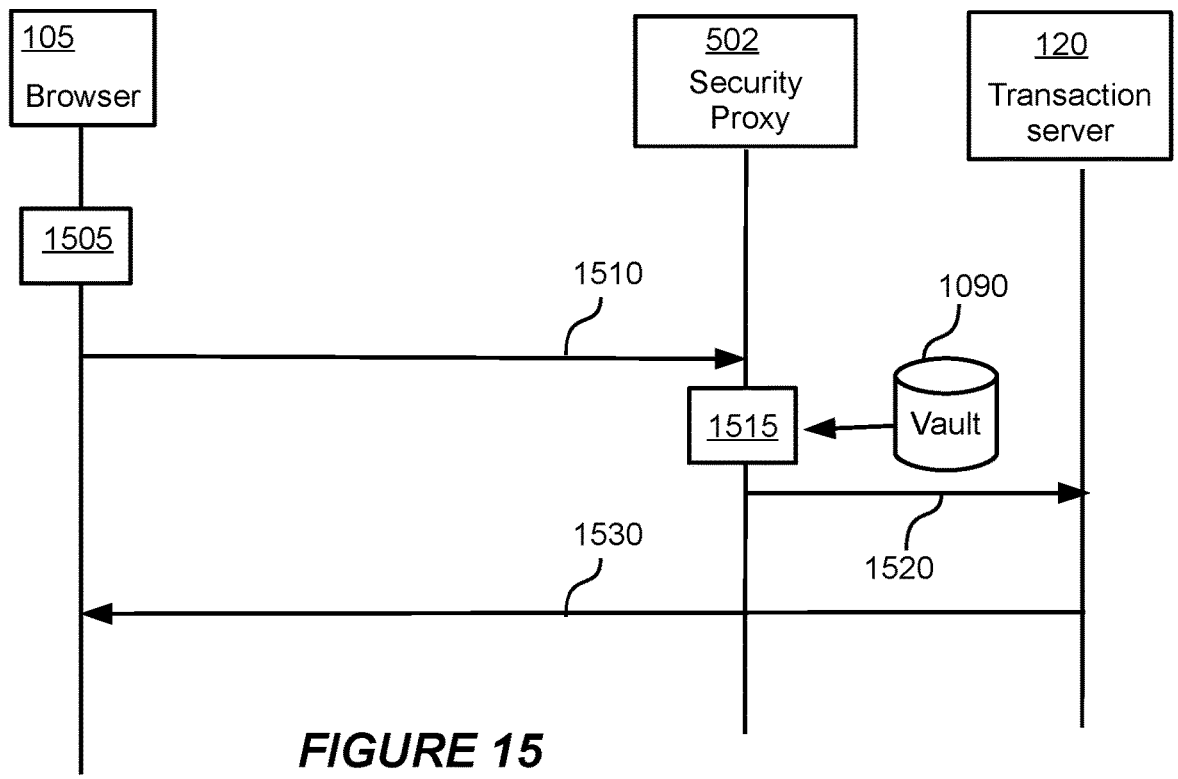
Figure 15A:
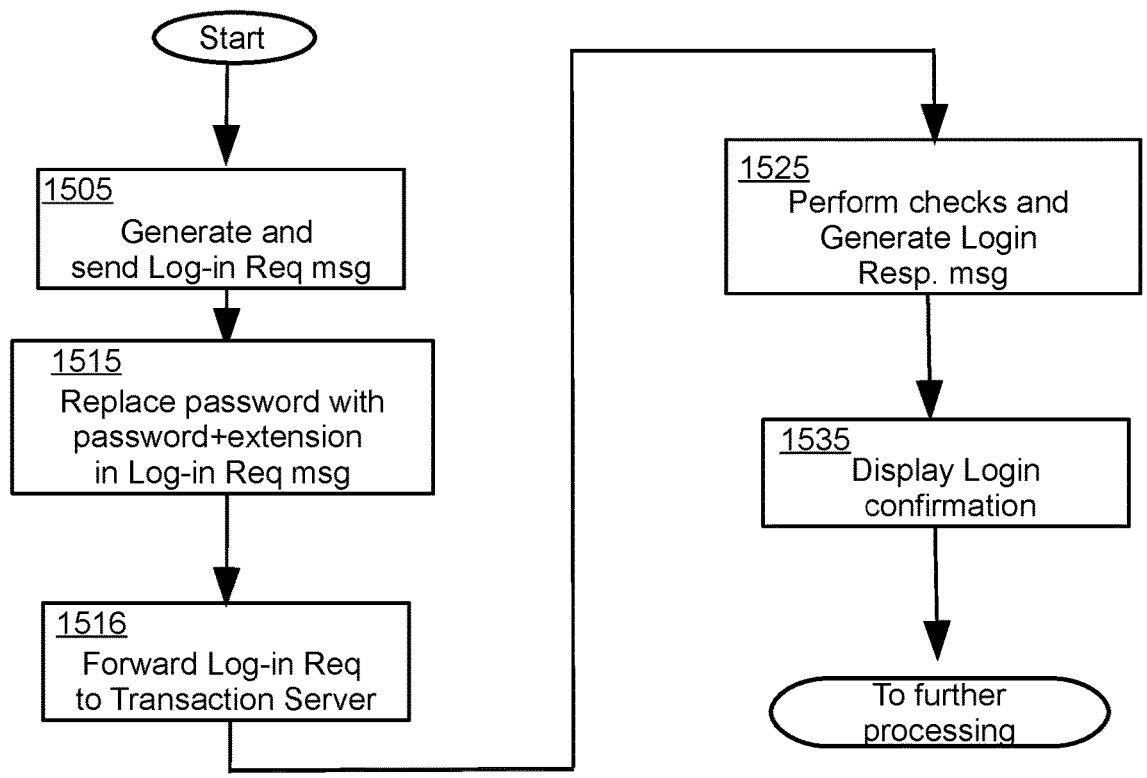

The FIGS. 15 and 15A, together with FIGS. 5 and 10 illustrate the use of the two-factor password at the start of a transaction, in which the new simple password is used to log into the remote web server 120, and this new simple password is converted to the two-factor password by the Security Proxy 502. Since this two-factor password is synchronized at the web server 120, log in is successful. The procedure begins after a normal Login page (not shown) is displayed at the browser 105. The user fills in their credentials including the new password, and a login Request message 1510 is generated 1505 by the browser 105. At the Security Proxy 502 the packet inspector 1110 directs the message 1510 to the Password Replacement Unit 1096 where the new login password is modified by the addition of an extension based on the credentials of the Portable Security Device 604 previously stored in the Trust Relationship Profile TRP 606 within the secure vault 1090. In other embodiments, the modification of the simple password to a new password may be made by extending, replacing part or parts of the simple password or performing any logical or mathematical processing on the simple password. The internal message 1510 is thus modified 1515 to become an external Login request 1520 containing the new login password and forwarded 1516 to the transaction server 120. Following normal checks 1525, the transaction server 120 responds appropriately with a Login Response message 1530 which goes to the browser 105 by way of the Security Proxy 502 without modification. The browser 105 displays 1535 the appropriate page and processing proceeds normally, Login having been successfully completed.

This two-factor password system and method can be used by enterprises to provide a simple two-factor authentication without the user necessarily being aware of the mechanism.

In some embodiments having two-factor passwords, the old simple password, that is the first part of the two-factor password, is replaced at the security proxy 502 by a system generated password which is then stored in the secure vault 1090 for future use and combined with the portable security device-linked extension, the second part. In these embodiments the simple password generated and provided by the user is in effect a token or placeholder.

Detailed Description of Other Embodiments

Embodiments of the invention provide for incorporating the Security Proxy 502 functionality within a personal computer, rather than within a router or modem. This is particularly suitable for simpler environments and also during transition stages where not all routers or modems support the functionality of the SP 502.

Embodiments of the invention, by providing for User Identities, allow several users, having different identity and other credentials, to make use of the same computer infrastructure using different registered devices.

In some embodiments, the secure sign-on and other transactions are internal to the enterprise: Then the customer may be an employee of the enterprise or another enterprise, and LAN may be at a place of business of the enterprise or another enterprise. In these embodiments the secure sign-on and other transactions are valuable and require the trustful nature of embodiments of the invention, even though they may not involve direct financial transactions and settlement.

The embodiments of the present invention use security features combined in a unique fashion to allow merchants and other service providers to provide a highly secure (and therefore low risk) transaction infrastructure that does not allow the web-based (remote) nature of the situation to interfere with the apparent simplicity of the transaction, making it comparable to a face-to-face situation.

In the embodiments of the present invention the customer's real identity credential data, such as passwords, credit card numbers, and user-ids, are used only in the connection within the security enhanced (e.g. using TLS) web 402, e.g., between the SP 502 and the TS 120. "Local" (or alias) customer identity credentials in the form of internally generated versions are used within the "weak link" 400, i.e. the LAN 501 and the applications environment of the trusted computing unit(s) 101 attached thereto. These local identity credentials are translated by the SP 502 into the real identity credentials, protected by extra levels of security introduced and controlled by the embodiments of the invention. Thus, no useful credential data can be captured within the LAN 501 environment by malicious software; the Security Proxy 502 in cooperation with the trusted relationship profile server provides a trusted intermediary function between the LAN and the web.

The embodiments of the present invention, although described largely in terms of software modules having computer readable instructions stored in a computer readable storage medium for execution by a processor, residing in particular hardware entities, may be implemented in hardware and in combinations of hardware and software and such modules may reside in other hardware entities.

For greater certainty, all software modules or units described in this application comprise computer readable instructions stored in a computer readable storage medium, such a memory, DVD, CD-ROM or the like, for execution by a general purpose or specialized processor. Alternatively, functionality of these modules can be implemented in specialized hardware.

In some embodiments the trusted transaction data is sent to a separate server for further verification, thereby avoiding the need to make changes in the transaction server.

Embodiments of the present invention also provide methods and systems authorizing secure electronic transactions using a security device. In the above noted previous issued patent and patent applications of the same assignee, the following method for secure remote access has been described, where the authentication and authorization steps have been separated, as illustrated for example in FIG. 1 in the issued patent IN-003-US (Kuang) 13/765,049 U.S. Pat. No. 8,739,252:

Authenticate a user—step 102

Connect a user device to a server—step 104

Authorize user access to predetermined services—step 106

Use (perform/confirm transaction with the server)—step 108

Disconnect the user—step 110

Figure 16:
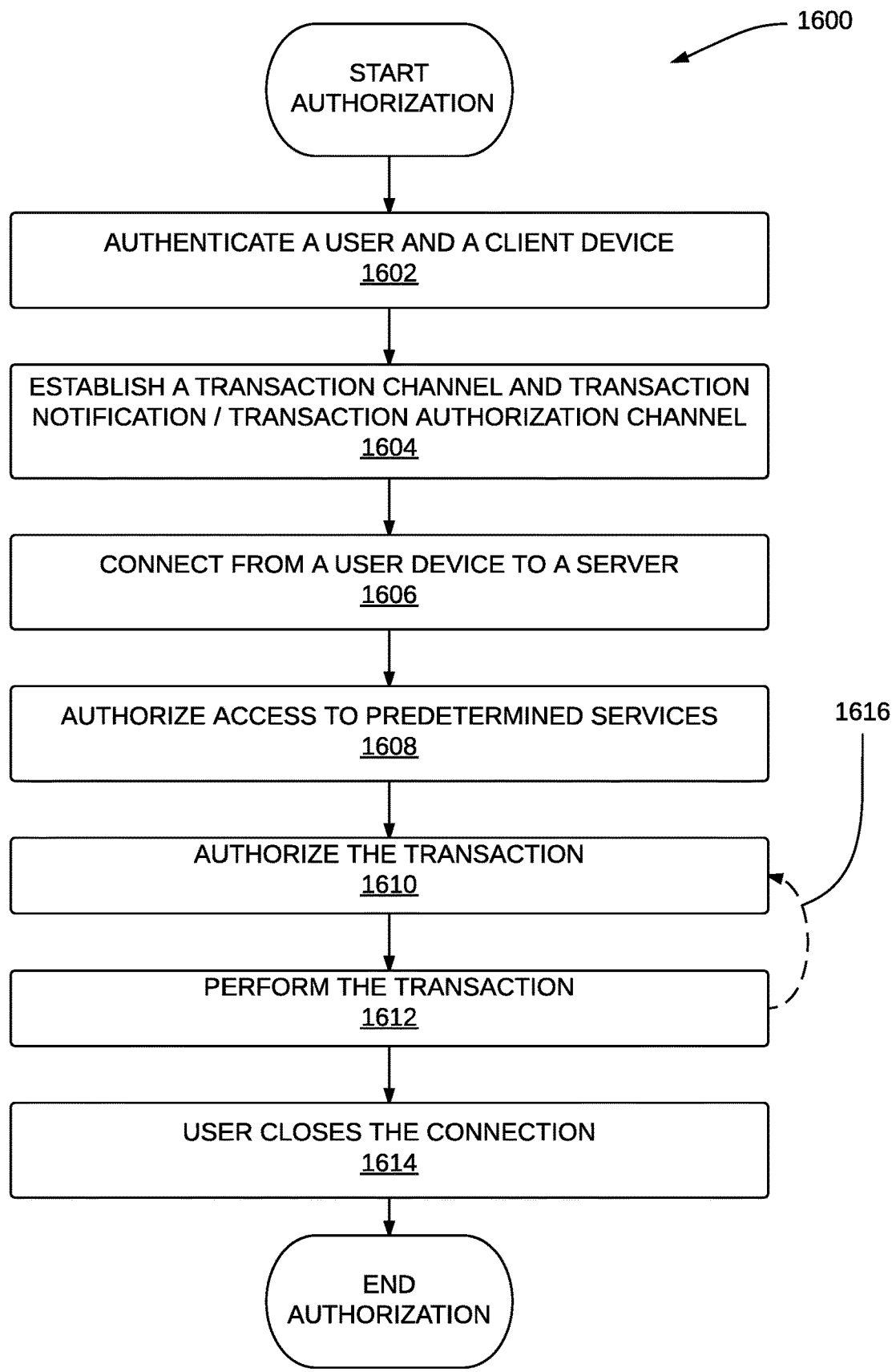
FIG. 16 shows a flowchart of a method of an embodiment of the invention.

In embodiments of the present invention, further improvements to the above noted method have been made, in order to further improve security and privacy of the step 108 (Use—perform/confirm transaction with the server). Referring to FIG. 16 of the present application, an additional step 1604 has been added prior to connecting the user device to the server, and the step 108 has been split into two steps of authorizing 1610 and performing 1612 the transaction, as shown below:

Authenticate a user—step 1602

Establish a Transaction Channel and Transaction Notification/Transaction Authorization Channel—step 1604

Connect from a user device to a server—step 1606

Authorize access to predetermined services—step 1608

Authorizing the transaction—step 1610

Performing the transaction—step 1612

Optionally steps 1610 and 1612 may be repeated—1616

Disconnect the user—step 1614

One embodiment will be referred to herein as the Two-Channel Authorization embodiment, where transaction authorization and notification channels are merged into a single channel, and a transaction is performed on a computing device such as a transaction server and a transaction result is sent on separate transaction channels.

Another embodiment will be referred to herein as the Three-Channel Authorization embodiment, where separate a transaction authorization channel and a transaction notification channel are introduced, and a transaction is performed on yet another separate transaction channel.

Further details for both embodiments are provided herein below.

A corresponding system for secure remote access with transaction authorization is also provided, having a computing device with memory, storing computer readable instructions causing the computing device to perform two or three channel authorization procedures as described herein.

Figure 17A:
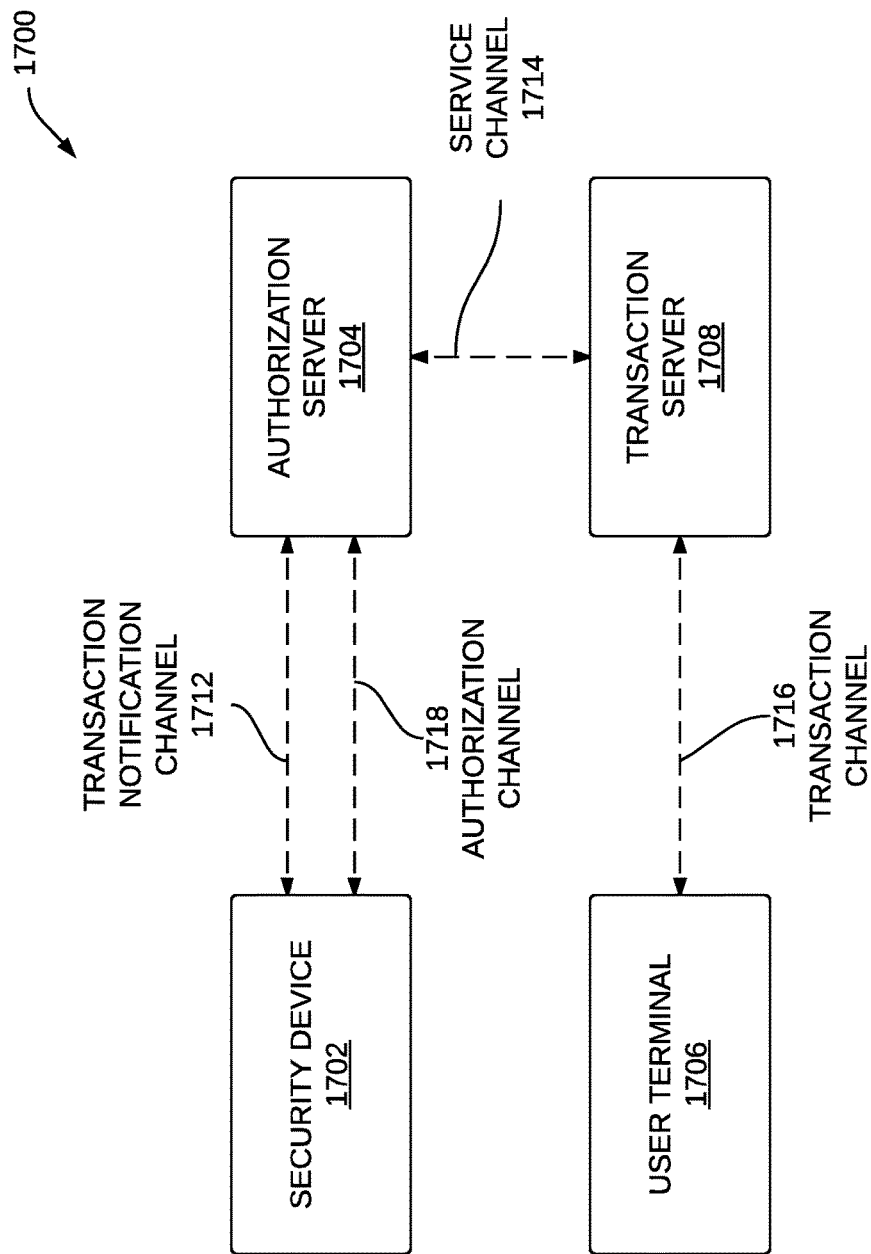
FIG. 17A shows a block diagram of an embodiment of the invention.

Referring to FIG. 17A there is shown a block diagram 1700 of the Two-Channel Authorization embodiment.

This Two-Channel Authorization embodiment includes a security device 1702 as described herein above with unique hardware-based identifiers that belong to a registered user having a unique UID (user identification).

The Two-Channel Authorization embodiment further includes an authorization server 1704 for handling transaction authorization requests and responses. The authorization server 1704 also manages all registered, security services.

The Two-Channel Authorization embodiment still further includes a user terminal 1702: The user terminal 1708 may be, for example, a computer with a browser or a Point of Sale (POS) machine.

The Two-Channel Authorization embodiment yet still further includes a transaction server 1708 for processing transactions.

The Two-Channel Authorization embodiment includes a Transaction Authorization Notification Channel 1712: The Transaction Authorization Notification Channel 1712 sends transaction authorization messages in a form of push notifications displayed on the security device 1702. The Transaction Authorization Notification Channel 1712 is established, automatically or manually by a user, prior to the authorization requests.

The Two-Channel Authorization embodiment further includes a Service Channel 1714: The Service Channel 1714 connects the authorization server 1704 and the transaction server 1708 which may be owned by a third party. The Service Channel 1714 will relay transaction authorization to the transaction server 1708 using conventional protocols such as Open Authorization (OAuth), Open ID or the like.

The Two-Channel Authorization embodiment further includes a Transaction Channel 1716: The Transaction Channel 1716 sends transaction detail information between the user terminal and the transaction server 1708.

The Two-Channel Authorization embodiment further includes a Transaction Authorization Channel 1718: The Transaction Authorization Channel 1718 sends transaction authorization information from the security device 1702 to the transaction server 1708, after the user confirms or denies the transaction request from the security device 1702.

Figure 17B:
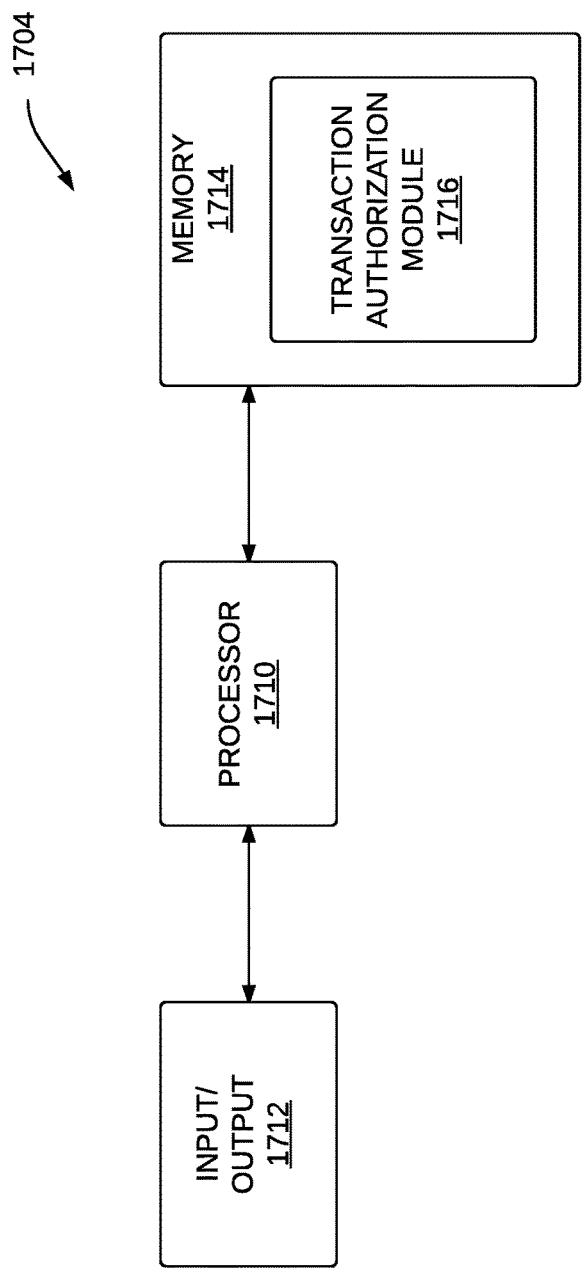
FIG. 17B shows a block diagram of an authorization server shown in FIG. 17A.

Referring to FIG. 17B there is shown a block diagram of the authorization server 1704 shown in FIG. 17A. The authorization server 1704 includes a processor 1710 with memory 1714 for storing computer readable instructions 1718 causing the processor to perform two or three channel authorization procedures as described herein below. The authorization server 1704 further includes input/output capabilities for operably communicating with the security device 1702 and transaction server 1708 on various channels as described herein below.

Figure 17C:
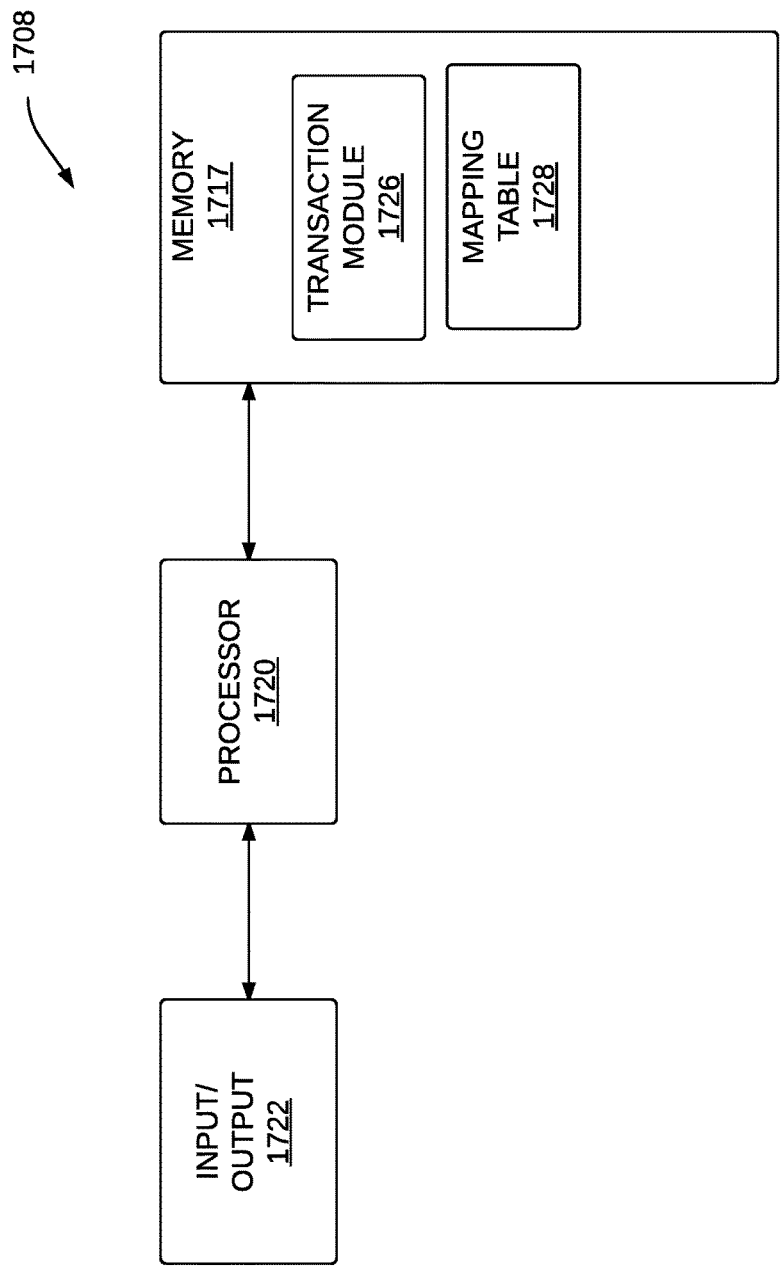
FIG. 17C shows a block diagram of a transaction server shown in FIG. 17A.

Referring to FIG. 17C there is shown a block diagram of the transaction server 1708 shown in FIG. 17A. The transaction server 1708 includes a processor 1720 with memory 1717 for storing computer readable instructions 1726 causing the processor to perform two or three channel transaction procedures as described herein below. The transaction server 1708 includes a mapping table 1728 for mapping a transaction ID, such as credit card number, debit card number, etc., to user's ID residing in the authorization server 1704. Once the transaction server 1708 identifies the user's ID from a transaction, it forwards a transaction request to authorization server 1704 and waits for a transaction authorization to be sent back directly from the user's security device 1702. Based on the user authorization action (confirm or deny), it completes the transaction process by either granting or rejecting the transaction.

Referring now the block diagram 1800A of FIG. 18A and the flowchart 1800B of FIG. 18B there will be described a method in accordance with the Two-Channel Authorization embodiment of the invention.

Firstly, the Transaction Authorization Notification Channel 1712 is initialized 1802 before the access authorization request.

Next, the User Terminal 1706 sends 1804, on the transaction channel 1716, a transaction request to the transaction server 1708 with the corresponding user identifier, the transaction request containing information about the transaction, including amount to be transacted.

Next, the transaction server 1708 sends 1806, on the service channel 1714, a transaction request including a user ID and a timestamp to the authorization server 1708 with the transaction details, the corresponding user identifier, and a timestamp of the transaction request.

Next, the authorization server 1704 sends 1808, on the transaction notification channel 1712, a transaction authorization request to the security device 1702 which is registered to the user identifier. The transaction request is in the form of a notification on the security device 1702. The user needs to approve or deny the transaction authorization request within a timespan after receiving the notification.

Next, after the user approves or denies the transaction authorization request, the authorization response is generated and sent 1810 from the security device 1702 to the authorization server 1704.

Next, the authorization server 1704 sends 1811, on the service channel 1714, the authorization response to the transaction server 1708.

Next, the transaction server 1708 performs the requested transaction according the authorization response and sends

1812, on the transaction channel 1716, a result of the transaction to the User Terminal 1706.

Figure 19:
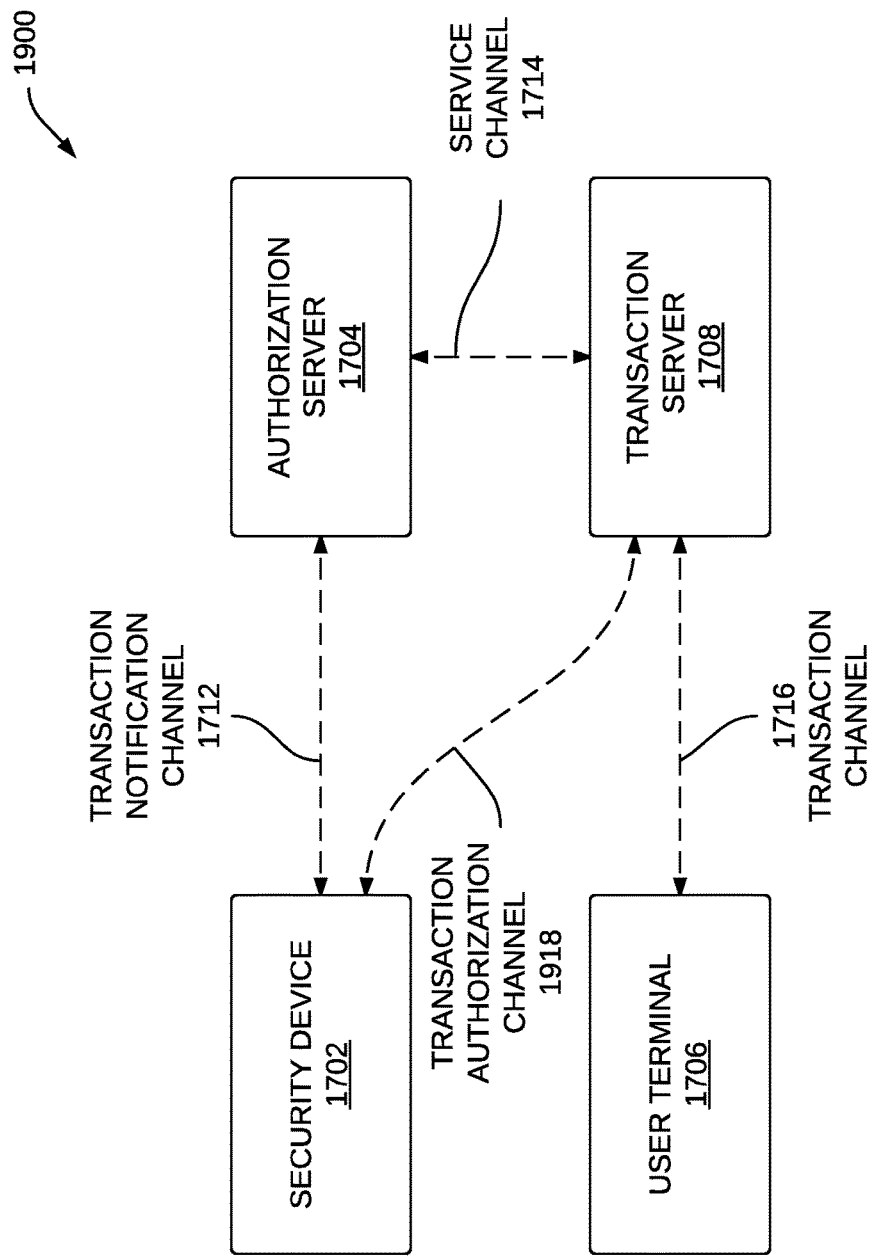
FIG. 19 shows a flowchart of another embodiment of the invention.

Referring now to FIG. 19 there is shown a block diagram 1900 of the Three Channel embodiment of the invention. The Three Channel embodiment is similar to the Two Channel embodiment of shown in FIG. 17A, except that the Transaction Authorization Channel 1918 is now operably connected between the security device 1702 and the transaction server 1708.

Figure 18A:
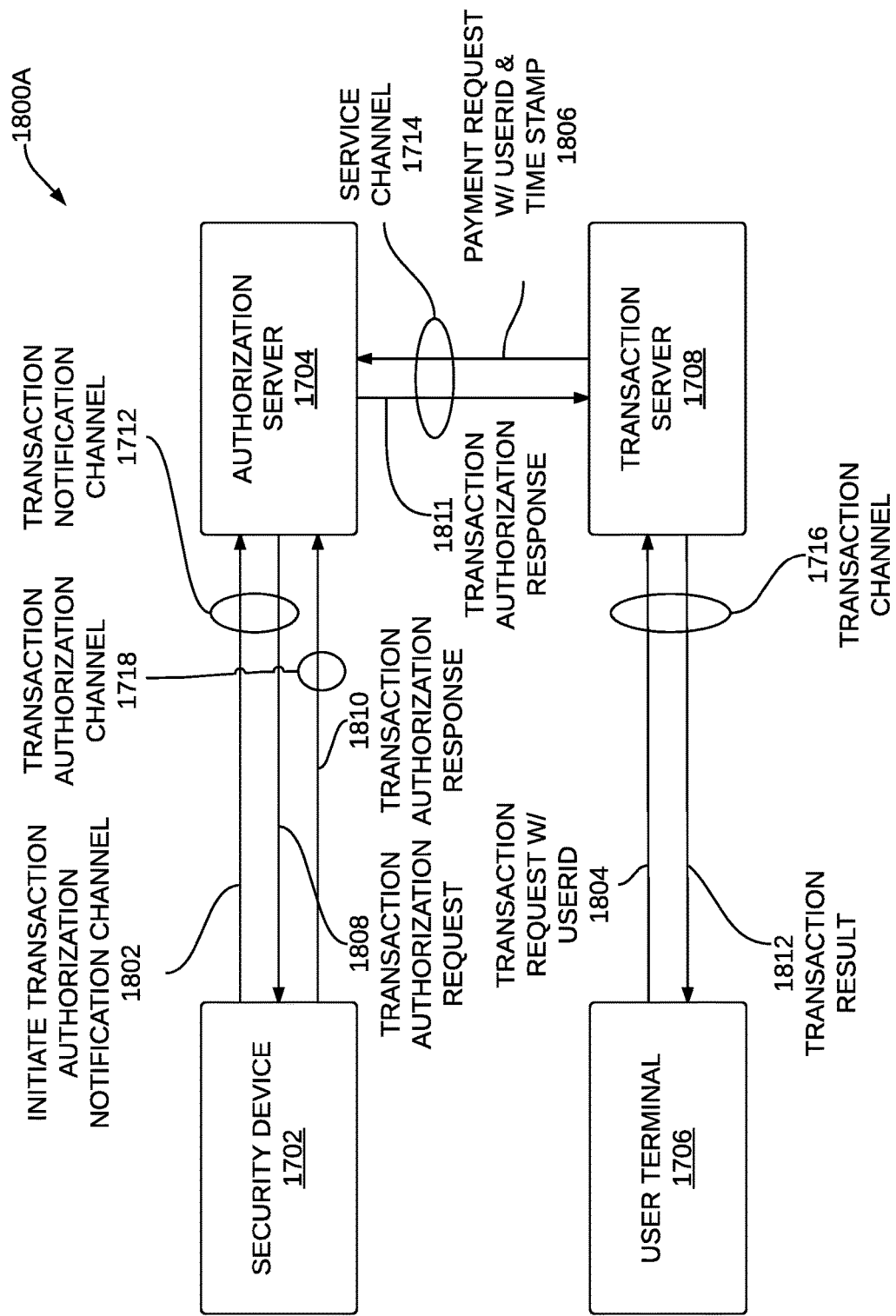
FIG. 18A shows a block detailed diagram of the embodiment of the invention shown in FIG. 17A.
Figure 18B:
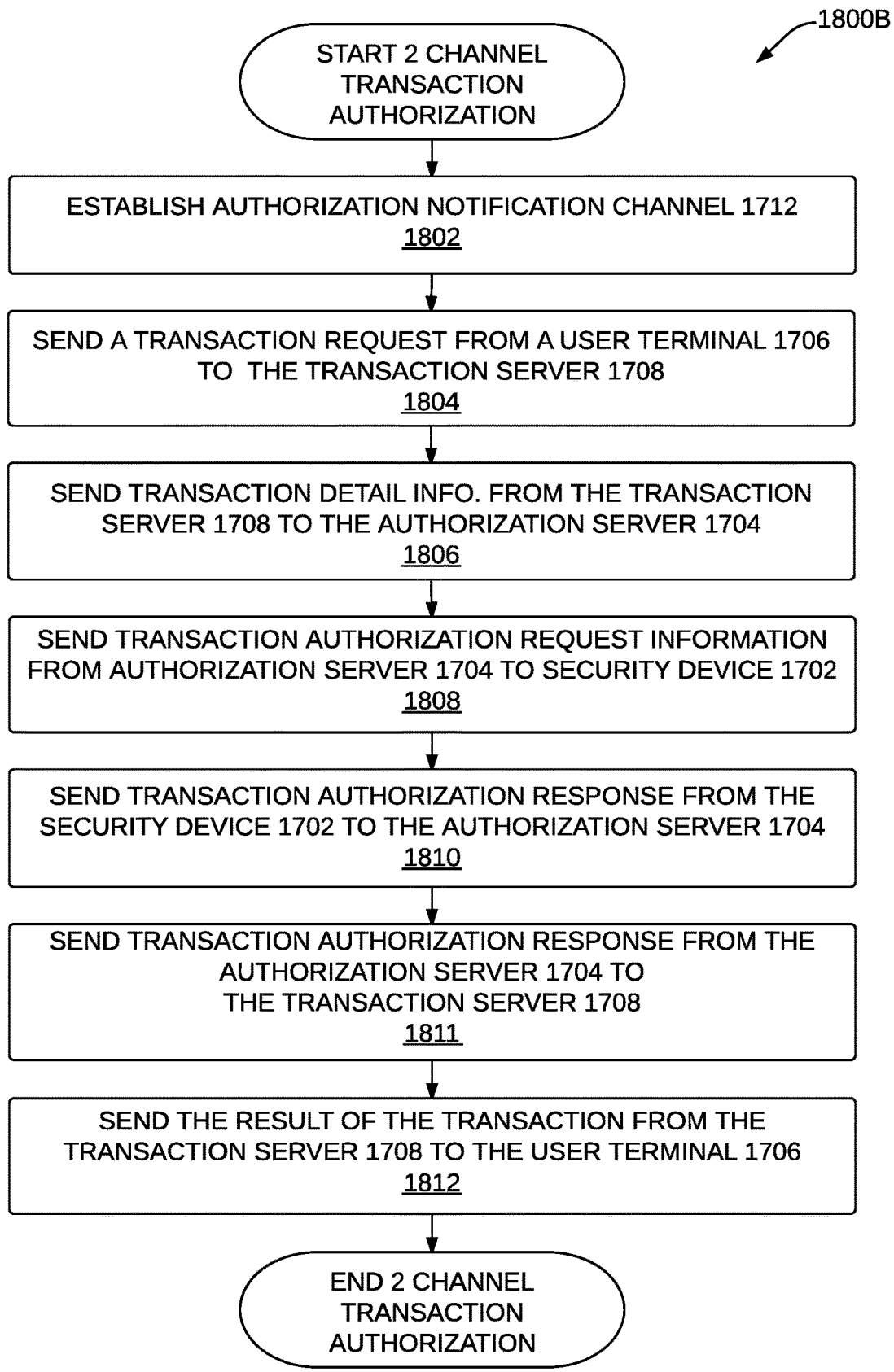
FIG. 18B shows a flowchart of a method of the embodiment shown in FIG. 18A.
Figure 20A:
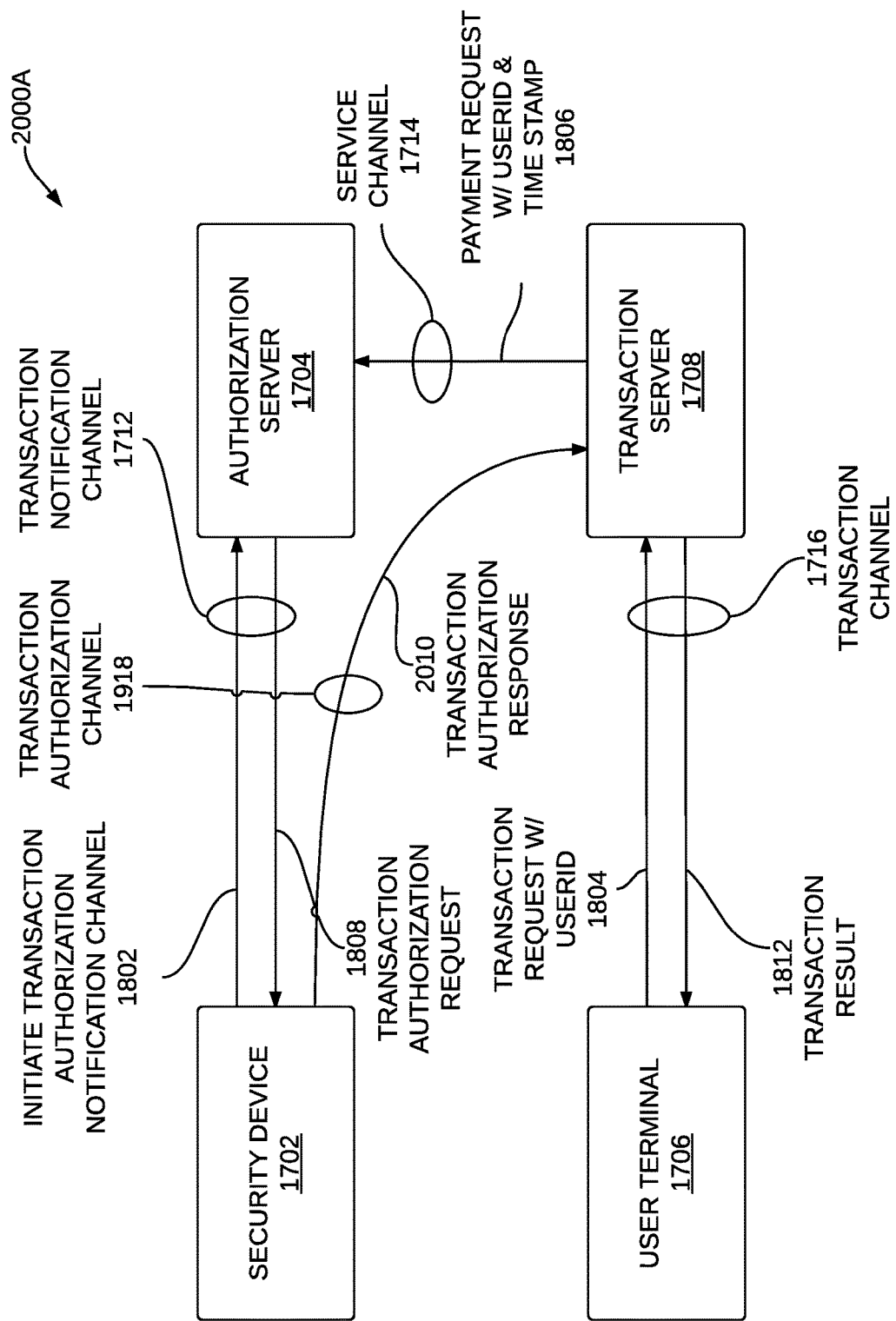
FIG. 20A shows a detailed block diagram of the embodiment shown in FIG. 19.
Figure 20B:
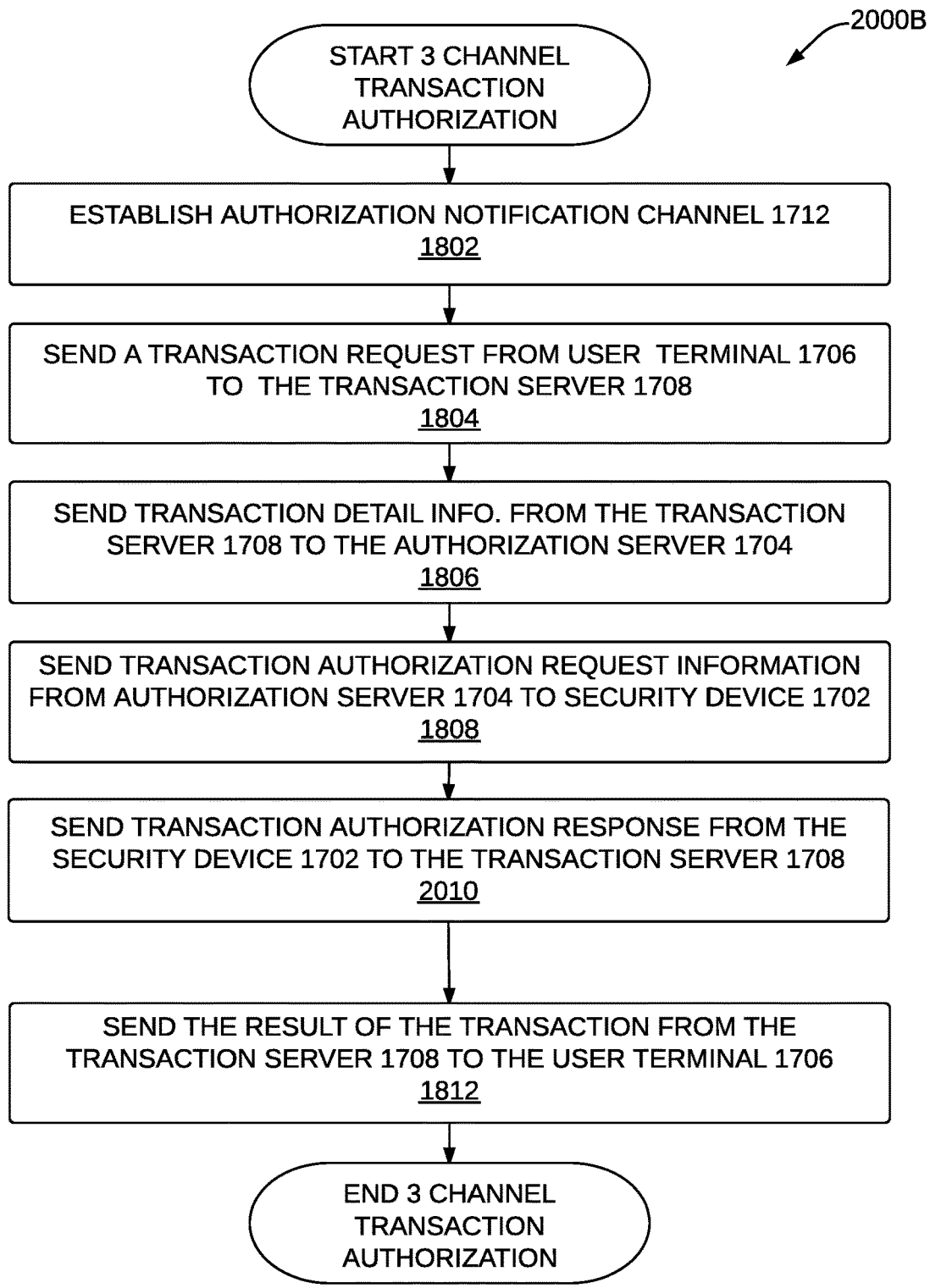
FIG. 20B shows a flowchart of a method of the embodiment shown in FIG. 20A.

In the Three Channel embodiment, the block diagram 2000A of FIG. 20A and the flowchart 2000B of FIG. 20B are similar to the block diagram 1800A of FIG. 18A and the flowchart of FIG. 18B respectively of the Two Channel embodiment, except that two steps, 1810 and 1811, have been replaced by a single step 2010. In step 2010, the security device 1702 sends 2010, over the transaction authorization channel 1918, the transaction authorization response, to the transaction server 1708.

Figure 21A:
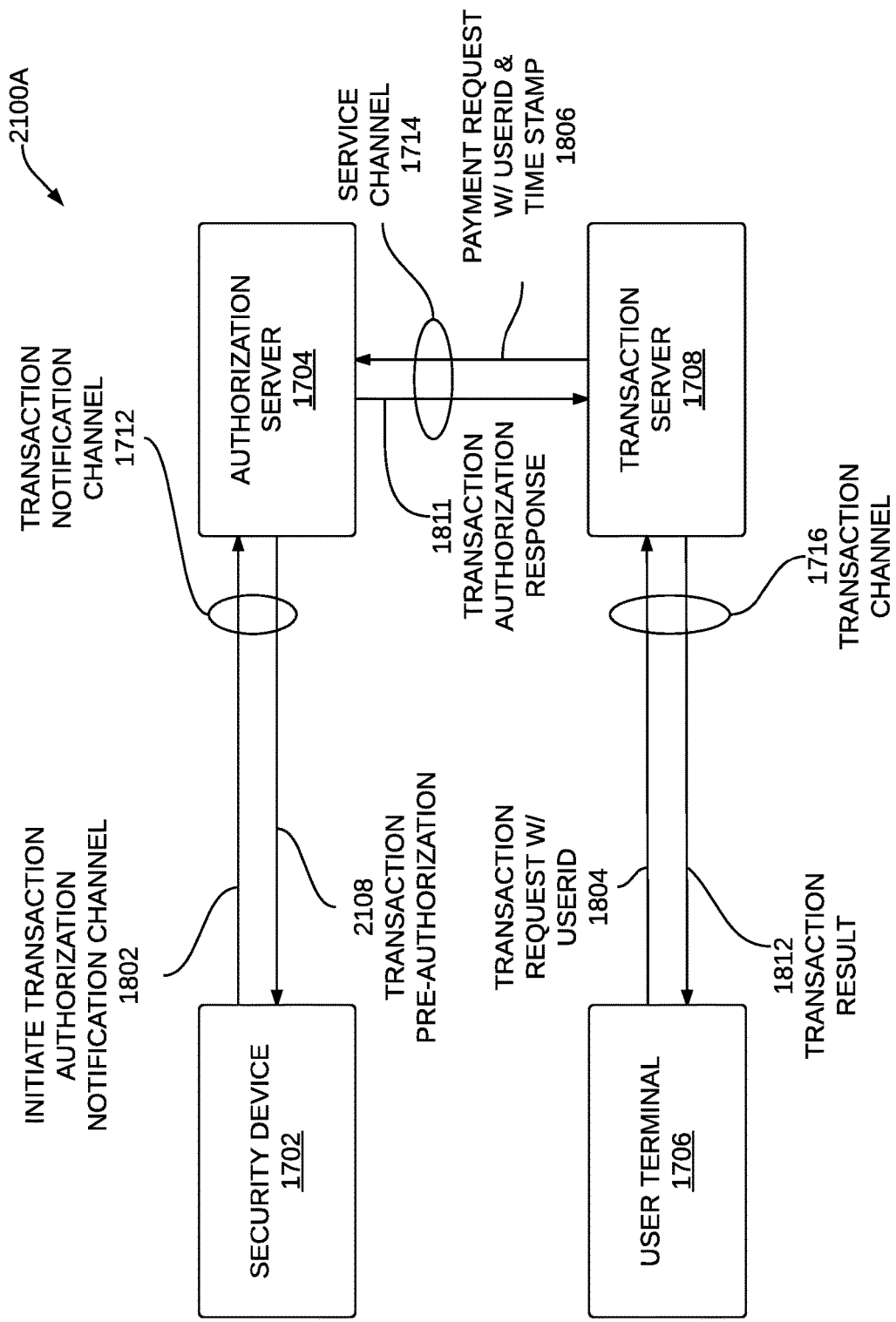
FIG. 21A shows a block diagram of another embodiment of the invention.
Figure 21B:
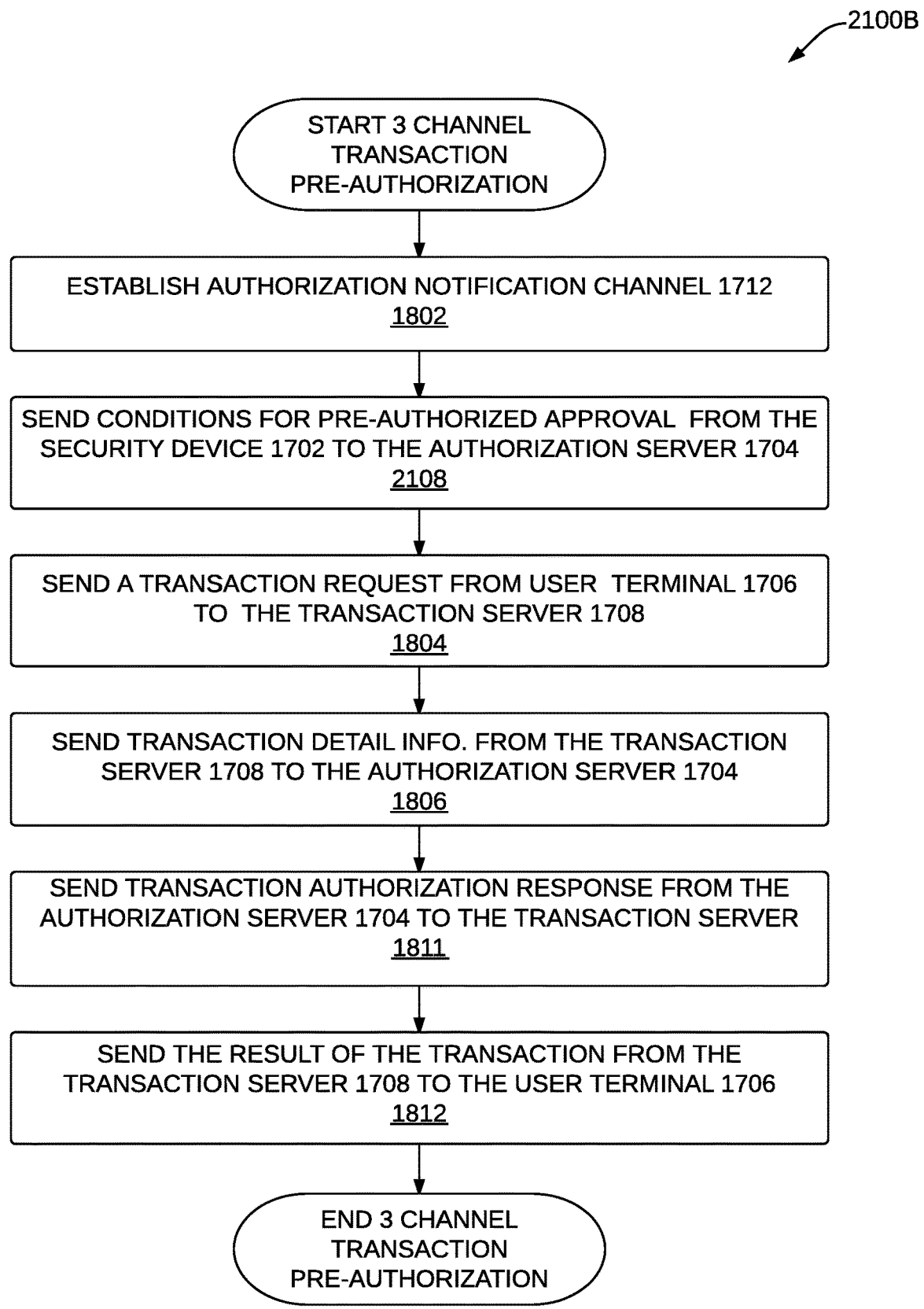
FIG. 21B shows a flowchart of a method of the embodiment shown in FIG. 21A.

Referring to the block diagram 2100A of FIG. 21A and the flowchart 2100B of FIG. 21B there is shown a variation of the Three Channel embodiment including transaction pre-authorization. This embodiment is similar to the embodiment of FIGS. 18A and 18B, except that two steps, 1808 and 1810 are replaced by step 2108. In step 2108, conditions for pre-authorization approval from the security device 1702 are sent 2108, on the transaction notification channel 1712, to the authorization server 1704.

Referring now to the block diagram 2200 of FIG. 22A another embodiment of the present invention, herein referred to as the QR (Quick Response) Code embodiment, will be described. The QR Code embodiment is similar that the Two-Channel embodiment of FIG. 17 except that the authorization server 2204 and the transaction server 2208 have added features as described below.

Figure 22A:
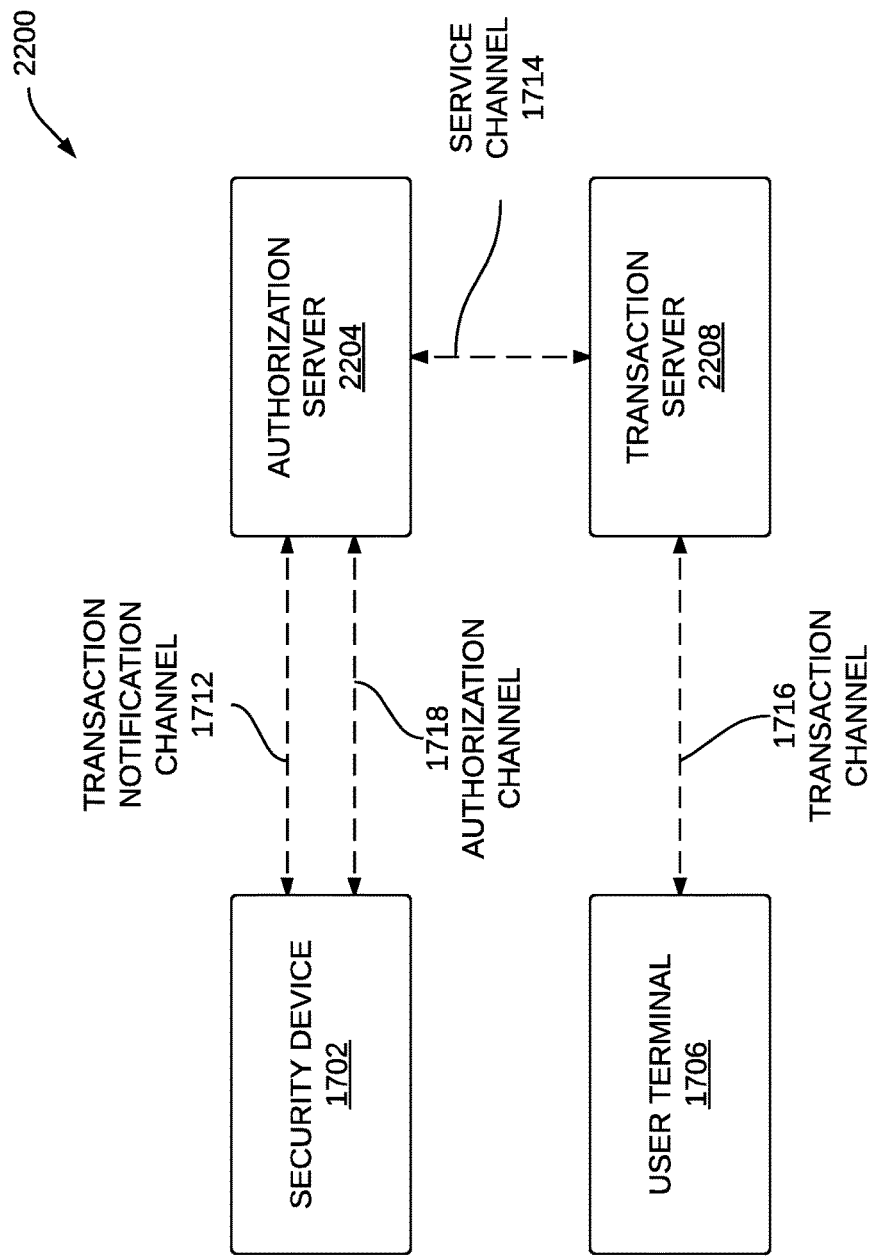
FIG. 22A shows a block diagram of another embodiment of the invention.
Figure 22B:
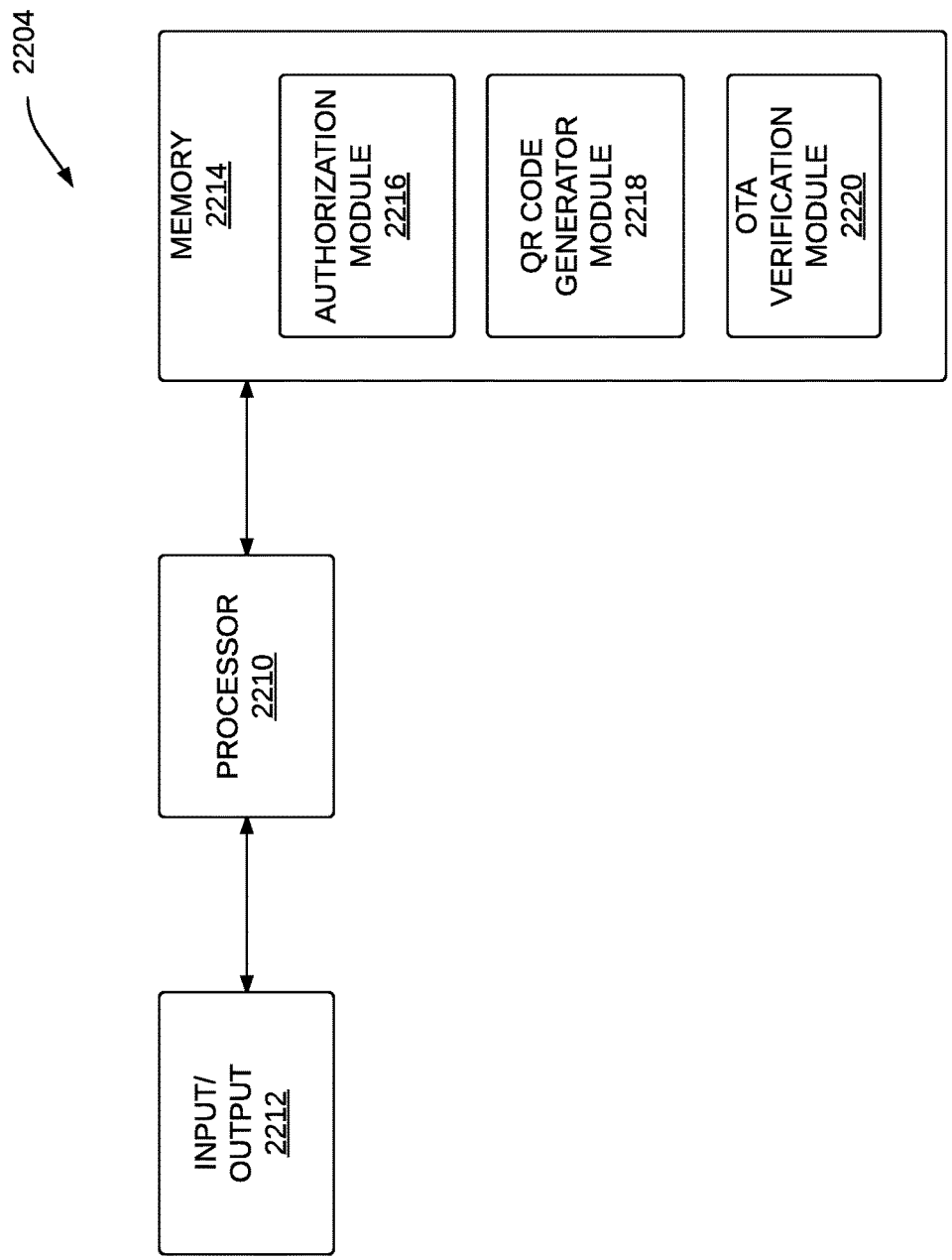
FIG. 22B shows a block diagram of an authorization server shown in FIG. 22A.

Referring to FIG. 22B there is shown a block diagram of the authorization server 2204 shown in FIG. 22A. The authorization server 2204 includes a processor 2210 with memory 2214 for storing computer readable instructions 2218 causing the processor to perform transaction authorization procedures as described herein below. The memory 2214 further includes computer readable instructions for generating QR codes 2218 and verifying OTA (One-Time-Authorization) codes 2220. The QR code 2218 and OTA code 2220 are described in the above referenced U.S. patent application Ser. No. 14/309,369.

The authorization server 2204 further includes input/output capabilities for operably communicating with the security device 1702 and transaction server 2208 on various channels as described herein below.

Figure 22C:
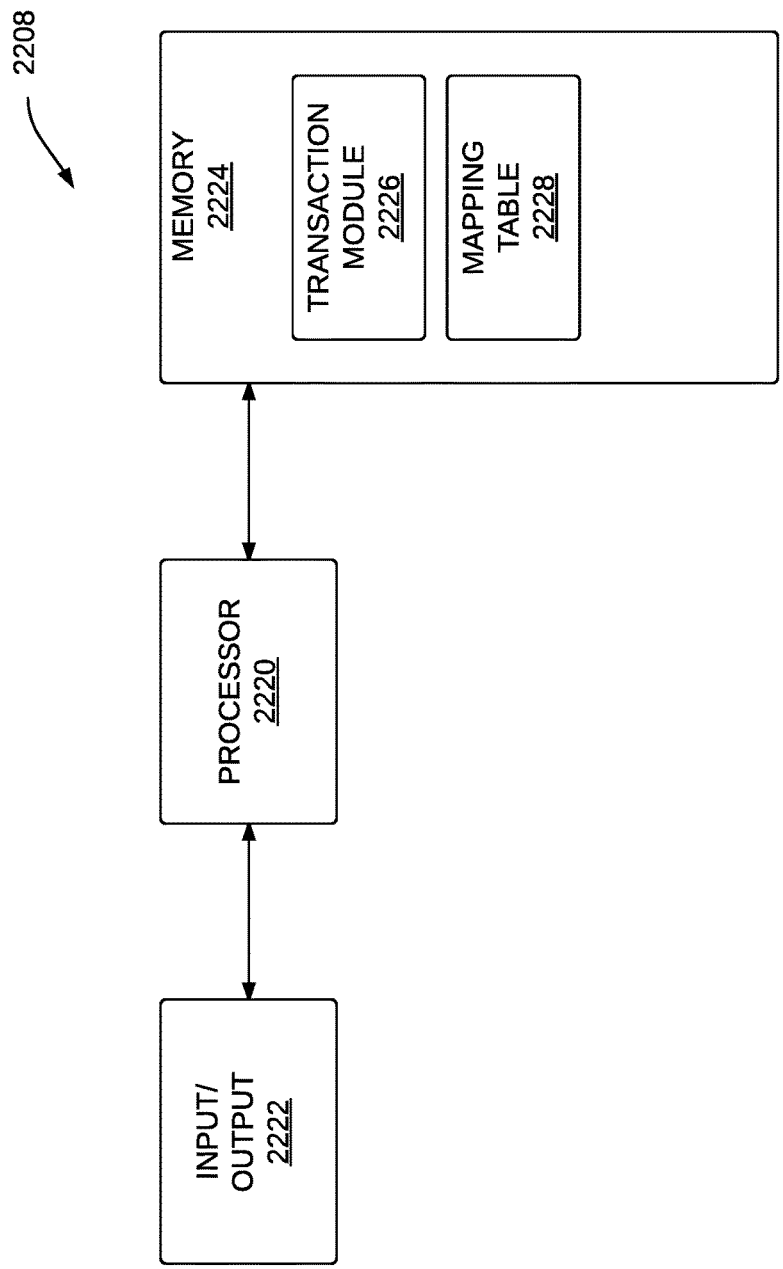
FIG. 22C shows a block diagram of a transaction server shown in FIG. 22A.

Referring to FIG. 22C there is shown a block diagram of the transaction server 2208 shown in FIG. 22A. The transaction server 2208 includes a processor 2220 with memory 2217 for storing computer readable instructions 2226 causing the processor to perform transaction procedures as described herein below. The transaction server 2208 includes a mapping table 2228 for mapping a transaction ID, such as credit card number, debit card number, etc., to user's ID residing in the authorization server 2204.

Figure 23A:
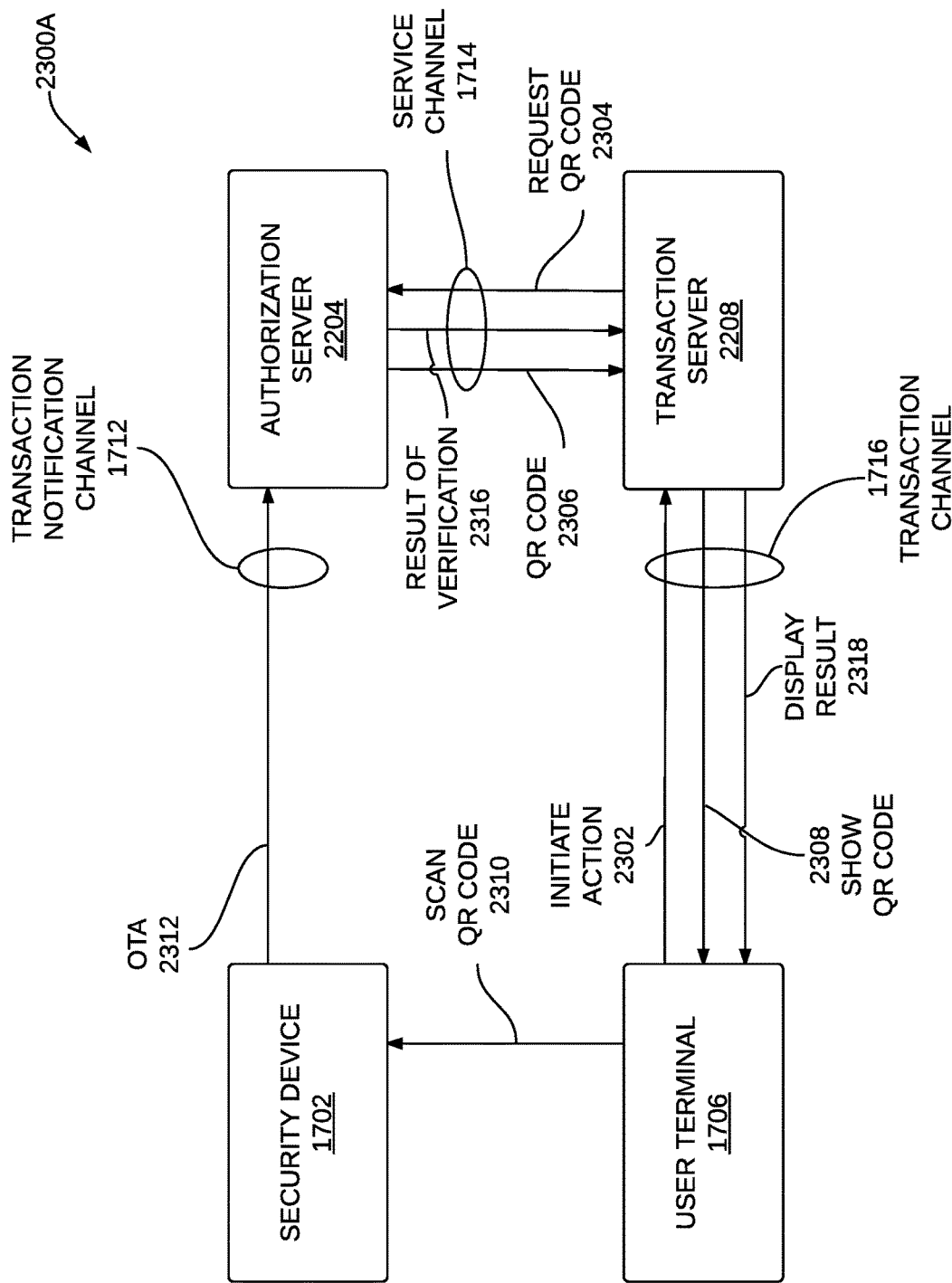
FIG. 23A shows a detailed block diagram of the embodiment shown in FIG. 22A.
Figure 23B:
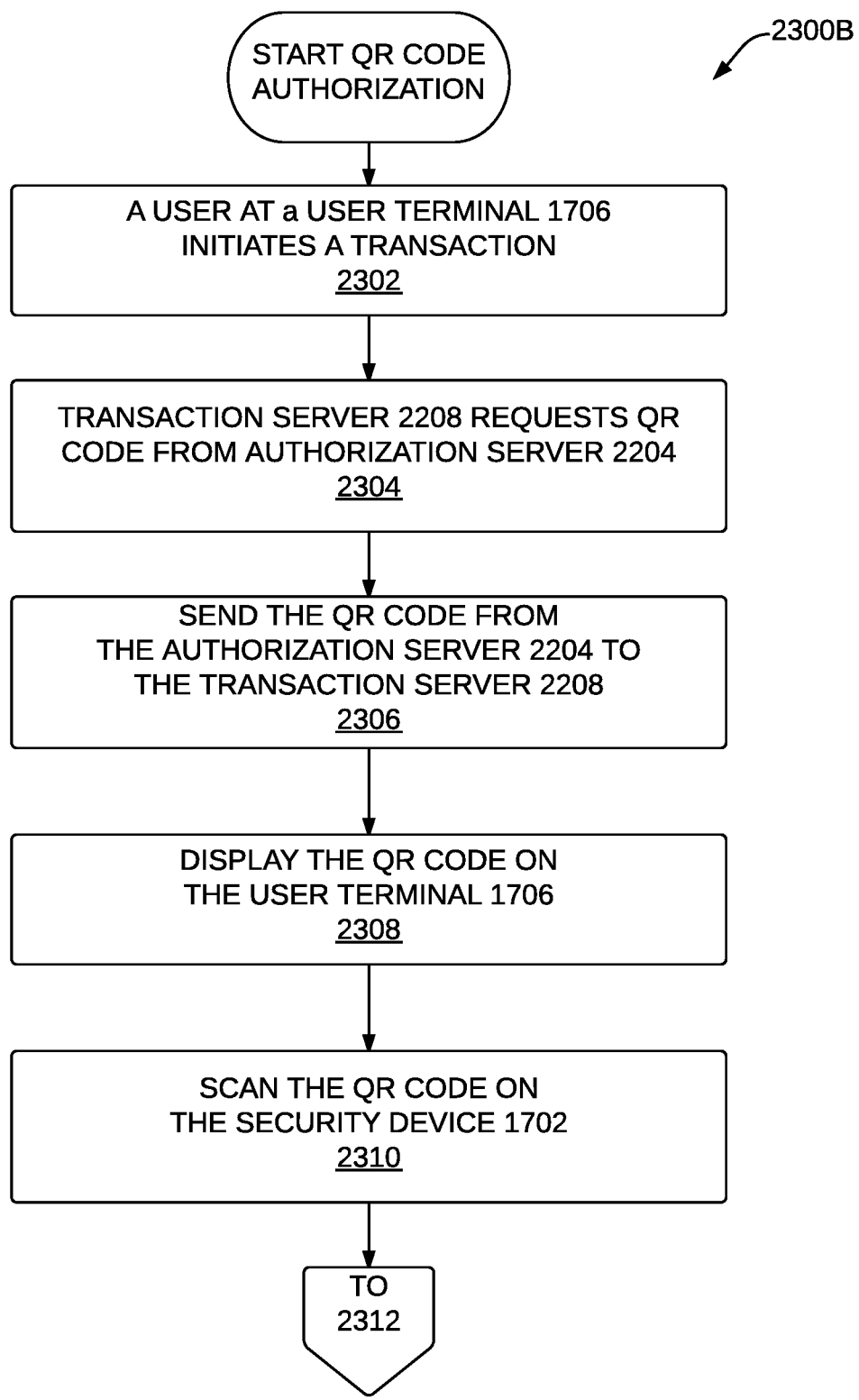
FIGS. 23B and 23C shows a flowchart of a method of the embodiment shown in FIG. 23A.
Figure 23C:
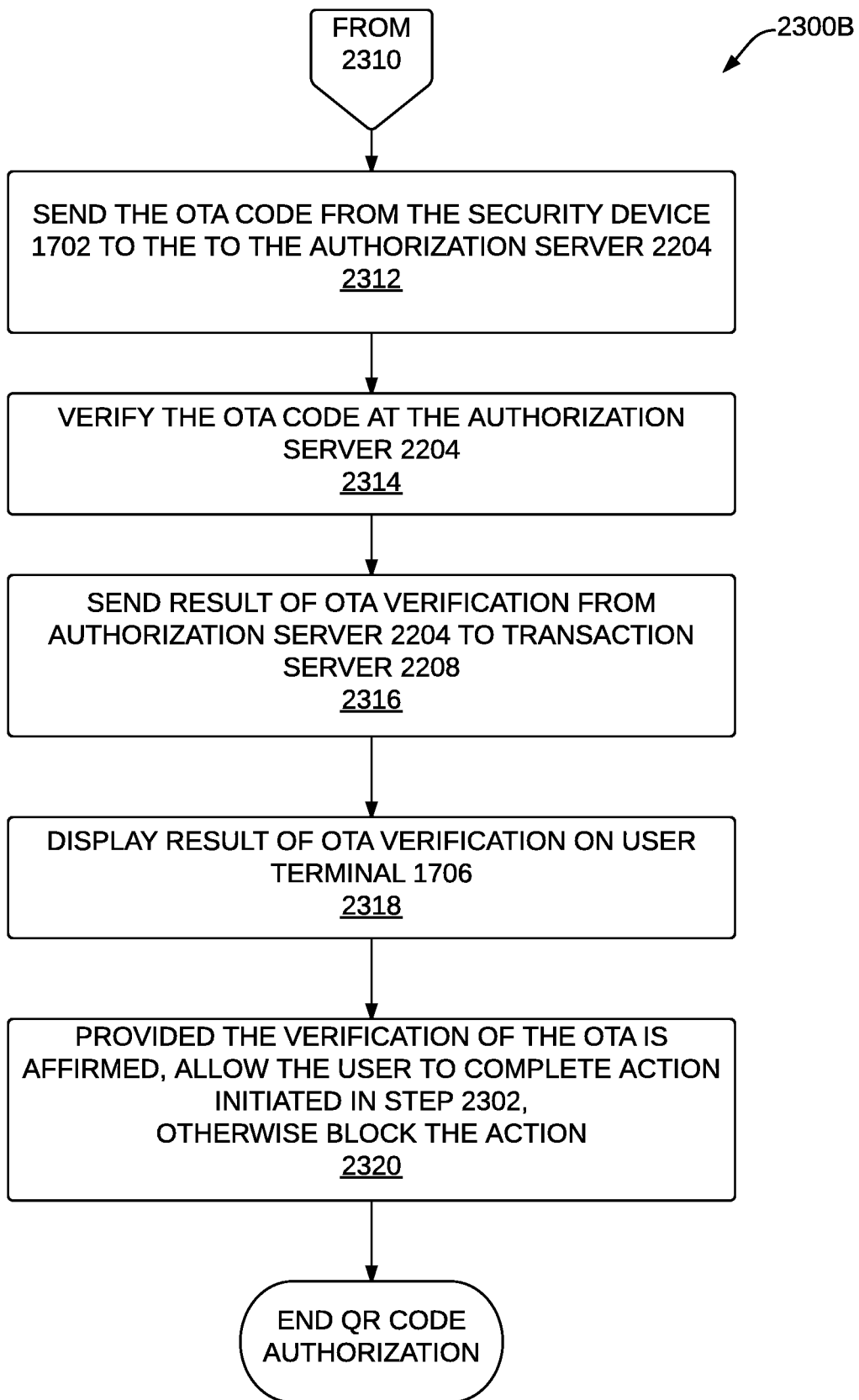

Referring now the block diagram 2300A of FIG. 23A and the flowchart 2300B of FIG. 23B there will be described a method in accordance with the QR Code embodiment of the invention.

Firstly, a user (not shown) at the user terminal 1706 initiates 2302 a transaction.

Next, the transaction server 2208 requests 2304 a QR code from the authorization server 2204

Next, the QR code is sent 2306 from the authorization server 2204 to the transaction server 2208.

Next, the QR code is displayed 2308 on the user terminal 1706.

Next, scan the QR code is scanned 2310 into the security device 1702.

Next, the OTA code is sent 2312 from the security device 1702 to the authorization server 2204.

Next, the OTA code is verified 2314 at the authorization server 2204.

Next, a result of OTA verification is sent 2316 from the authorization server 2204 to the transaction server 2208.

Next, the result of OTA verification is displayed 2318 on the user terminal 1706.

Next, provided the verification of the OTA is affirmed 2320, allow the user to complete the transaction action initiated in step 2302, otherwise block the action.

Detailed Description of Further Embodiments of the Invention

In the following we provide a detailed description of embodiments of the invention, together with two embodiments relating to example implementations of the invention at client side, as well as server side.

Figure 24A:
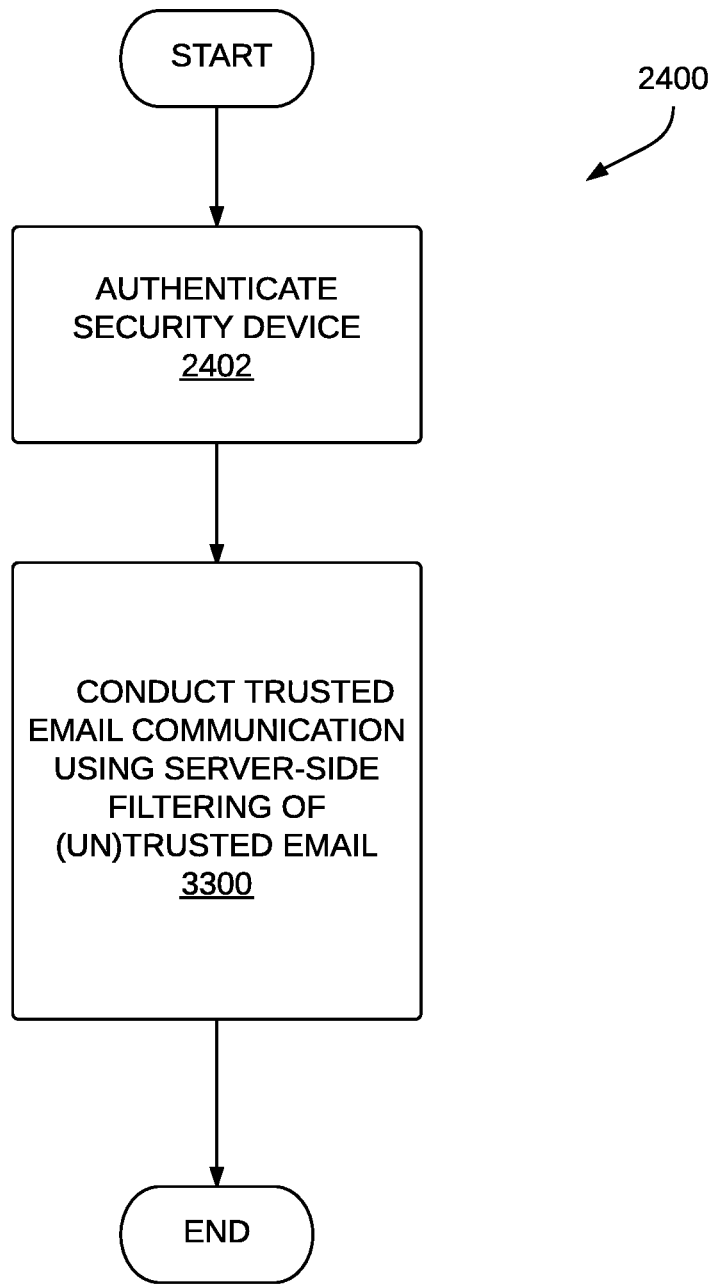
FIG. 24A shows a flowchart of a method of an embodiment of the invention for establishing trusted email communication.
Figure 24B:
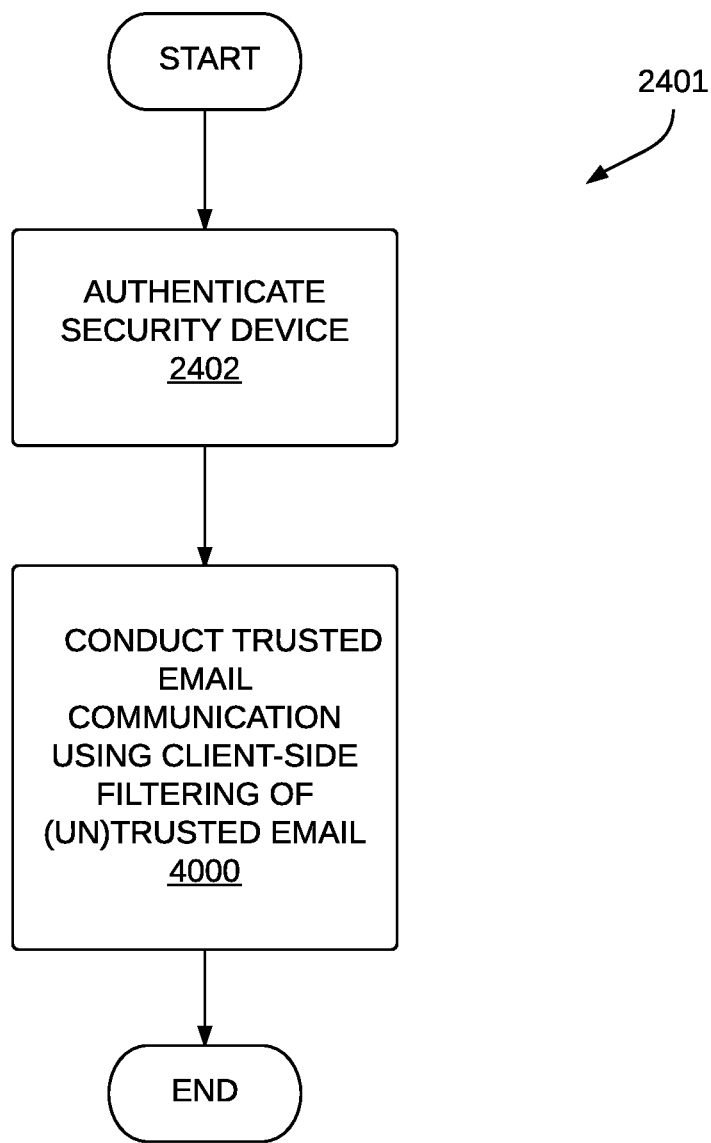
FIG. 24B shows a flowchart of another method of an embodiment of the invention for establishing trusted email communication.
Figure 40A:
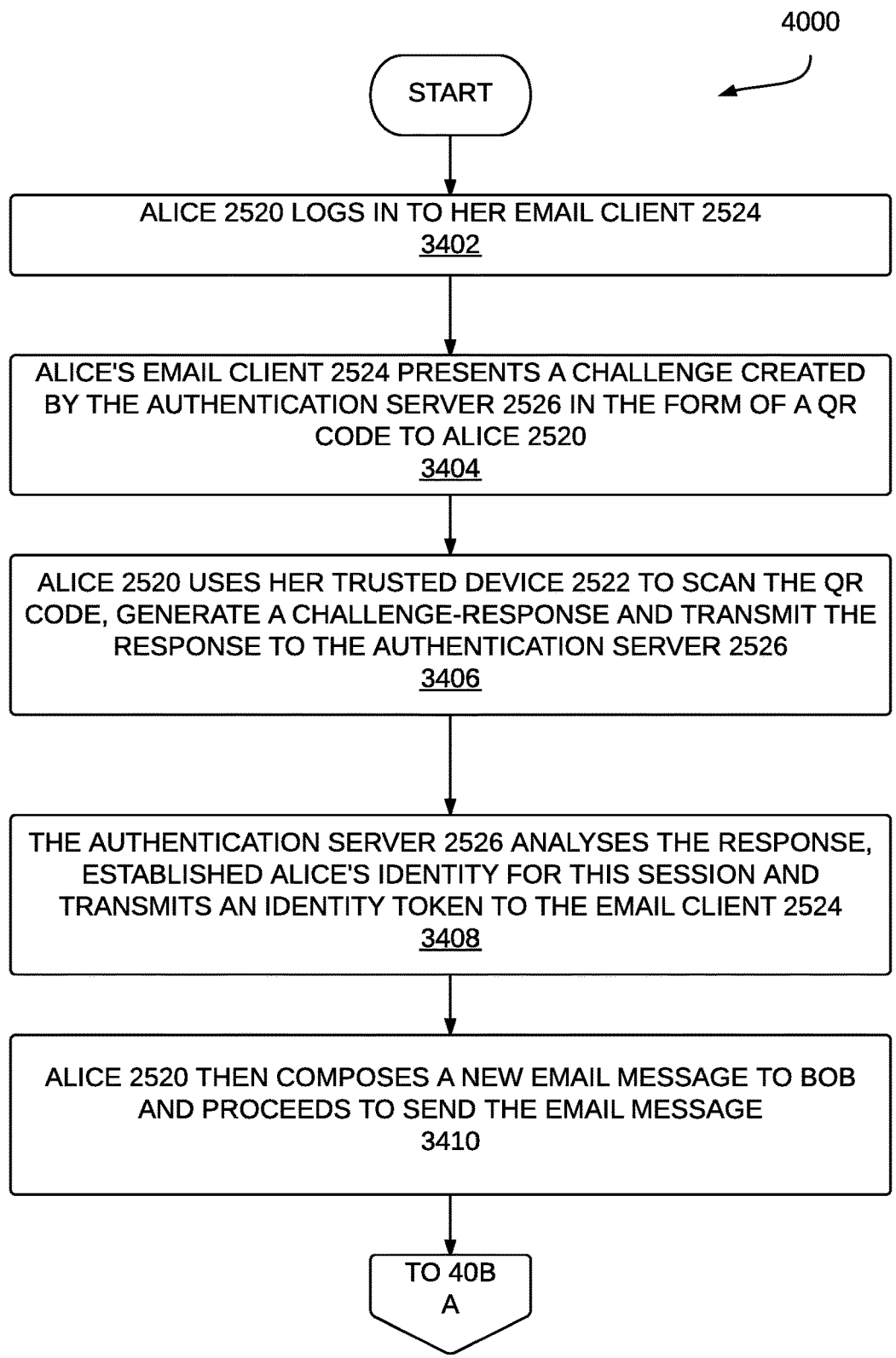
FIG. 40A is a first part of a flow chart of the embodiment of the invention shown in the block diagram of FIG. 34.
Figure 40B:
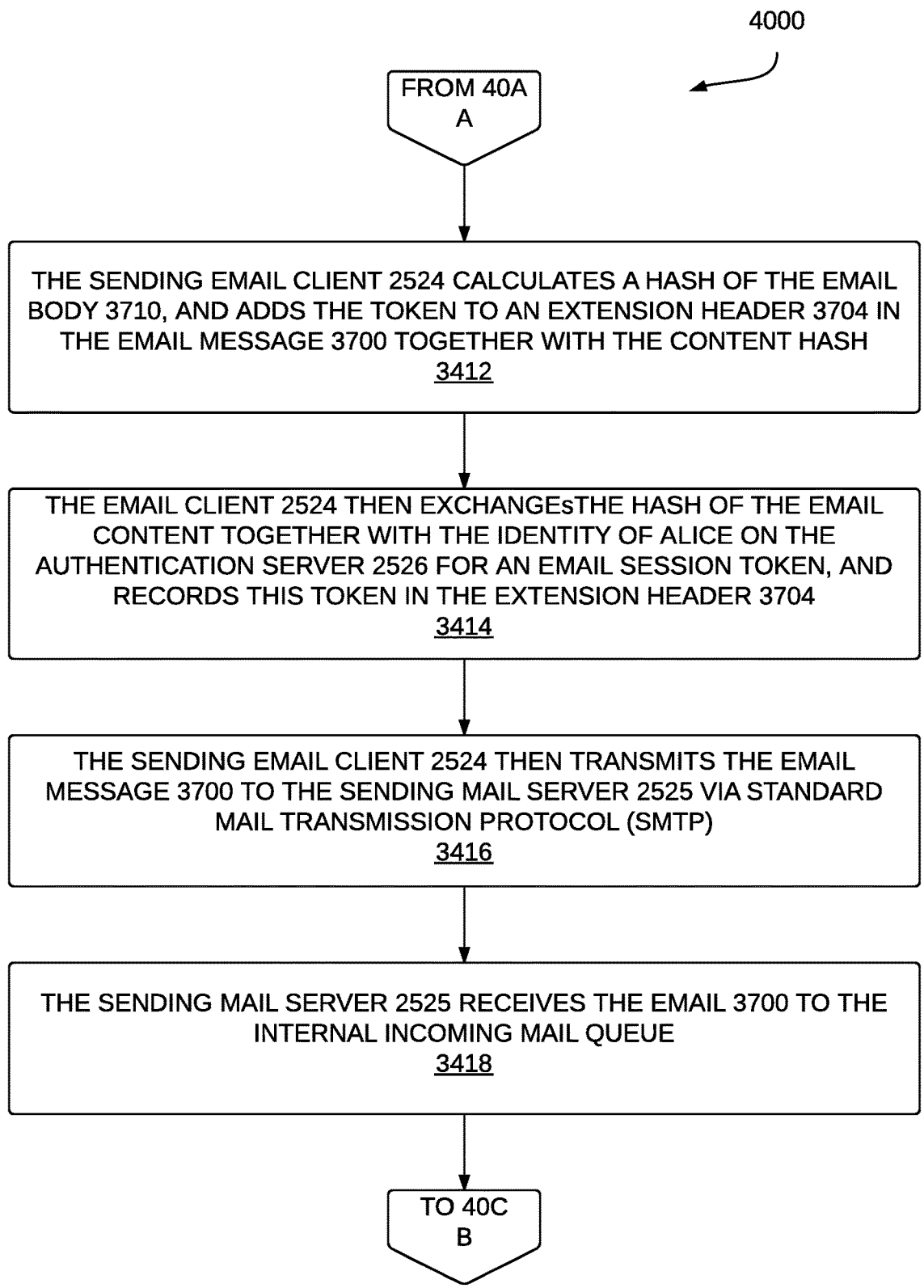
FIG. 40B is a second part of a flow chart of the embodiment of the invention shown in the block diagram of FIG. 34.
Figure 40C:
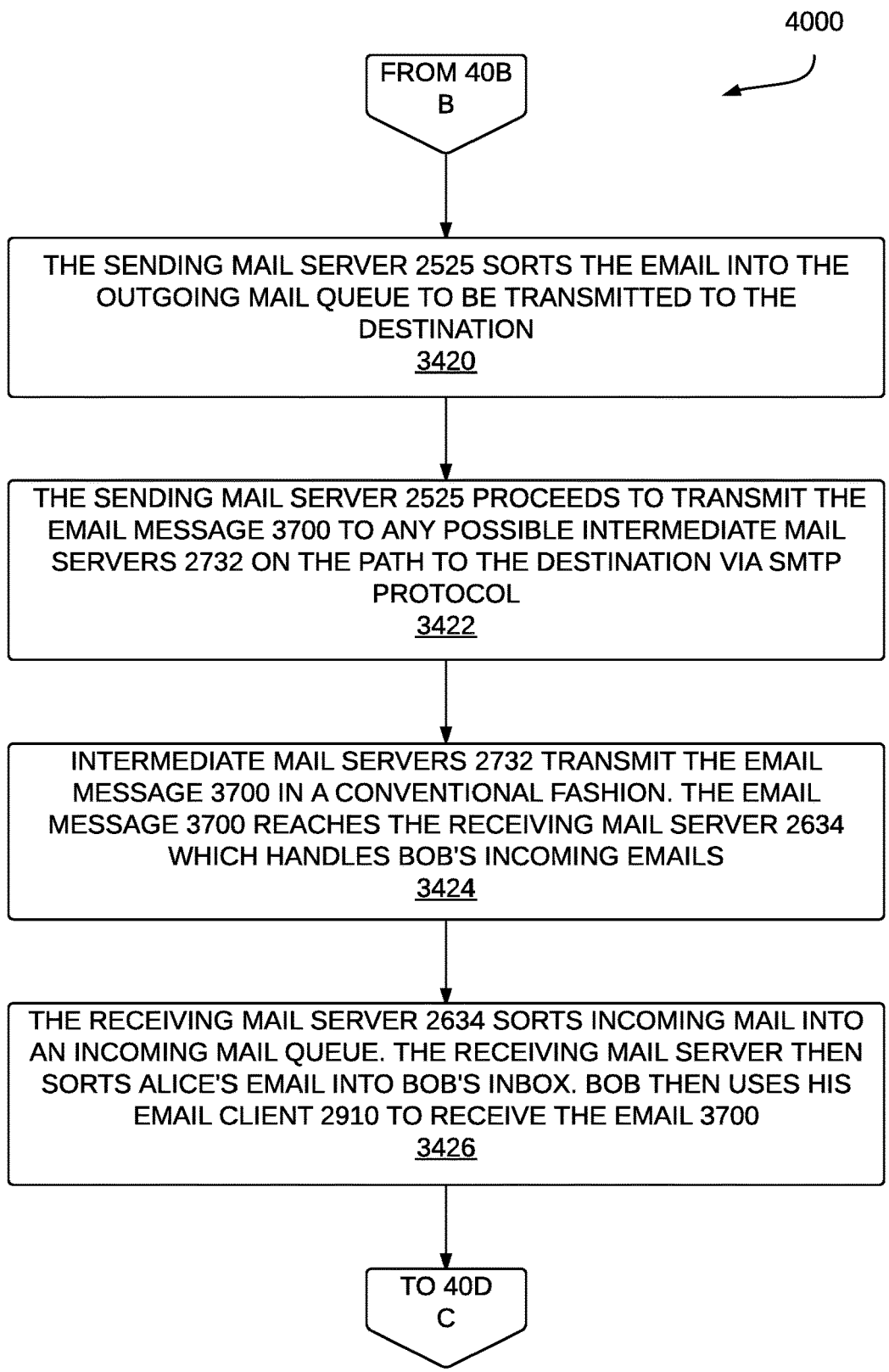
FIG. 40C is a third part of a flow chart of the embodiment of the invention shown in the block diagram of FIG. 34.
Figure 40D:
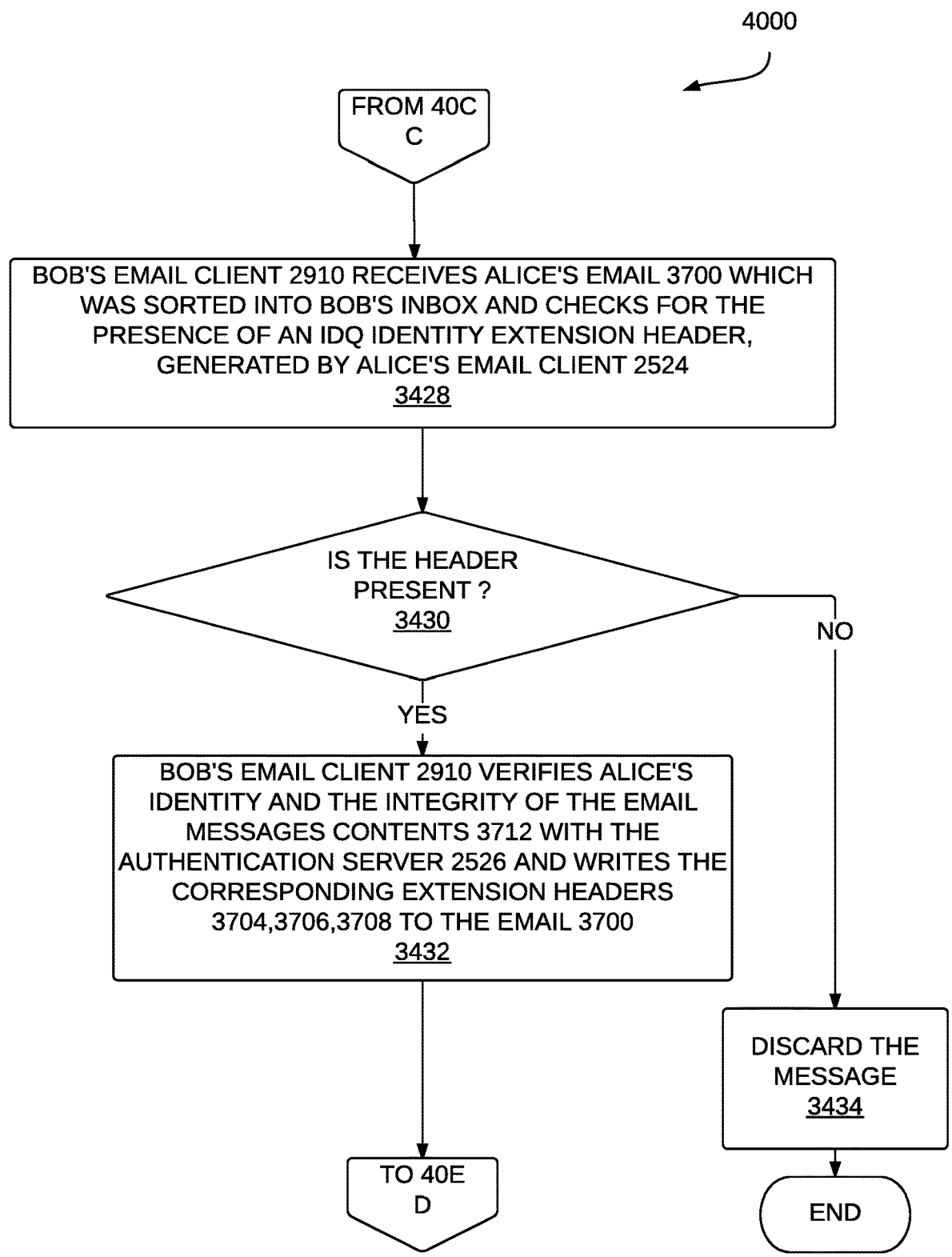
FIG. 40D is a fourth part of a flow chart of the embodiment of the invention shown in the block diagram of FIG. 34.
Figure 40E:
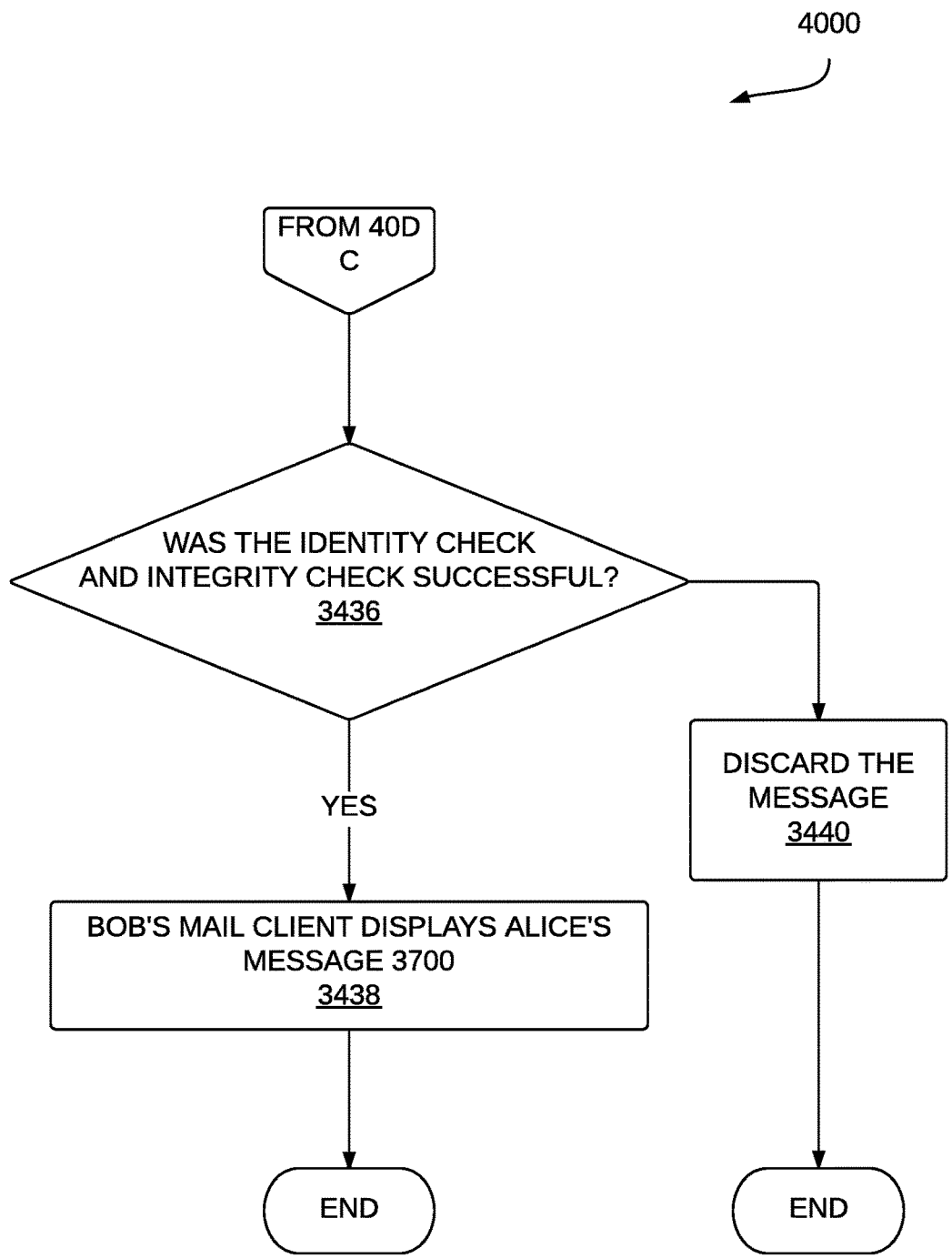
FIG. 40E is a fifth part of a flow chart of the embodiment of the invention shown in the block diagram of FIG. 34.

FIGS. 24A and 24B show flow charts 2400,2401 of two respective embodiments of the invention. Both embodiments include a first step of authenticating a security device 2402 described herein below with reference to FIGS. 2, 25 and 26. The first embodiment includes a second step of conducting trusted email communication using server-side filtering of (un)trusted email 3300 described herein below with reference to FIGS. 33A-33F. The second embodiment includes a second step of conducting trusted email communication using client-side filtering of (un)trusted email 4000 described herein below with reference to FIGS. 40-40E.

Security Device Authentication

Referring to FIG. 2 there is described hereinabove an authentication and transaction authorization mechanism for online applications/services. FIG. 2 illustrates the flow of access authentication/transaction authorization performed by a Proxy web server for a web application (e.g., Email client in this embodiment) or a transaction, where equivalently Proxy web server is authentication server in this embodiment. "Authentication is performed in two levels: the first authenticates the user and the trusted device locally; and the second authenticates the user remotely at the institutional-owned authentication server."

The trusted Device establishes the trusted relationship with authentication server through the device registration. The user needs to perform the local authentication using personal identifier (such as PIN or NFC tag or fingerprint) on his/her pre-registered trusted device, then use his/her trusted device to generates a response to the challenge issued by an authentication server.

Figure 25:
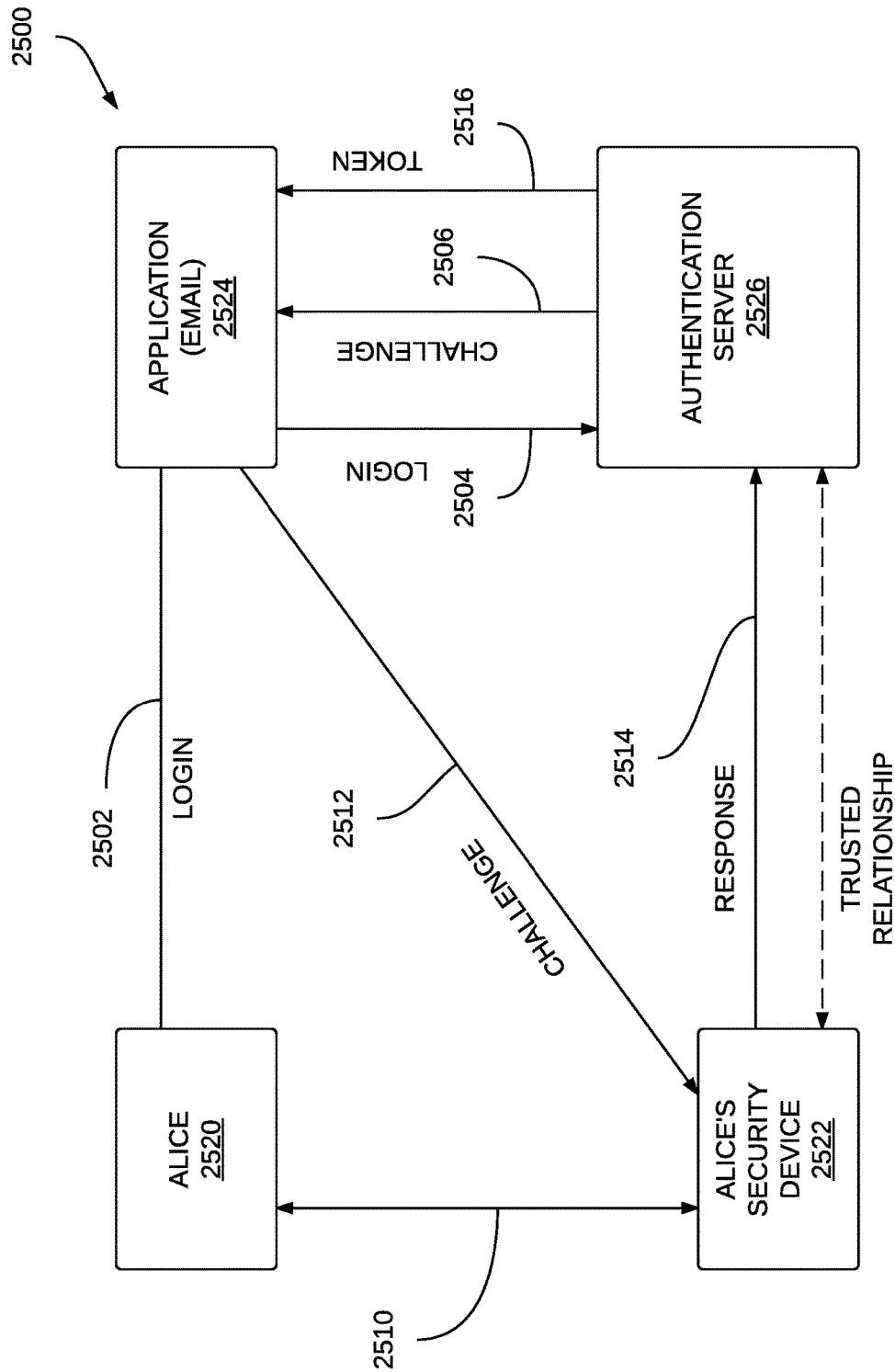
FIG. 25 a block diagram of an embodiment of the invention for authenticating a security device.
Figure 26:
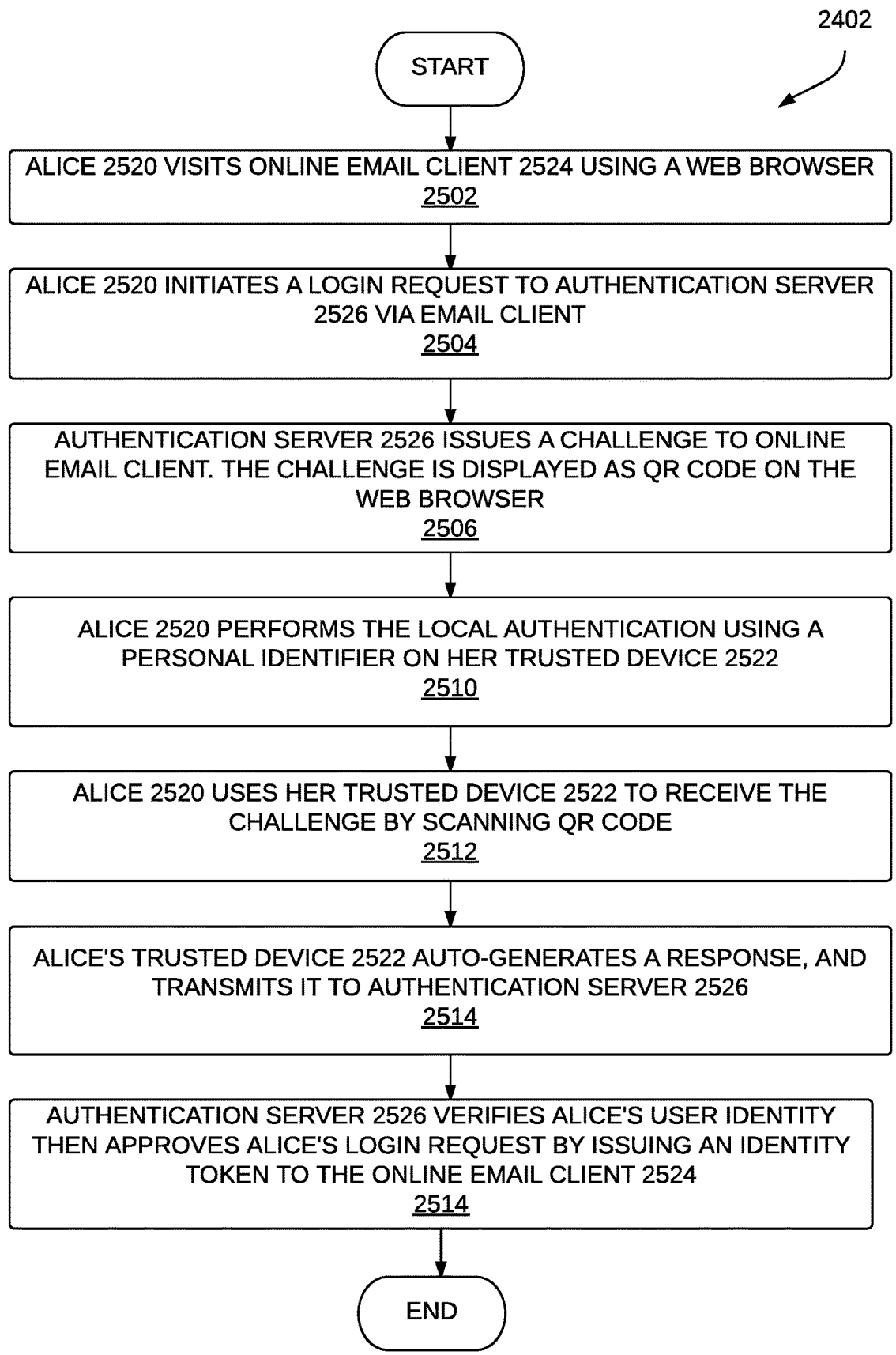
FIG. 26 is a flowchart of a method of the embodiment of the invention shown in the block diagram of FIG. 25.
Figure 27:
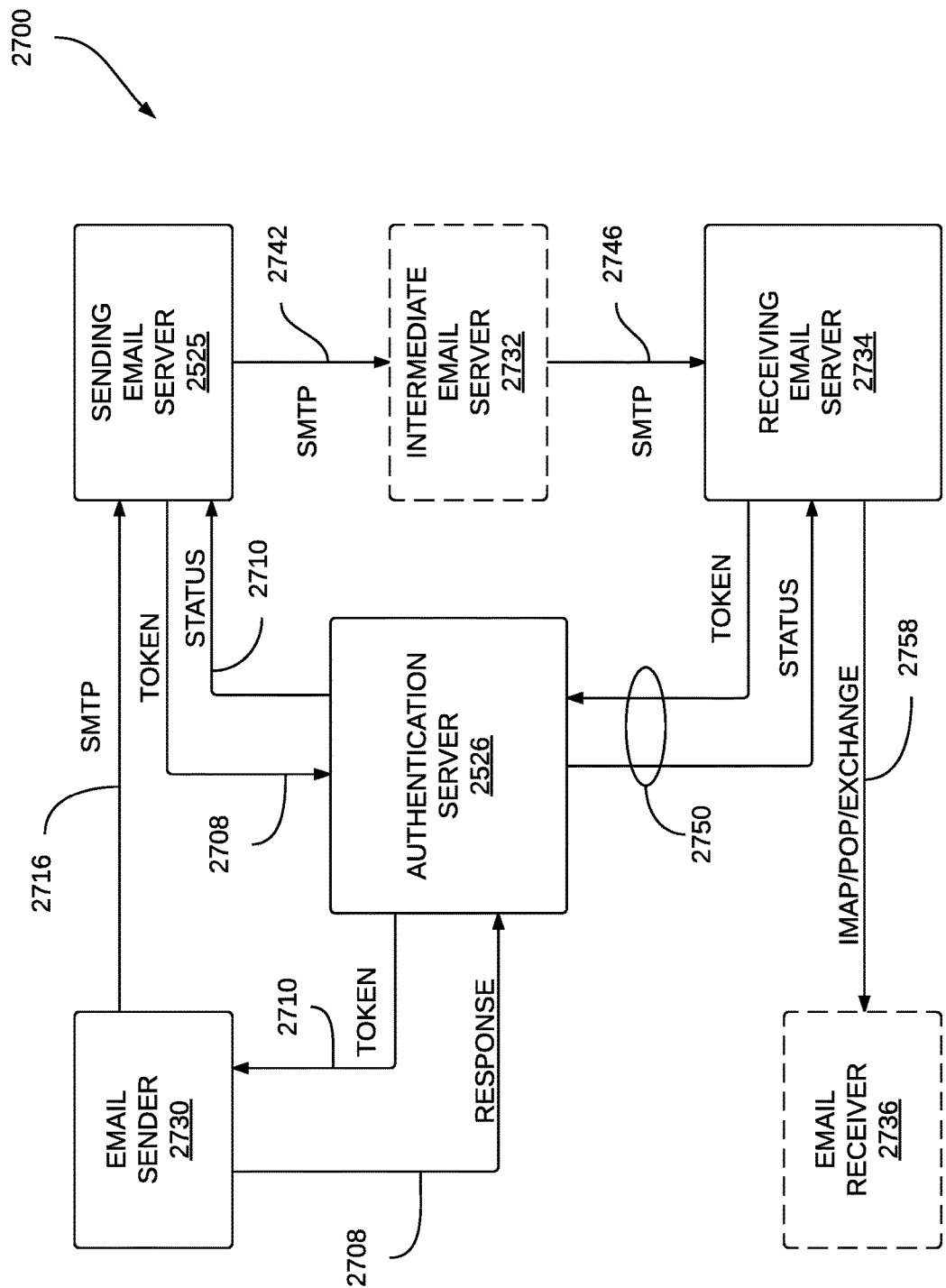
FIG. 27 is a block diagram of a first embodiment of the invention for establishing trusted email communication.
Figure 28:
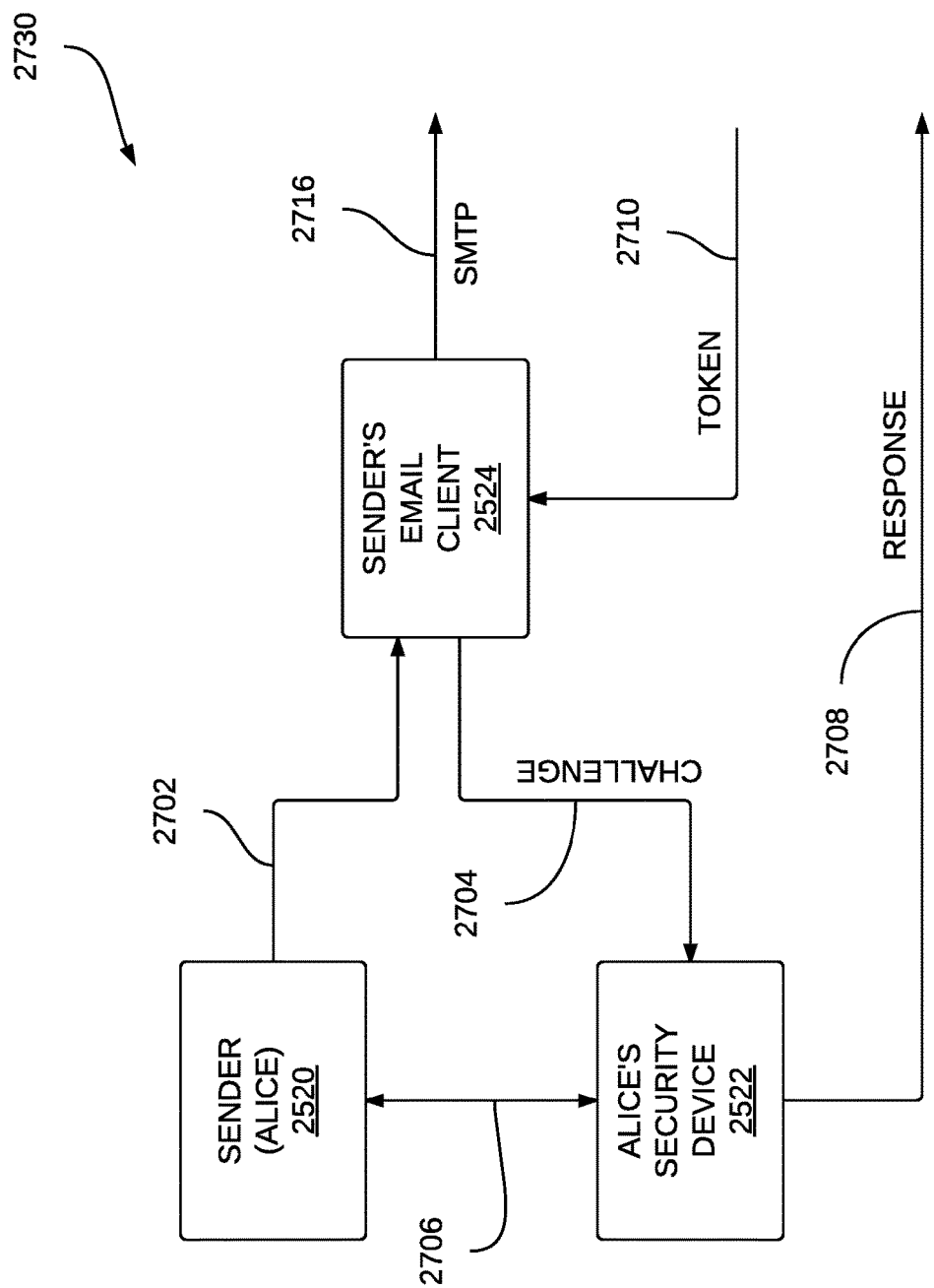
FIG. 28 is a block diagram of an email sender shown in FIG. 27.
Figure 29:
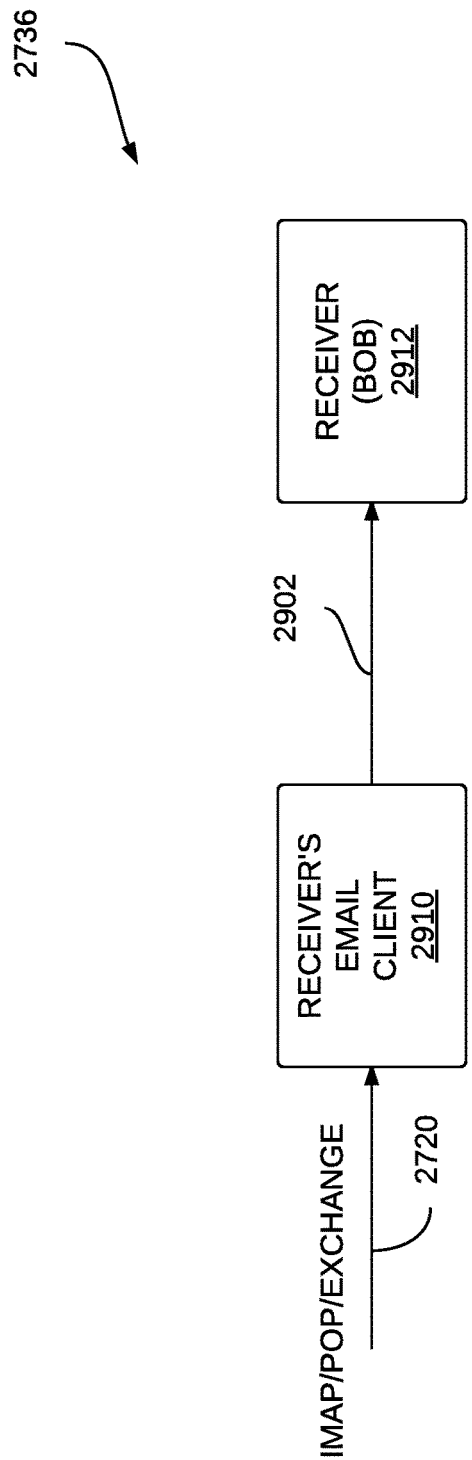
FIG. 29 is a block diagram of an email receiver shown in FIG. 27.

The block diagrams of FIG. 25 and the flow chart of FIG. 26 illustrate the flow of access authentication performed by the authentication server 2526 a web application 2524 (e.g., online Email client in this embodiment).

Alice 2520 visits 2502 an online Email client 2524 (e.g., GMAIL website) using a web browser. Then Alice 2520 initiates 2504 a login request to the authentication server 2526 via her Email client 2514.

The Authentication server 2526 issues a challenge 2506 to online Email client 2524. The challenge is displayed as QR (Quick Response) code on the web browser. Alice 2520 performs the local authentication 2510 using personal identifier (such as PIN or NFC tag or fingerprint) on her Trusted Device 2522, then uses her Trusted Device 2522 to receive the challenge 2512 by scanning QR code.

Alice's Trusted Device 2522 auto-generates a response 2514, and transmits it to authentication server 2526.

Authentication server 2526 verifies Alice's user identity by analyzing the response 2514 transmitted by Alice's Trusted Device 2522, then approves Alice's login request (or authorizes Alice's access request) to online the Email client 2524 by issuing an identity token 2516 (which consists of Alice's user identity) to online the Email client 2524, thus establishing Alice's identity for the login session.

This identity token is used by authentication server 2526 to perform trusted identity verification for each Email sent by Alice 2520 during the subsequent communication between a sending mail server (or a receiving mail server) and the authentication server 2526 as described herein below.

Server-Side Filtering of (Un)Trusted Email

FIGS. 27-32 are a graphical representation of a first embodiment of the present invention, which is used to perform server-side filtering of (un)trusted email. Individual steps in the flow chart of FIG. 33A-33F are numbered and described in the following. In this embodiment, a sender named ALICE 2522 sends an email message 3000 to a recipient named BOB 2912.

To do so, Alice 2520 logs in 2702 to her email client 2524, which supports trusted identity and mutually trusted authentication as described herein above. To establish a trusted login, the email client 2524 presents 2704 a challenge created by the authentication server 2526 in the form of a QR (Quick Response) code to Alice 2520. Alice 2520 uses her pre-registered trusted device 2522 to scan 2706 the QR code, generate a challenge-response and transmit 2708 the response to the authentication server 2526. The authentication server 2526 analyses the response, establishes Alice's identity for this session and transmits 2010 an identity token to the email client 2524.

Alice 2520 then composes a new email message 3000 to Bob 2912 and proceeds to send 2712 the email message 3000. The sending email client 2524 calculates 2714 a hash of the email body 3010, and adds the identity token, herein after referred to as the idQ identity token 3004, to an extension header 3004 in the email message 300 together with the content hash. The sending email client 2524 transmits 2715 the token 3004 together with the content hash 3010 to the authentication server 2526. The sending email client 2524 then transmits 2716 the email message 3000 to the sending mail server 2525 via standard mail transmission protocol (SMTP). The sending mail server 2525 receives 2718 the email 3000 to the internal incoming mail queue.

The sending mail server 2525 checks 2720 for the presence of the idQ identity token 3004 in the email extension header 3002, if not present discards the message 2728, if present proceeds to verify 2722 Alice's identity with the authentication server 2526 using the idQ identity token 3004. The sending email server 2525 then modifies 2724 the extension header fields 3006,3008 of the email 3000 to indicate that checking of trusted identity has been carried out and indicates the status of the identity check. Provided the identity check was successful, the email message 3000 is sorted 2740 into the outgoing mail queue to be transmitted to the destination, BOB 2912, otherwise the message is discarded 2728.

The sending mail server 2525 proceeds to transmit 2742 the email message to any possible intermediate mail servers 2732 on the path to the destination via SMTP protocol. Intermediate mail servers 2732 may or may not perform 2744 trusted identity checking and mail filtering and sorting corresponding the outcome of the trusted identity check as outline in steps 2720-2726. Eventually, the email message reaches 2746 a receiving mail server 2734 which handles Bob's incoming emails.

When receiving new email messages, the receiving mail server 2734 sorts 2748 incoming mail into an incoming mail queue. The receiving mail server 2734 performs 2750 trusted identity checking as outline in steps 2720-2726. The receiving mail server 2734 then modifies 2752 the email extension headers 3006,3008 to indicate that it performed an identity check and the outcome of this check. The receiving mail server 2734 then sorts 2754 Alice's email 3000 into Bob's inbox. Bob 2912 then uses his email client 2910 to receive 2756 the email 3000. Bob's email client receives 2758 Alice's email 3000 which was sorted into Bob's inbox and checks 2760 for the presence of an idQ identity verification header 3006, generated by the receiving mail server in step 10 2752. Provided the header is present Bob's email client can mark 2762 the email as a trusted email with a verified identity.

We note the following: the sending mail server on which Alice has an account will not send email to an email server on which Bob has an account, unless Alice can establish her trusted identity. The receiving mail server will not accept the incoming message unless Alice established her trusted identity in a previous step. If Bob does not wish to receive email from Alice, Bob can configure his email client to discard emails that contain Alice's identity (blacklisting). Also, Bob may configure his email client to sort all emails with a trusted identity into a separate mail folder.

Figure 30:
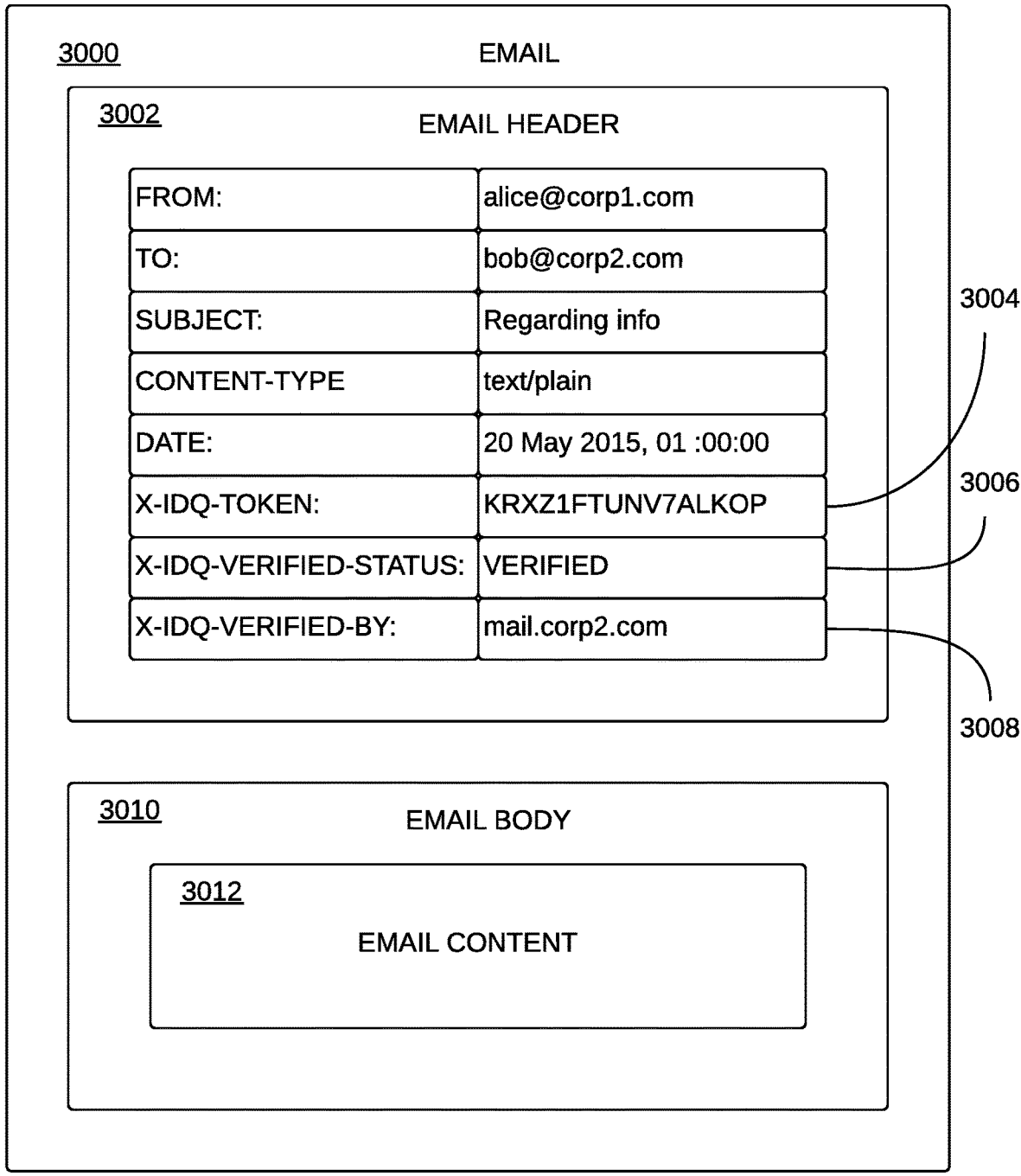
FIG. 30 is a block diagram of an email in accordance with embodiments of the present invention.

FIG. 30 illustrates a graphical representation of the parts of the email message 3000. The email message 3000 includes two separate containers of information: the email header 3002 and the email body 3010. Inside the email header 3002, different key-value pairs make up email header entries and describe meta-data about the email message 3000, such as the sender, the recipient, routing information, date, time content encoding or message subject.

The RFC 822 specification provides a full description of email headers. As part of the RFC 822 specification is a description of extensions to the standard (required) email headers. Extension headers start with "X-" and can be used by email clients to add additional meta-data about the email message 3000. For the first embodiment of this invention, we specify three extension headers that allow filtering and sorting of emails, as well as verification of the trusted identity of sender/recipient, in addition to verification of the email message contents' 3012 integrity.

The X-IDQ-TOKEN extension header 3004 value describes the idQ identity token provided to the email client by the authentication server in step 2710. The email client 2524 or Internet mail server 2525 can use the value of this token to establish the trusted identity of the email sender 2730 or recipient 2736 with the authentication server 2526.

The X-IDQ-VERIFIED-STATUS extension header 3006 value describes the outcome of an identity check with the authentication server 2526. This extension header value 3006 is intended to be (over)written by any client or internet mail server performing a check for the trusted identity of a sender or recipient on the email message 3000 and is used to record the outcome of this check.

The X-IDQ-VERIFIED-BY extension header 3008 value records the client or internet mail server who last performed a check of the trusted identity of the sender or recipient with the authentication server 2526.

Figure 31:
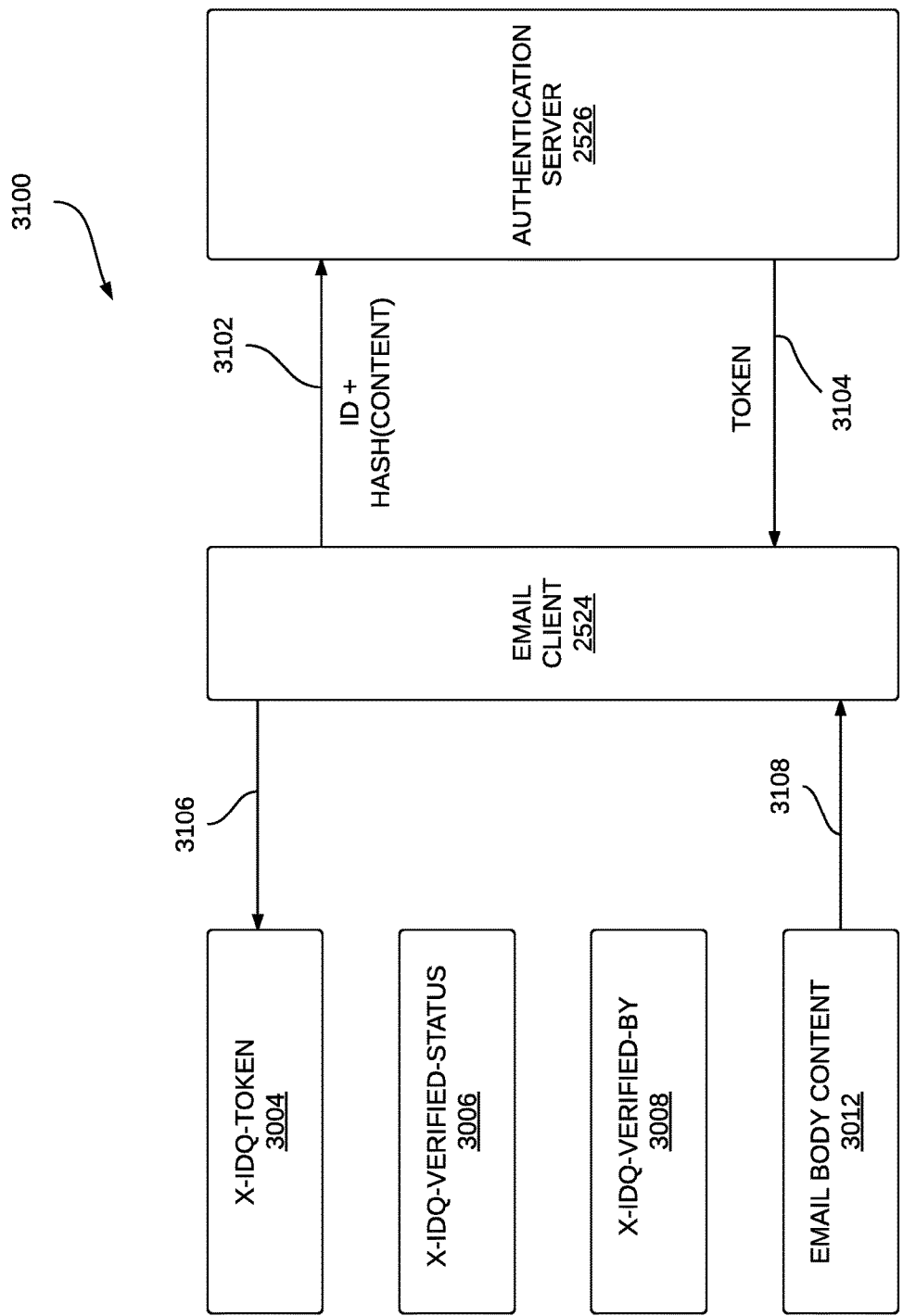
FIG. 31 is a block diagram showing details of a mail sending client shown in FIG. 27.

FIG. 31 illustrates the provisioning of the X-IDQ-TOKEN extension header 3004 by the sending client 2524. The sending client 2524 reads 3108 the email message content container 3012 and calculates a hash value 3102. The sending client 2524 then exchanges 3104 Alice's identity token (ID) and the hash code for an email session token on the authentication server 2526. The sending client 2524 then stores the 3106 email session token in the extension header field 3004.

Figure 32:
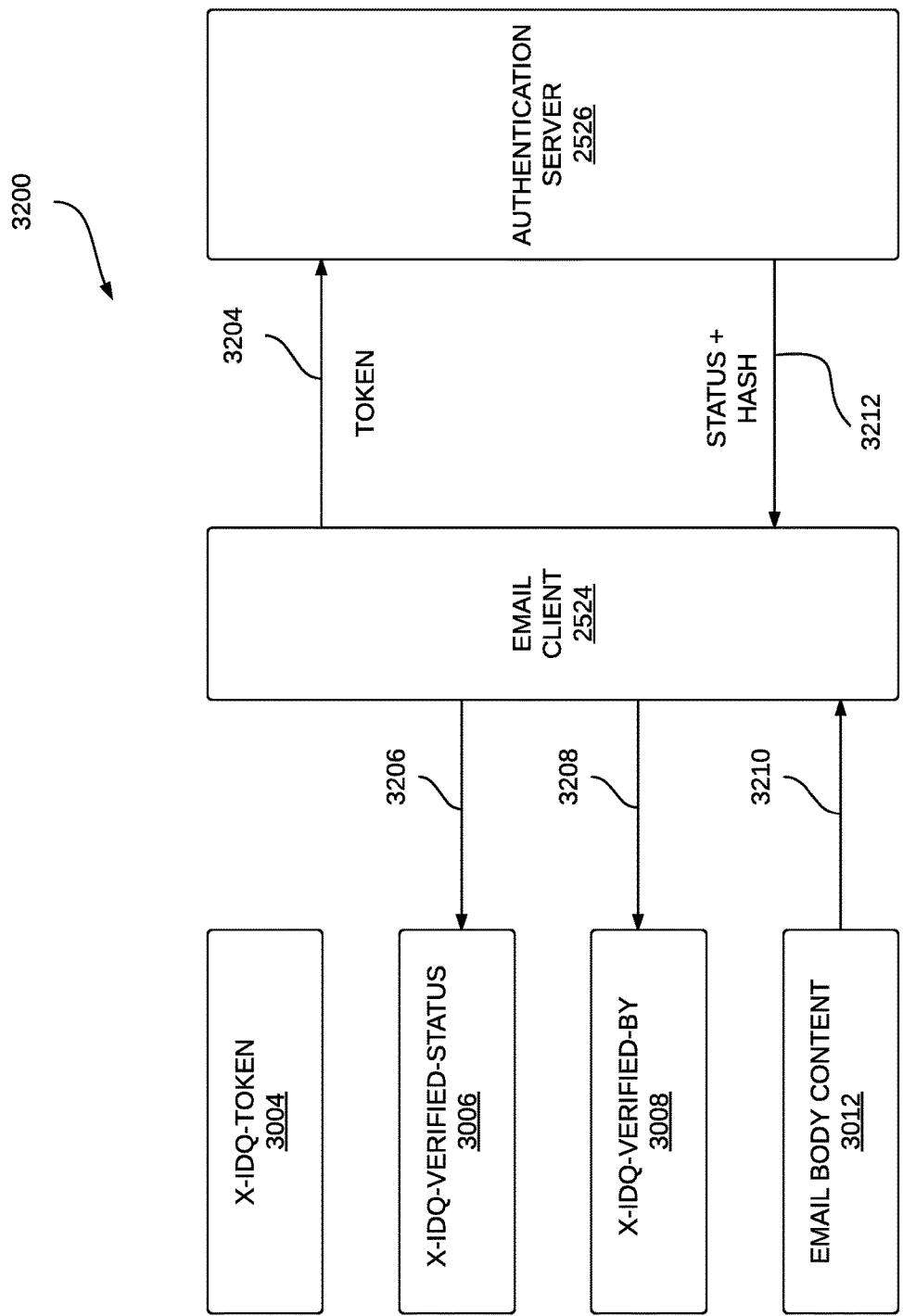
FIG. 32 is a block diagram showing details of a mail sending server shown in FIG. 27.
Figure 33A:
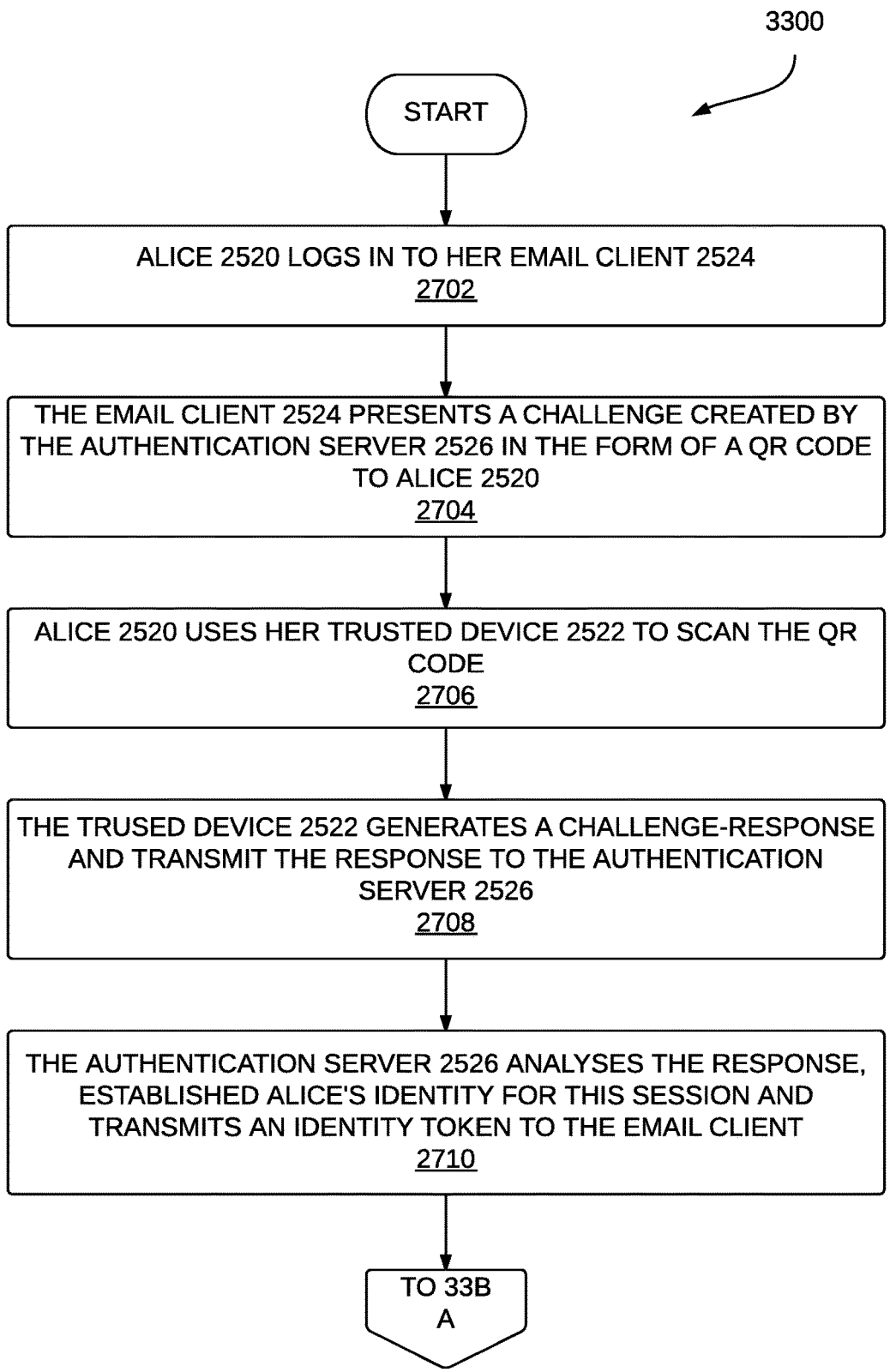
FIG. 33A is a first part of a flow chart of the embodiment of the invention shown in the block diagram of FIG. 27.
Figure 33B:
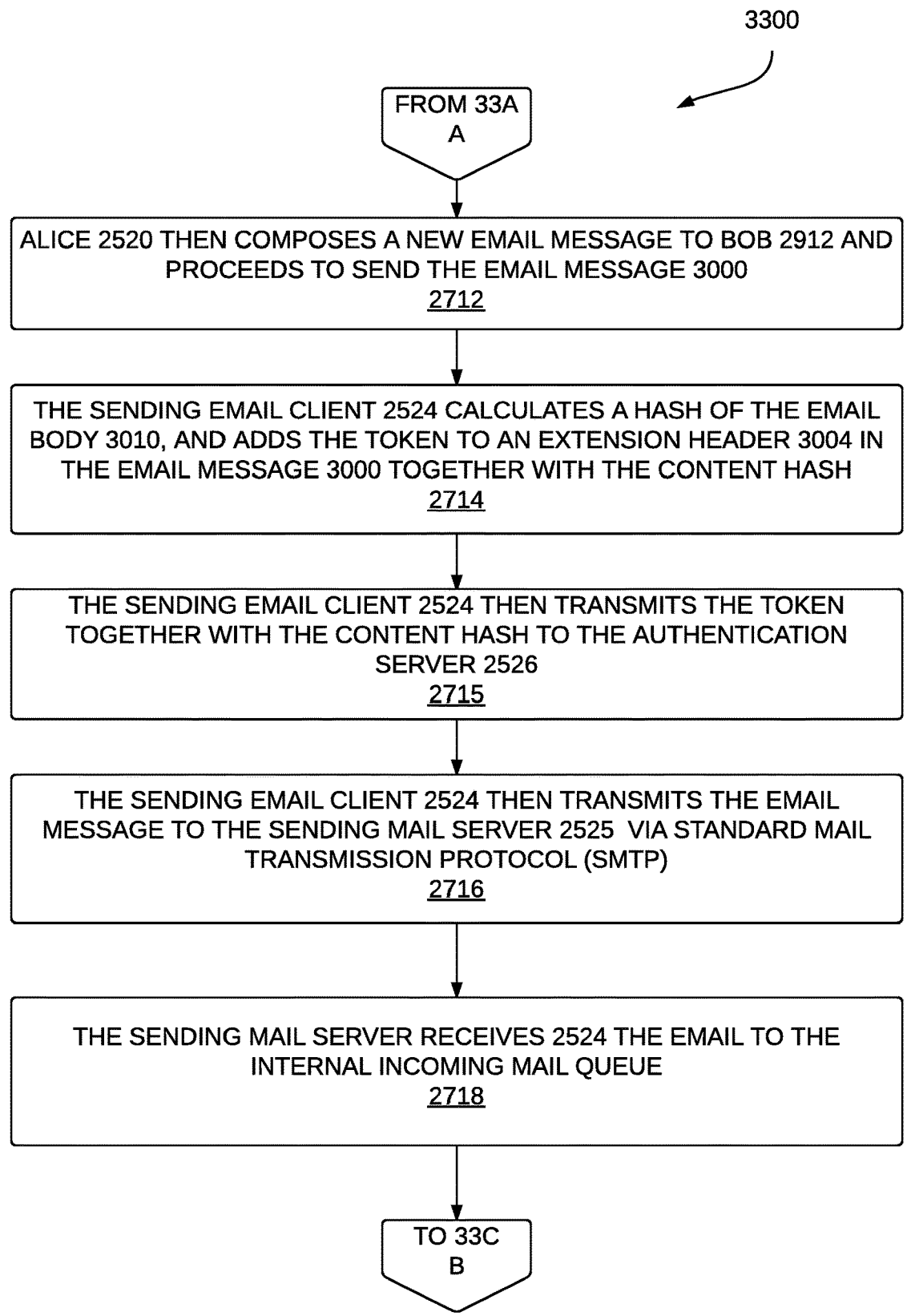
FIG. 33B is a second part of a flow chart of the embodiment of the invention shown in the block diagram of FIG. 27.
Figure 33C:
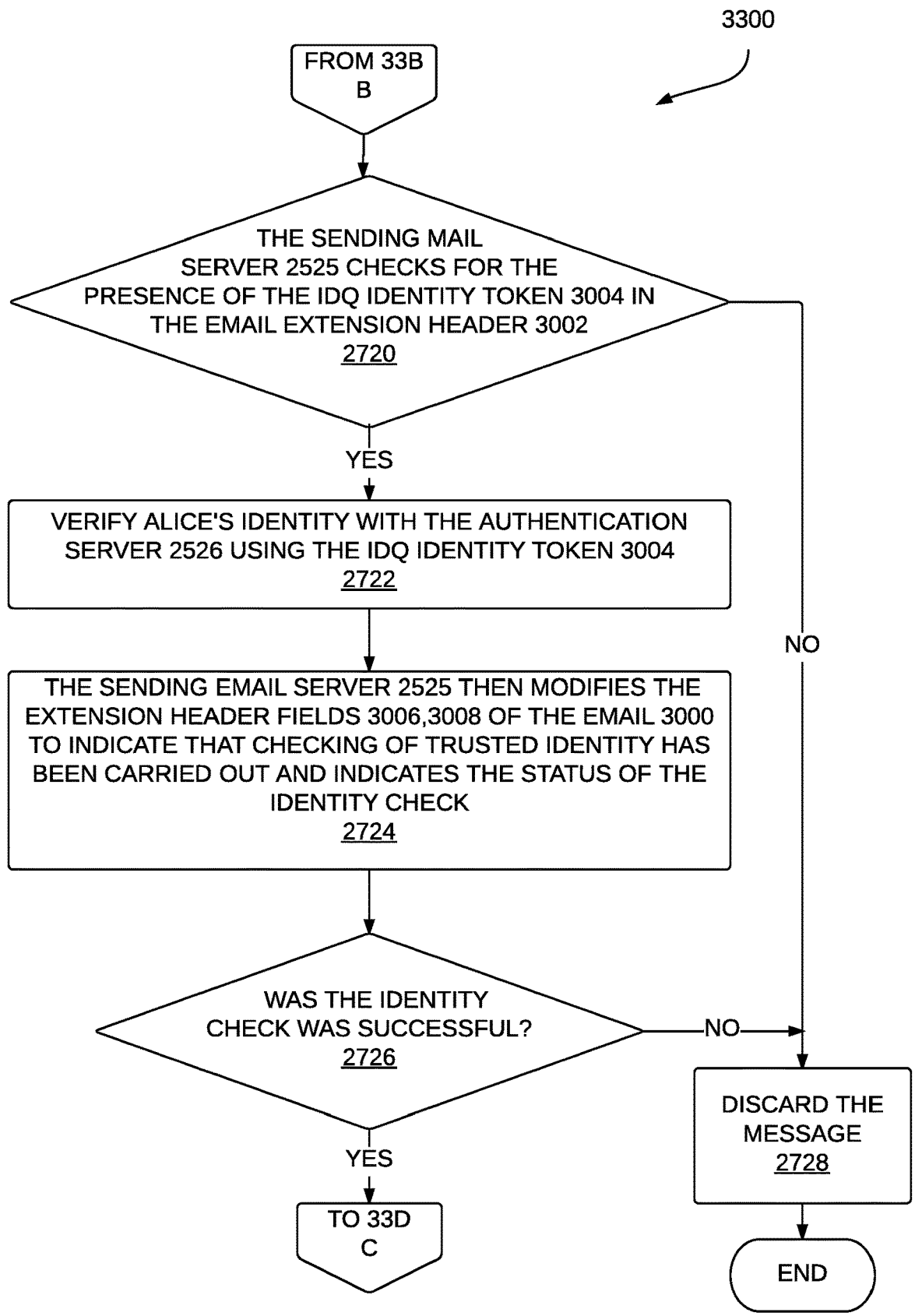
FIG. 33C is a third part of a flow chart of the embodiment of the invention shown in the block diagram of FIG. 27.
Figure 33D:
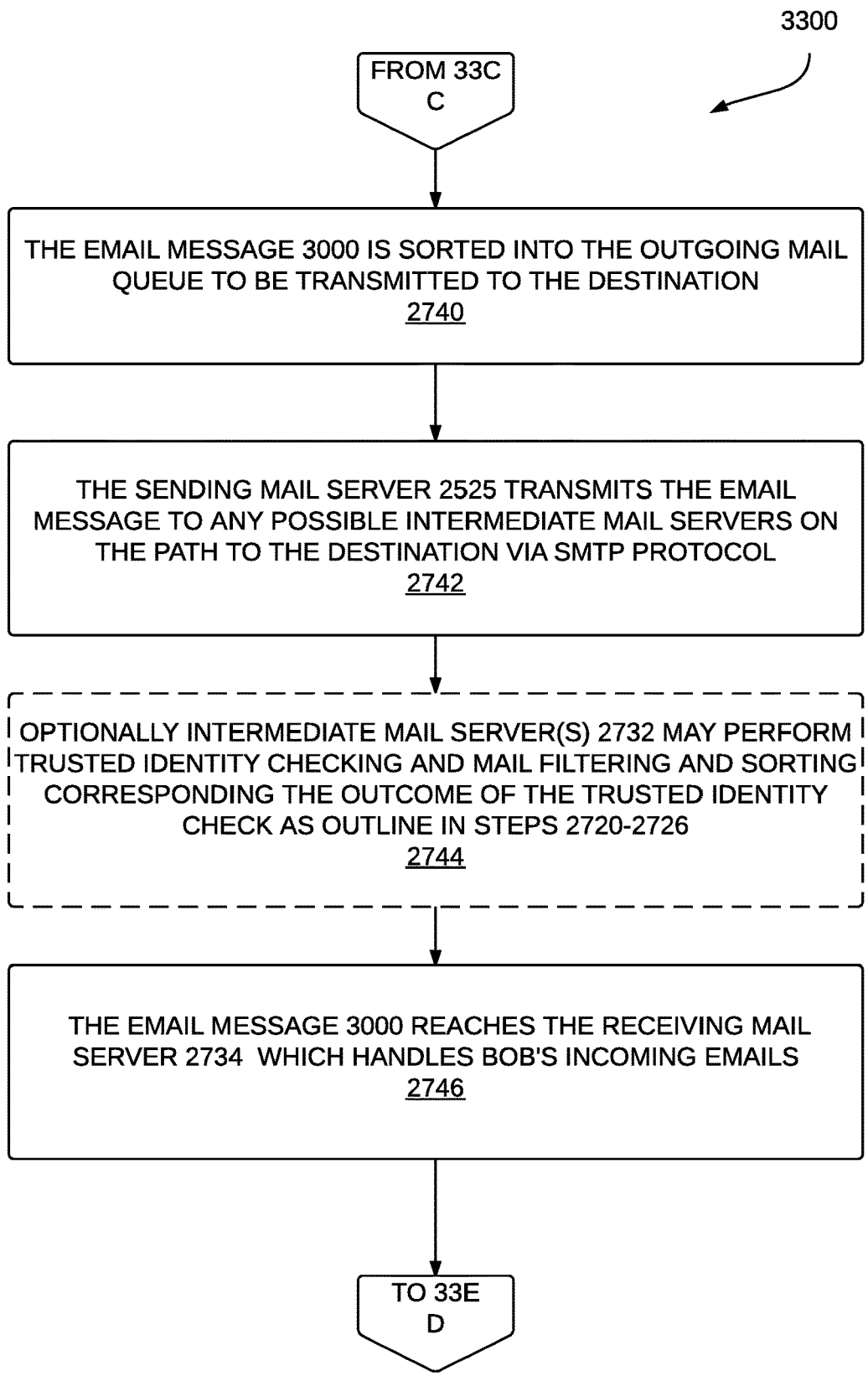
FIG. 33D is a fourth part of a flow chart of the embodiment of the invention shown in the block diagram of FIG. 27.
Figure 33E:
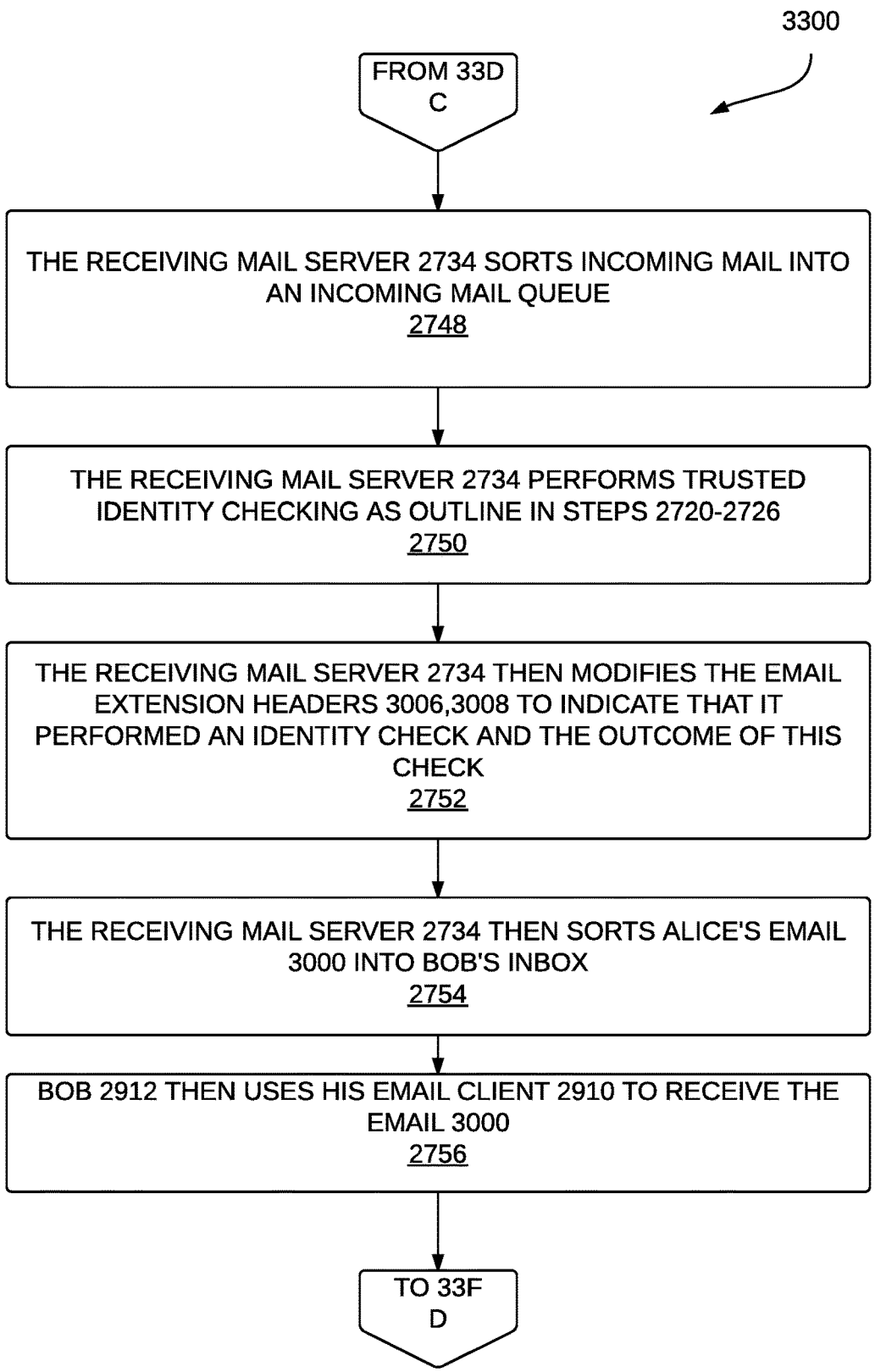
FIG. 33E is a fifth part of a flow chart of the embodiment of the invention shown in the block diagram of FIG. 27.
Figure 33F:
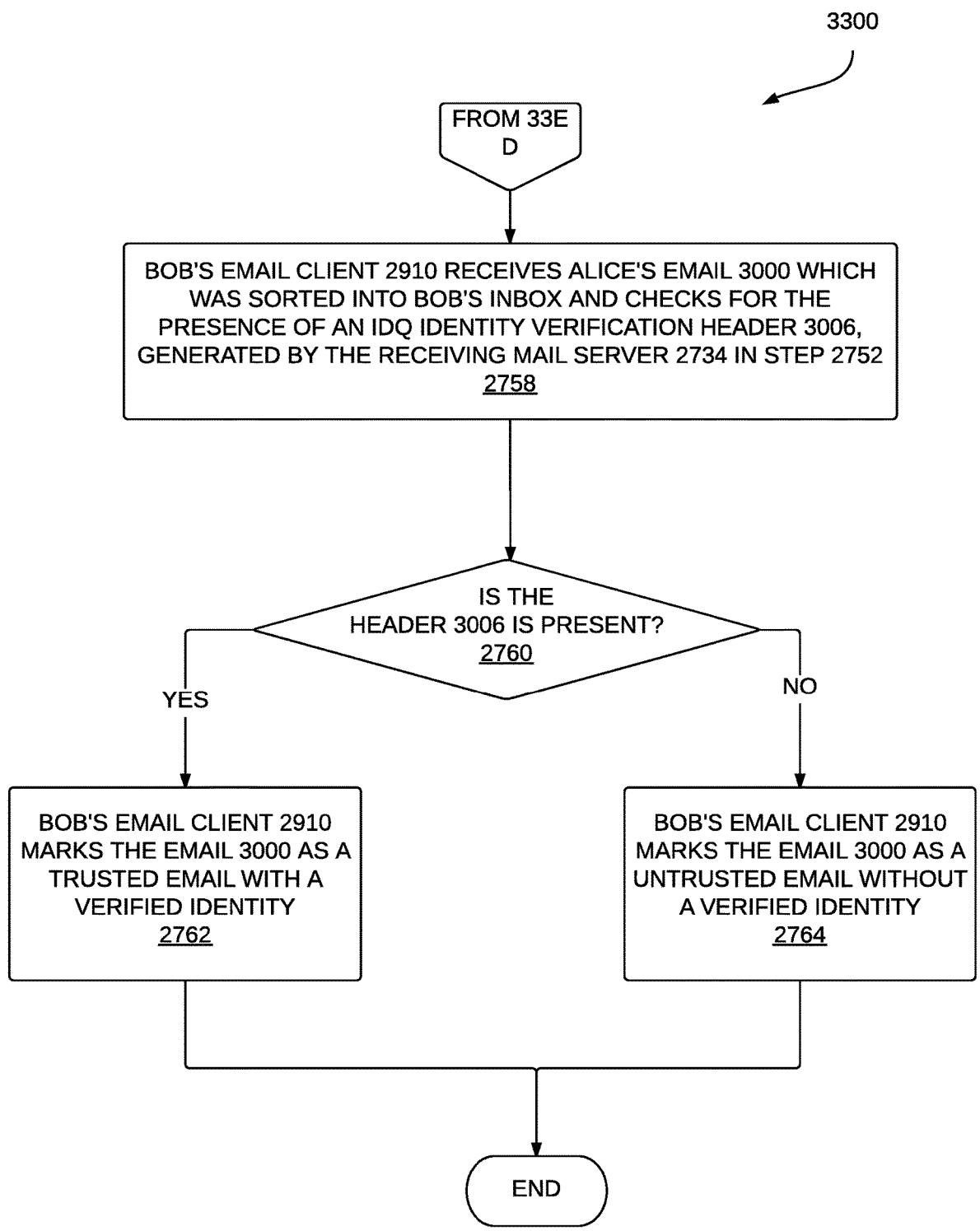
FIG. 33F is a sixth part of a flow chart of the embodiment of the invention shown in the block diagram of FIG. 27.
Figure 34:
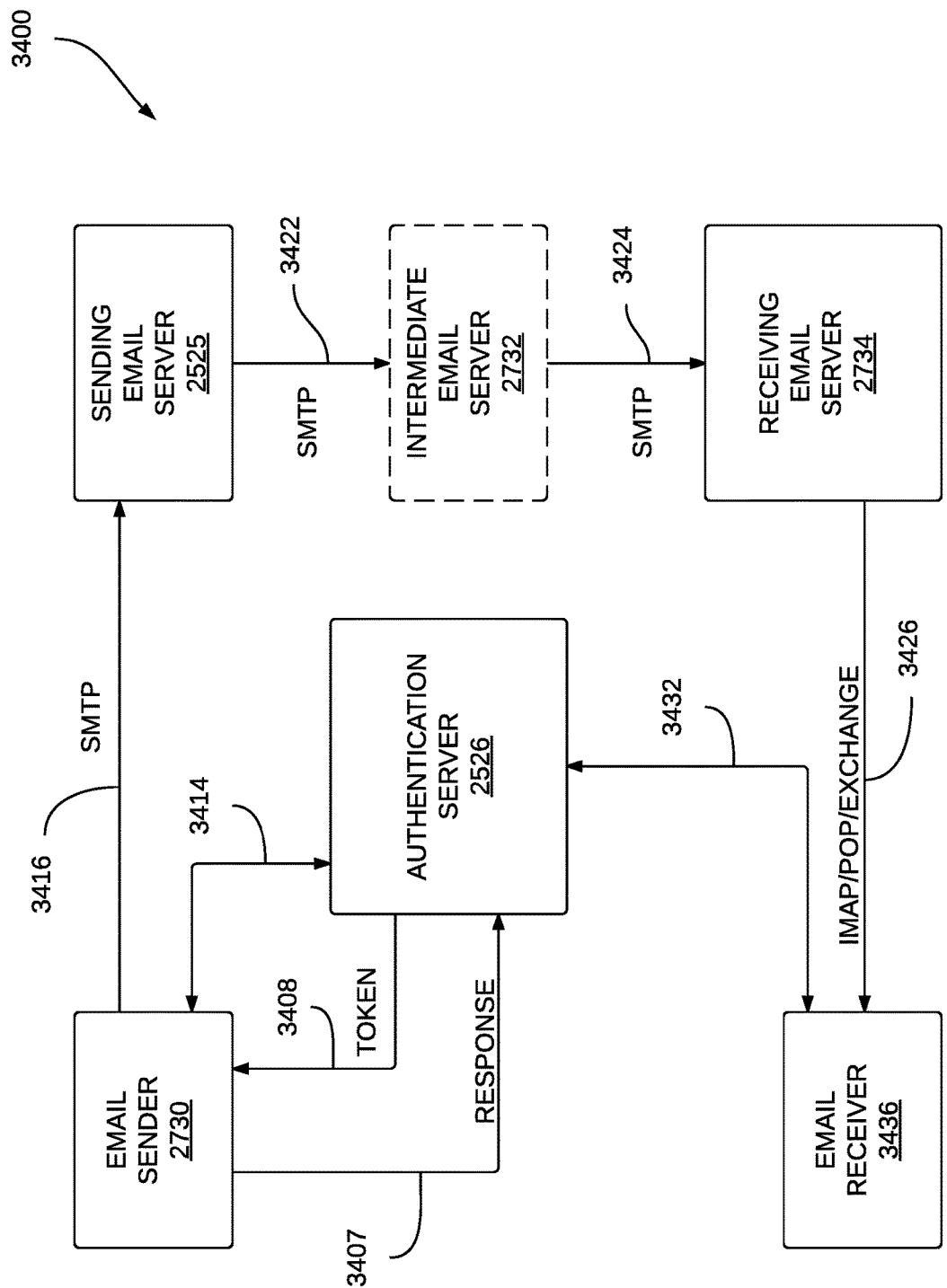
FIG. 34 is a block diagram of a second embodiment of the invention for establishing trusted email communication.
Figure 35:
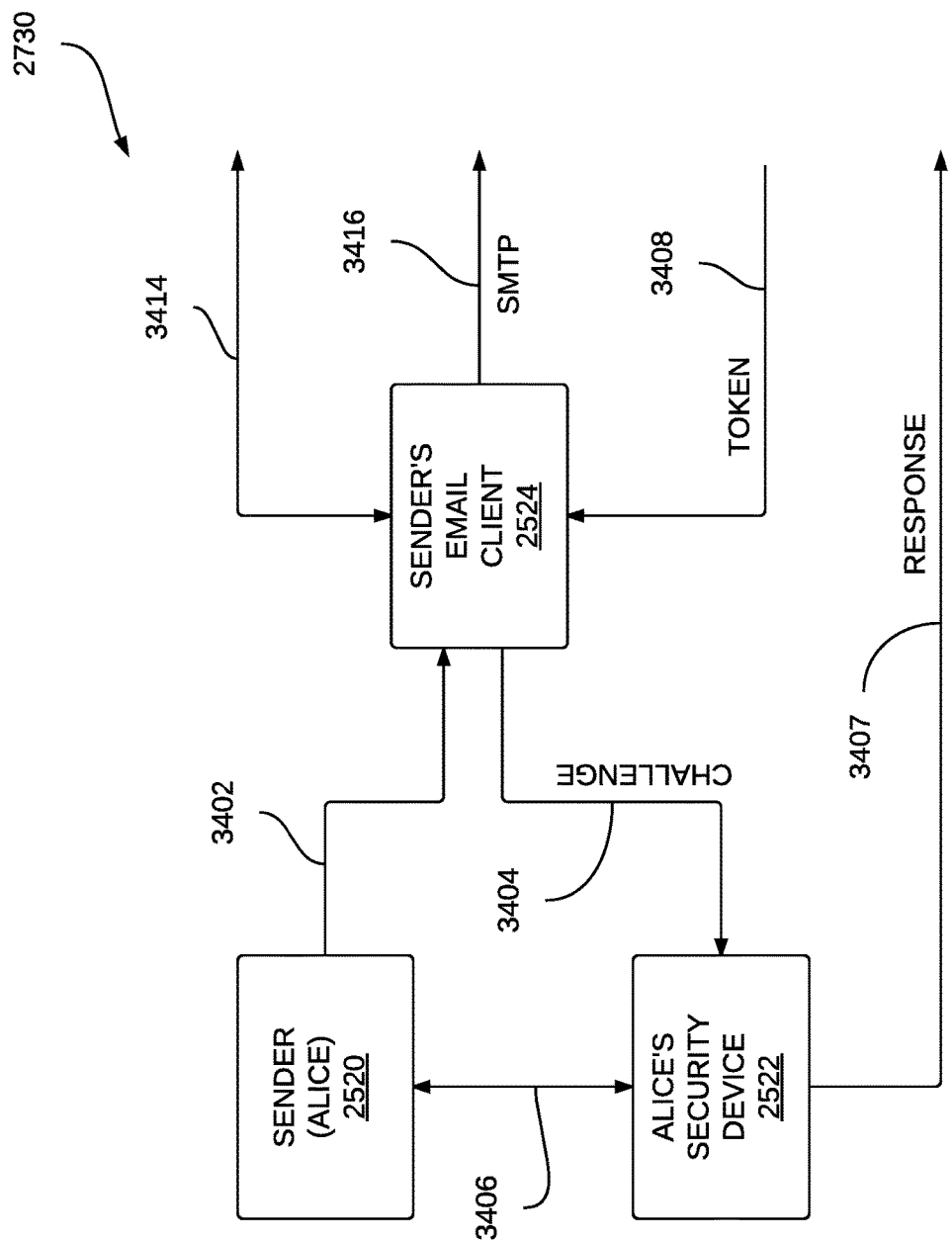
FIG. 35 is a block diagram of an email sender shown in FIG. 34.
Figure 36:
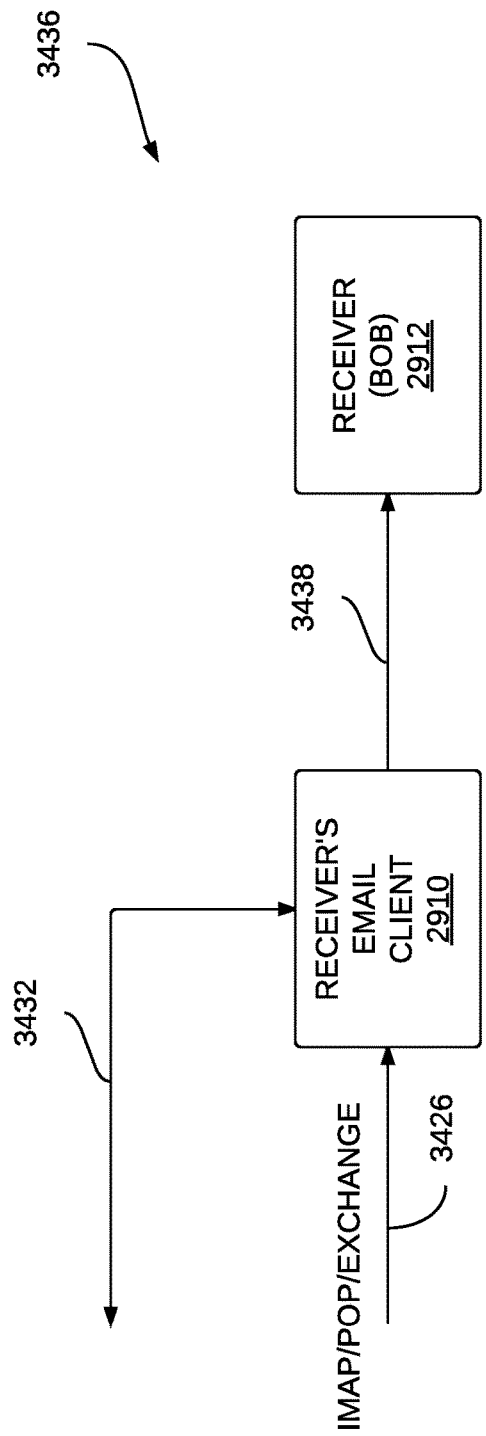
FIG. 36 is a block diagram of an email receiver shown in FIG. 34.

FIG. 32 illustrates the provisioning of the X-IDQ-VERIFIED-STATUS 3006 and X-IDQ-VERIFIED-BY 3008 extension headers by the sending 2525 and receiving 2734 internet mail servers, steps 2708,2720, 2750. The internet mail server 2525,2734 as part of the email sorting and filtering process, exchanges the email session token 3204 with the authentication server 2526 for the hash value 3212 of the email content as stored on the authentication server 2526, as well as a status of the trusted identity of the sender 2730 or recipient 2736. The internet mail server 2525,2734 may or may not compare the hash received from the authentication server 2526 with a hash calculated from the email message 3000 to be sorted to verify the integrity of the contents.

Client-Side Filtering of (Un)Trusted Email

FIGS. 34-39 are block diagrams representing another embodiment of the invention, for performing filtering of (un)trusted email on a client side. Individual steps in the flow chart 4000 of FIGS. 40A-40E are numbered and described in the following. In this embodiment, a sender named ALICE 2520 sends an email message to a recipient named BOB 2912. To do so, Alice 2520 logs in to 3404 her email client, which supports trusted identity and mutually trusted authentication as described herein above.

To establish a trusted login, Alice's email client 2524 presents a challenge created by the authentication server in the form of a QR code to Alice 2520. Alice uses her pre-registered trusted device 2522 to scan the QR code, generate a challenge-response and transmit 3406 the response to the authentication server 2526. The authentication server 2526 analyses the response, established Alice's identity for this session and transmits 3408 an identity token to the email client 2524. Alice then composes a new email message to Bob 2912 and proceeds to send 3410 the email message 3700. The sending email client 2524 calculates 3412 a hash of the email body, and adds the token to an extension header 3704 in the email message 3700 together with the content hash.

The email client 2524 then exchanges the hash of the email content together with the identity of Alice on the authentication server 2526 for an email session token, and records this token in the extension header. The sending email client 2524 then transmits 3416 the email message to the sending mail server via standard mail transmission protocol (SMTP). The sending mail server 2525 receives 3418 the email 3700 to the internal incoming mail queue. In this embodiment, the sending mail server 2525 sorts 3420 the email 3700 into the outgoing mail queue to be transmitted to the destination. The sending mail server 2525 proceeds to transmit 3422 the email message 3700 to any possible intermediate mail servers 2732 on the path to the destination via SMTP protocol.

Intermediate mail servers 2732 transmit 3424 the email message 3700 in a conventional fashion. The email message 3700 reaches the receiving mail server 2734 which handles Bob's incoming emails. When receiving new email messages, the receiving mail server 2734 sorts incoming mail into an incoming mail queue. The receiving mail server 2734 then sorts 3426 Alice's email 3700 into Bob's inbox. Bob 2912 then uses his email client 2910 to receive new email 3700. Bob's email client 2910 receives 3428 Alice's email 3700 which was sorted into Bob's inbox and checks for the presence of an idQ identity extension header 3704, generated by Alice's email client 2524. Provided the header is present 3430 Bob's email client 2910 verifies 3432 Alice's identity and the integrity of the email messages contents 3712 with the authentication server 2526 and writes the corresponding extension headers 3704,3706,3708 to the email 3700, otherwise the message is discarded 3434. Bob's mail client 2910 displays 3438 Alice's message 3700 provided that identity check and integrity check are successful 3436.

We note the following: the sending mail client may or may not establish her trusted identity. The receiving mail client may elect to not accept the incoming message unless Alice established her trusted identity in a previous step and identity check as well as message integrity check with the authentication server are successful.

Figure 37:
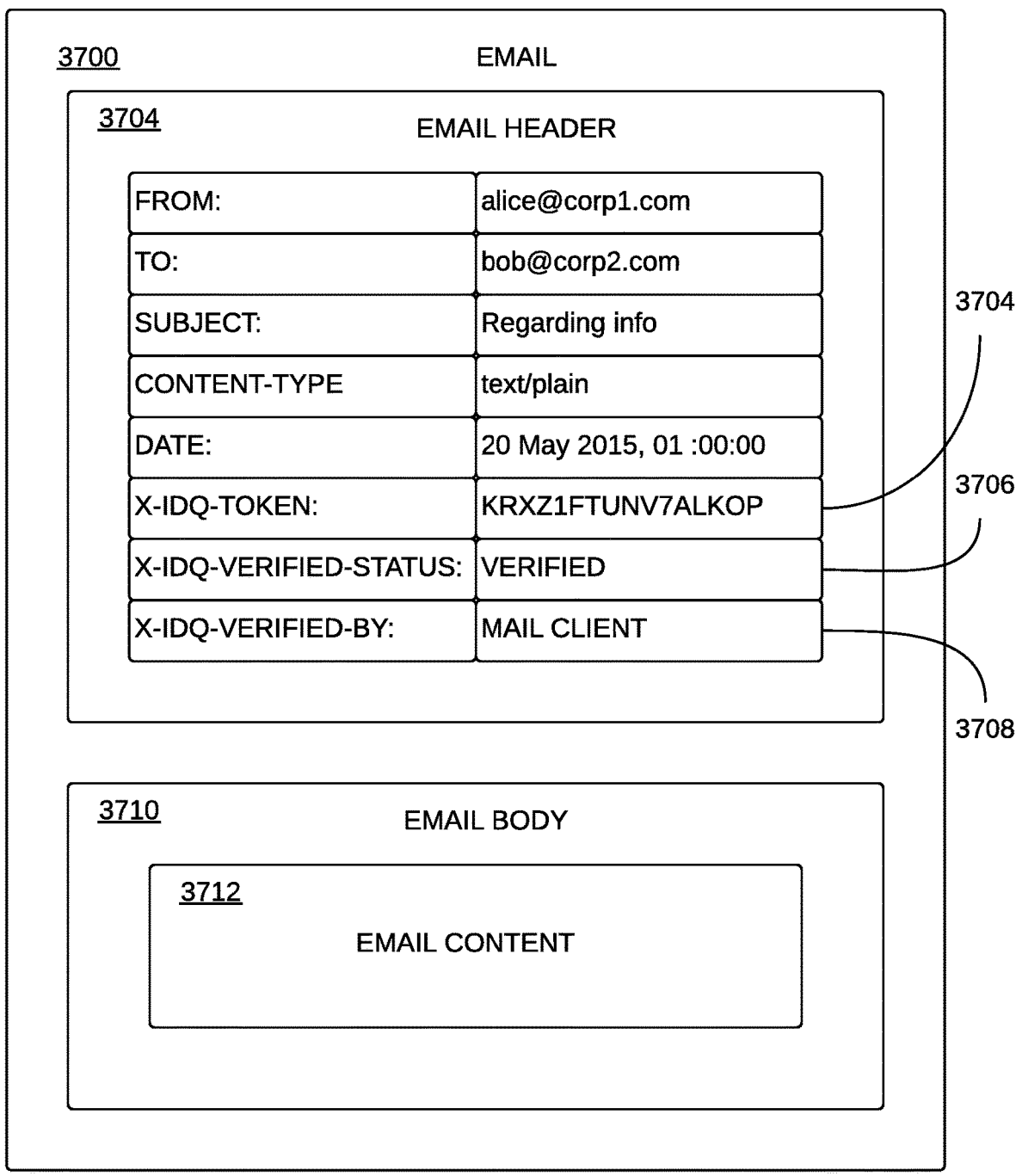
FIG. 37 is a block diagram of an email in accordance with embodiments of the present invention.

FIG. 37 illustrates a graphical representation of the parts of an email message analogous to FIG. 30.

X-IDQ-TOKEN. The X-IDQ-TOKEN extension header 3704 value describes the idQ identity token provided to the email client 2910 by the authentication server 2526. The receiving email client 2910 can use the value of this token to establish the trusted identity of the email sender 2730 or recipient with the authentication server 2526.

X-IDQ-VERIFIED-STATUS. The X-IDQ-VERIFIED-STATUS extension header 3706 value describes the outcome of an identity check with the authentication server 2526. This extension header value is intended to be written by the reviving email client 2910 and is used to record the outcome of this check.

X-IDQ-VERIFIED-BY. The X-IDQ-VERIFIED-BY extension header 3708 value records the client who last performed a check of the trusted identity of the sender or recipient with the authentication server 2526.

Figure 38:
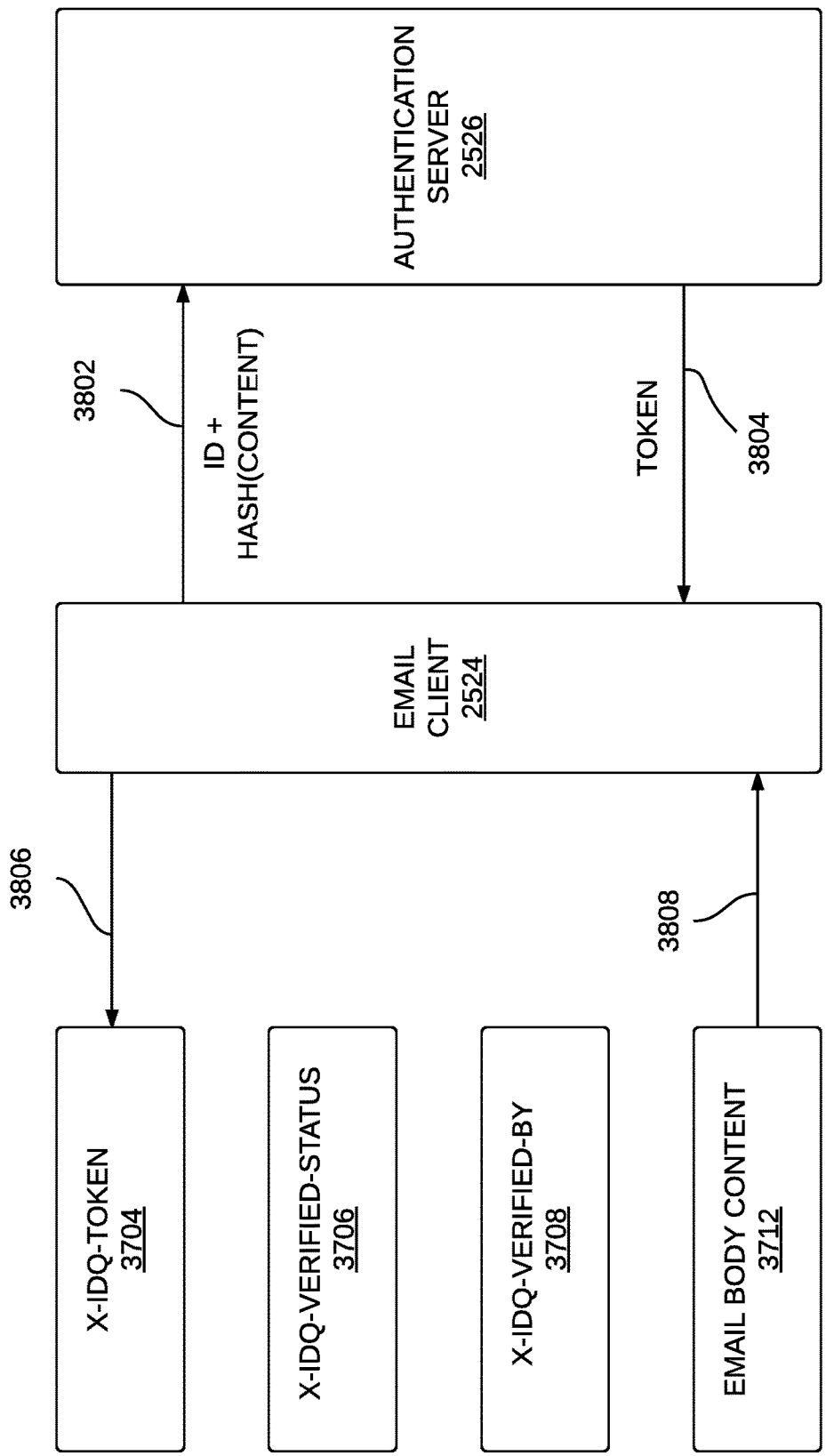
FIG. 38 is a block diagram showing details of a mail sending client shown in FIG. 34.

FIG. 38 illustrates the provisioning of the X-IDQ-TOKEN extension header 3704 by the sending client 2524. The sending client 2524 reads 3808 the email message content 3712 container and calculates a hash value. The sending client 2524 then exchanges 3802,3804 the logged in 'identity token (ID) and the hash code for an email session token on the authentication server 2526. The sending client 2524 then stores 3806 the email session token in the extension header field 3704.

Figure 39:
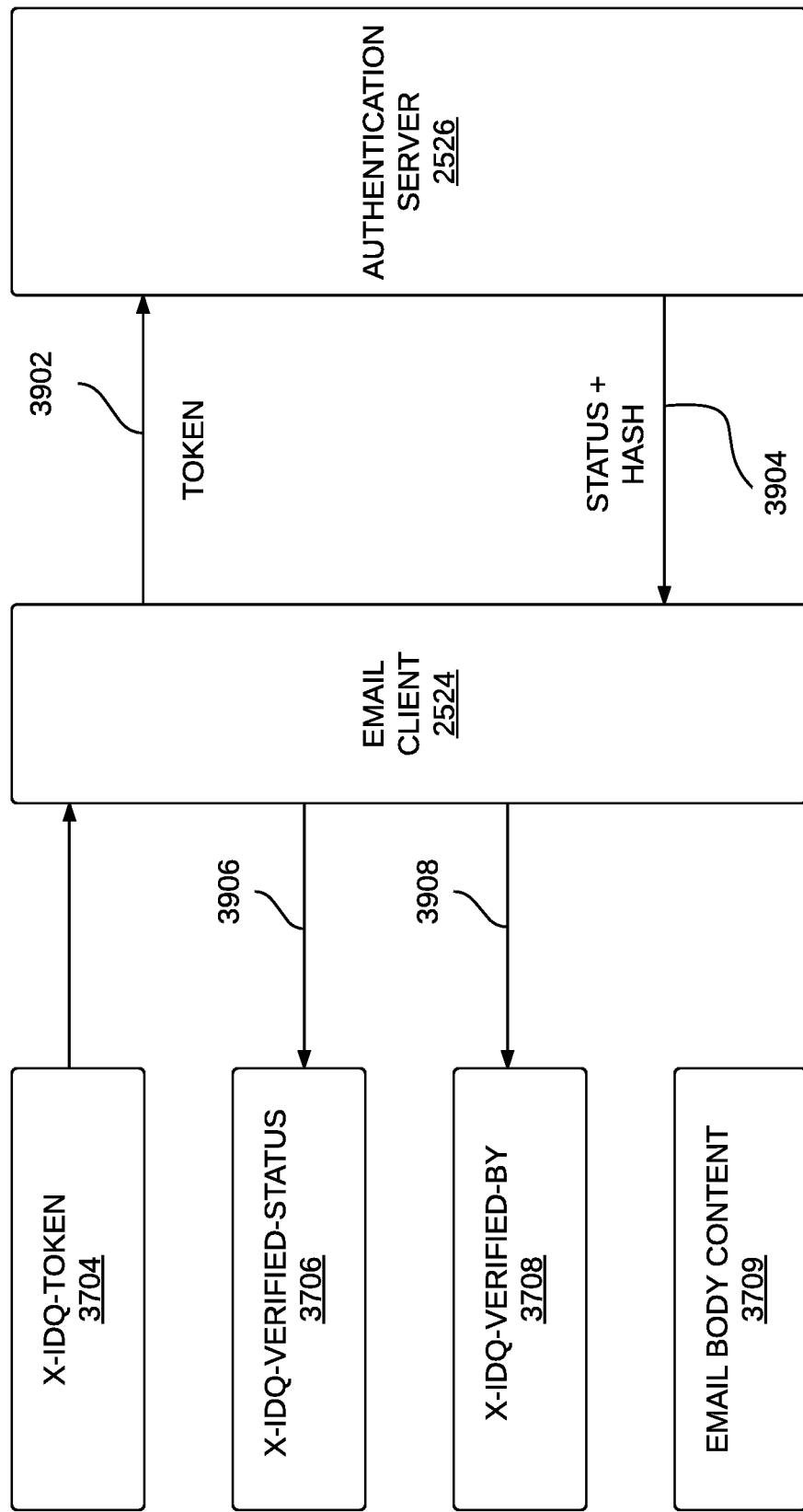
FIG. 39 is a block diagram showing details of a mail sending server shown in FIG. 34.

FIG. 39 illustrates the provisioning of the X-IDQ-VERIFIED-STATUS and X-IDQ-VERIFIED-BY extension headers 3706,3708 by the receiving client 2910. The receiving client 2910 exchanges 3902,3906 the email session token with the authentication server for the hash value of the email content 3712 as stored on the authentication server 2526, as well as a status 3706 of the trusted identity of the sender 2520 or recipient 2912. The receiving client 2910 may or may not compare the hash received from the authentication server 2526 with a hash calculated from the email message to be sorted to verify the integrity of the contents 3712.

In summary, embodiments of the present invention bind a unique ID (or global personal identifier) of a user with the end-to-end communication performed by this user. The unique ID is bounded with an email message sent by an email sender; both email sending server and email receiving server verify the unique ID of each email's sender using the authentication server. Embodiments of the invention prevent email communication from being spammed or hacked by malicious attackers.

In the description provided above, the term "server" relates to a "server computer" having a processor.

Although embodiments of the invention described herein relate to email communications, other embodiments of the invention may also provide similar advantages to SMS (Short Message Service) communication systems.

It should be noted at the data used in the systems and methods for providing a secure access from a security device at a local network location to a remote network application described above are not, in any sense, abstract or intangible. Instead, the data is necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems on electronically or magnetically stored data, with the results of the data processing and data analysis digitally encoded and stored in one or more tangible, physical, data-storage devices and media. Thus, an improved system and method for providing a secure access from a security device at a local network location to a remote network application have been provided.

Embodiments of the present invention, providing improvements have been made, in order to improve security and privacy have been described. While embodiments of the invention have been described by way of example, modifications and equivalents will suggest themselves to those skilled in the art, without departing from the scope of the invention as defended in the appended claims.

The invention claimed is:

1. A method for providing a secure access from a security device at a local network location to a remote network location, the method comprising:
   at the security device, having a unique identifier (UID), a processor, and a memory:
      causing a security software to obtain a personal identification number (PIN) of a user, and the UID of the security device;
      verifying an authenticity of the PIN and the UID, without communicating over a network, and using a credential code generated using the PIN, the UID and the security software;
      retrieving access credentials to the remote network location upon verifying the authenticity of the PIN and the UID; and
      providing the secure access to the remote network location using the retrieved access credentials, the remote location having a copy of the security software, the PIN, the UID and the credential code.

2. The method of claim 1 further comprising:
   obtaining a Quick Response, QR, code from the remote location; and
   scanning the QR code into the security device.

3. The method of claim 1 wherein the providing the secure access to the remote network location comprises authorizing access to a remote server.

4. The method of claim 3 wherein the authorizing access comprises authorizing access to an email server.

5. The method of claim 1, comprising choosing the security device as one of the following:
   a computing device, comprising a processor; or
   a portable device having a memory, the portable device being different from the computing device, and being operably coupled to the computing device.

6. The method of claim 1, comprising choosing a mobile wireless device as the security device.

7. The method of claim 1, wherein the remote network location is a third party location.

8. The method of claim 1, wherein the retrieving comprises forwarding the retrieved access credentials to the remote network location.

9. A system for providing a secure access from a local network location to a remote network location, the system comprising:
   a remote server computer at the remote network location; and
   a security device, having a unique identifier (UID), a processor, and a memory having computer readable instructions stored thereon, causing the processor to:
   cause a security software to obtain a personal identification number (PIN) of a user, and the UID of the security device;
   verify an authenticity of the PIN and the UID, without communicating over a network, and using a credential code generated using the PIN, the UID and the security software;
   retrieve access credentials to the remote network location upon verifying the authenticity of the PIN and the UID; and
   provide the secure access to the remote network location using the retrieved access credentials, the remote location having a copy of the security software, the PIN, the UID and the credential code.

10. The system of claim 9 wherein the computer readable instructions further cause the processor to:
    obtain a Quick Response, QR, code, from the remote location; and
    scan the QR code into the security device.

11. The system of claim 9 wherein the computer readable instructions causing to provide the secure access further comprise computer readable instructions to authorize access to a remote server.

12. The system of claim 11 wherein the computer readable instructions to authorize comprise computer readable instructions to authorize access to an email server.

13. The system of claim 9, wherein the security device is one of the following:
    a computing device, comprising a processor; or
    a portable device having a memory, the portable device being different from the computing device, and being operably coupled to the computing device.

14. The system of claim 9, wherein the security device is a mobile wireless device.

15. The system of claim 9, wherein the computer readable instructions to provide the secure access further comprise computer readable instructions for performing a transaction authorization.

16. An apparatus for providing a secure access from a local network location to a remote network location, the apparatus comprising:
    a security device, having a unique identifier (UID), a processor, and a memory having computer readable instructions stored thereon, causing the processor to:

cause a security software to obtain a personal identification number (PIN) of a user, and the UID of the security device;

verify an authenticity of the PIN and the UID, without communicating over a network, and using a credential code generated using the PIN, the UID and the security software;

retrieve access credentials to the remote network location upon verifying the authenticity of the PIN and the UID; and provide the secure access to the remote network location using the retrieved access credentials, the remote location having a copy of the security software, the PIN, the UID and the credential code.

17. The apparatus of claim 16 wherein the computer readable instructions further cause the processor to:

obtain a Quick Response, QR, code from the remote location; and scan the QR code into the security device.

18. The apparatus of claim 16 wherein the computer readable instructions further cause the processor to authorize access to a remote server.

19. The apparatus of claim 16, wherein the security device is one of the following:

a computing device, comprising a processor; or a portable device having a memory, the portable device being different from the computing device, and being operably coupled to the computing device.

20. The apparatus of claim 16, wherein the security device is a mobile wireless device.

\* \* \* \* \*